US012782919B2

(12) United States Patent
Misra et al.

(10) Patent No.: US 12,782,919 B2
(45) Date of Patent: Nov. 3, 2026

(54) METHODS AND APPARATUS FOR MANAGING THE COOLING OF A DISTRIBUTED COOLING SYSTEM

(71) Applicant: Intel Corporation, Santa Clara, CA (US)

(72) Inventors: Amruta Misra, Bangalore (IN); Francesc Guim Bernat, Barcelona (ES); Arun Hodigere, Bangalore (IN); Kshitij Arun Doshi, Tempe, AZ (US); John J. Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/308,397

(22) Filed: Apr. 27, 2023

(65) Prior Publication Data

US 2023/0259102 A1 Aug. 17, 2023

Related U.S. Application Data

(60) Provisional application No. 63/478,013, filed on Dec. 30, 2022.

(51) Int. Cl.
*G05B 19/4155* (2006.01)

(52) U.S. Cl.
CPC .................... *G05B 19/4155* (2013.01); *G05B 2219/50333* (2013.01)

(58) Field of Classification Search
CPC ...... G05B 19/4155; G05B 2219/50333; H05K 7/20836; G06F 1/206; Y02D 10/00
USPC .......................................................... 700/300
See application file for complete search history.

(56) References Cited

U.S. PATENT DOCUMENTS

| | | | |
|---|---|---|---|
| 10,942,562 B2 | 3/2021 | Qawami et al. | |
| 2021/0223805 A1 | 7/2021 | De Oliveira Vivi et al. | |
| 2021/0320050 A1 | 10/2021 | Robinson et al. | |
| 2024/0064941 A1 * | 2/2024 | Ruso | G06F 1/206 |

FOREIGN PATENT DOCUMENTS

| | | |
|---|---|---|
| GB | 2576032 | 4/2021 |
| GB | 2576030 | 12/2021 |
| GB | 2597525 | 2/2022 |
| GB | 2601357 | 6/2022 |

* cited by examiner

*Primary Examiner* — Michael J Brown
(74) *Attorney, Agent, or Firm* — Hanley, Flight & Zimmerman, LLC

(57) ABSTRACT

Methods and apparatus for maintaining the cooling systems of distributed compute systems are disclosed. An example apparatus disclosed herein includes memory, machine readable instructions, and programmable circuitry to at least one of instantiate or execute the machine readable instructions to input operational data into a machine-learning model, the operational data including first information relating to a workload of a server and second information relating to an ambient condition of the server, compare a predicted cooling power requirement for a time period with a predicted cooling power availability for the time period, the predicted cooling power requirement based on an output of the machine-learning model, and generate a cooling plan based on the comparison, the cooling plan to define operation of at least one of the server or a cooling system used to cool the server during the time period.

20 Claims, 26 Drawing Sheets

METHODS AND APPARATUS FOR MANAGING THE COOLING OF A DISTRIBUTED COOLING SYSTEM

RELATED APPLICATION

This patent claims priority to U.S. Provisional Patent Application No. 63/478,013, filed on Dec. 30, 2022, and entitled "METHODS AND APPARATUS FOR MANAGING THE COOLING OF A DISTRIBUTED COOLING SYSTEM," which is incorporated herein in its entirety.

FIELD OF THE DISCLOSURE

This disclosure relates generally to compute components and, more particularly, to methods and apparatus for managing the cooling of a distributed cooling system.

BACKGROUND

The use of liquids to cool electronic components is being explored for its benefits over more traditional air cooling systems, as there is an increasing need to address thermal management risks resulting from increased thermal design power in high performance systems (e.g., CPU and/or GPU servers in data centers, cloud computing, edge computing, and the like). More particularly, relative to air, liquid has inherent advantages of higher specific heat (when no boiling is involved) and higher latent heat of vaporization (when boiling is involved).

BRIEF DESCRIPTION OF THE DRAWINGS

In general, the same reference numbers will be used throughout the drawing(s) and accompanying written description to refer to the same or like parts. The figures are not necessarily to scale.

Figure 1:
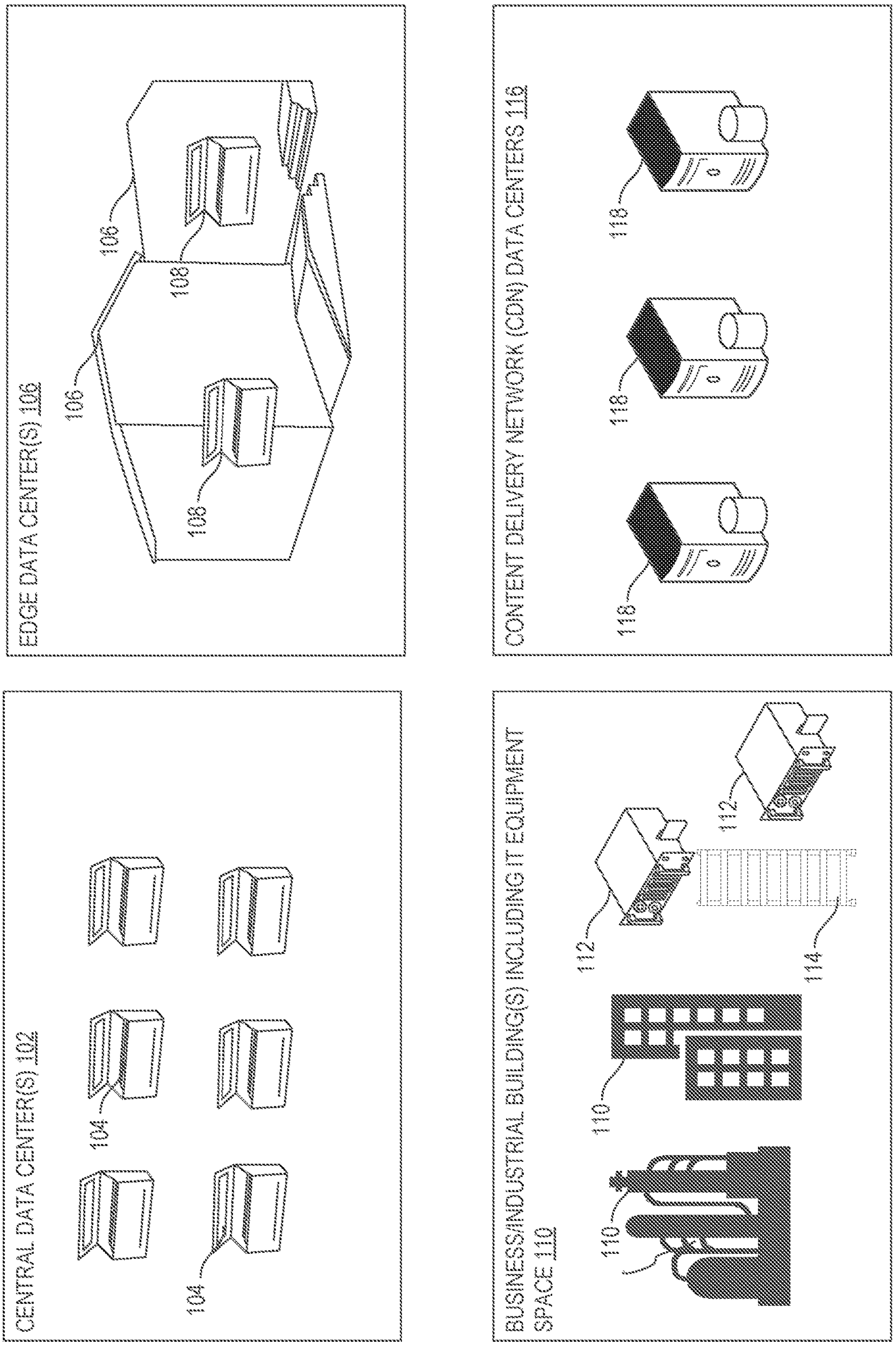
FIG. 1 illustrates one or more example environments in which teachings of this disclosure may be implemented.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

DETAILED DESCRIPTION

As noted above, the use of liquids to cool electronic components is being explored for its benefits over more traditional air cooling systems, as there are increasing needs to address thermal management risks resulting from increased thermal design power in high-performance systems (e.g., CPU and/or GPU servers in data centers, accelerators, artificial intelligence computing, machine learning computing, cloud computing, edge computing, and the like). More particularly, relative to air, liquid has inherent advantages of higher specific heat (when no boiling is involved) and higher latent heat of vaporization (when boiling is involved). In some instances, liquid can be used to indirectly cool electronic components by cooling a cold plate that is thermally coupled to the electronic component(s). An alternative approach is to directly immerse electronic components in the cooling liquid. In direct immersion cooling, the liquid can be in direct contact with the electronic components to directly draw away heat from the electronic components. To enable the cooling liquid to be in direct contact with electronic components, the cooling liquid is electrically insulative (e.g., a dielectric liquid).

A liquid cooling system can involve at least one of single-phase cooling or two-phase cooling. As used herein, single-phase cooling (e.g., single-phase immersion cooling) means the cooling fluid (sometimes also referred to herein as cooling liquid or coolant) used to cool electronic components draws heat away from heat sources (e.g., electronic components) without changing phase (e.g., without boiling and becoming vapor). Such cooling fluids are referred to herein as single-phase cooling fluids, liquids, or coolants. By contrast, as used herein, two-phase cooling (e.g., two-phase immersion cooling) means the cooling fluid (in this case, a cooling liquid) vaporizes or boils from the heat generated by the electronic components to be cooled, thereby changing from the liquid phase to the vapor phase. The gaseous vapor may subsequently be condensed back into a liquid (e.g., via a condenser) to again be used in the cooling process. Such cooling fluids are referred to herein as two-phase cooling fluids, liquids, or coolants. Notably, gases (e.g., air) can also be used to cool components and, therefore, may also be referred to as a cooling fluid and/or a coolant. However, indirect cooling and immersion cooling typically involves at least one cooling liquid (which may or may not change to the vapor phase when in use). Example systems, apparatus, and associated methods to improve cooling systems and/or associated cooling processes are disclosed herein.

Telemetry provides for the collection of data (e.g., performance data, operational data, etc.) associated with components (e.g., compute devices such as servers, cooling systems, etc.) of a system architecture that can be used by schedulers, orchestrators, operations support systems, and/or business support systems. For instance, some known cooling systems provide telemetry that indicates the temperature for one or more elements being cooled, a temperature of a coolant, a flow rate of the coolant, and/or other properties of the cooling systems. Telemetry data can also provide information regarding the ambient conditions of such components (e.g., temperature, humidity, etc.).

Some compute systems are located in remote and/or hostile environments. Examples of such remote compute systems include real-time marine monitoring systems, deep Earth industrial systems, high-altitude communication systems, and space-based (e.g., components on satellites, etc.) systems. Such systems are typically remotely accessed to schedule and execute workloads, shared by multiple entities, and perform a variety of different workloads/applications. Due to the remoteness of these compute systems, these systems are often not connected to municipal power systems and usually are powered via batteries and/or solar panels. Accordingly, such systems typically operate with limited power availability. If these remote systems exceed the available power provided by local sources, these systems can overheat, throttle performance, or shutdown. In recent years, the cooling systems for compute systems have increased in power usage. For example, while immersion cooling systems are more efficient than air-cooled systems, pumping immersion fluid through a system and cooling the heated immersion fluid can use more power than similarly sized air-cooled systems.

Examples disclosed herein include a system that predicts the upcoming power requirements, cooling requirements, and cooling capabilities of compute systems. Examples disclosed herein include models that predict device cooling requirements based on the workload on that system, ambient conditions, historic records, volumetric data, and/or system power needs. In some examples disclosed herein, the power requirements associated with a workload can be determined based on an instruction set associated with the load, the service level objective of the workload, the input/output device requirements associated with the workload, and/or the type of workload. Examples disclosed herein can identify potential power shortfalls in advance and take mitigation actions to avoid downtime and/or workload stalls. In some such examples disclosed herein, the system can cap the power output of the compute system to prevent overheating, lower the core frequency, trigger the redeployment of the workload, and/or allow the system to temporarily increase in temperature. Examples disclosed herein can enhance (e.g., optimize) the power usage of compute devices to improve system performance.

FIG. 1 illustrates one or more example environments in which teachings of this disclosure may be implemented. The example environment(s) of FIG. 1 can include one or more central data centers 102. The central data center(s) 102 can store a large number of servers used by, for instance, one or more organizations for data processing, storage, etc. As illustrated in FIG. 1, the central data center(s) 102 include a plurality of immersion tank(s) 104 to facilitate cooling of the servers and/or other electronic components stored at the central data center(s) 102. The immersion tank(s) 104 can provide for single-phase cooling or two-phase cooling.

The example environments of FIG. 1 can be part of an edge computing system. For instance, the example environments of FIG. 1 can include edge data centers or micro-data centers 106. The edge data center(s) 106 can include, for example, data centers located at a base of a cell tower. In some examples, the edge data center(s) 106 are located at or near a top of a cell tower and/or other utility pole. The edge data center(s) 106 include respective housings that store server(s), where the server(s) can be in communication with, for instance, the server(s) stored at the central data center(s) 102, client devices, and/or other computing devices in the edge network. Example housings of the edge data center(s) 106 may include materials that form one or more exterior surfaces that partially or fully protect contents therein, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. As illustrated in FIG. 1, the edge data center(s) 106 can include immersion tank(s) 108 to store server(s) and/or other electronic component(s) located at the edge data center(s) 106.

The example environment(s) of FIG. 1 can include buildings 110 for purposes of business and/or industry that store information technology (IT) equipment in, for example, one or more rooms of the building(s) 110. For example, as represented in FIG. 1, server(s) 112 can be stored with server rack(s) 114 that support the server(s) 112 (e.g., in an opening of slot of the rack 114). In some examples, the server(s) 112 located at the buildings 110 include on-premise server(s) of an edge computing network, where the on-premise server(s) are in communication with remote server(s) (e.g., the server(s) at the edge data center(s) 106) and/or other computing device(s) within an edge network.

The example environment(s) of FIG. 1 include content delivery network (CDN) data center(s) 116. The CDN data center(s) 116 of this example include server(s) 118 that cache content such as images, webpages, videos, etc. accessed via user devices. The server(s) 118 of the CDN data centers 116 can be disposed in immersion cooling tank(s) such as the immersion tanks 104, 108 shown in connection with the data centers 102, 106.

In some instances, the example data centers 102, 106, 116 and/or building(s) 110 of FIG. 1 include servers and/or other electronic components that are cooled independent of immersion tanks (e.g., the immersion tanks 104, 108) and/or an associated immersion cooling system. That is, in some examples, some or all of the servers and/or other electronic components in the data centers 102, 106, 116 and/or building(s) 110 can be cooled by air and/or liquid coolants without immersing the servers and/or other electronic components therein. Thus, in some examples, the immersion tanks 104, 108 of FIG. 1 may be omitted. Further, the example data centers 102, 106, 116 and/or building(s) 110 of FIG. 1 can correspond to, be implemented by, and/or be adaptations of the example data center 200 described in further detail below in connection with FIGS. 2-16.

Although a certain number of cooling tank(s) and other component(s) are shown in the figures, any number of such components may be present. Also, the example cooling data centers and/or other structures or environments disclosed herein are not limited to arrangements of the size that are depicted in FIG. 1. For instance, the structures containing example cooling systems and/or components thereof disclosed herein can be of a size that includes an opening to accommodate service personnel, such as the example data center(s) 106 of FIG. 1, but can also be smaller (e.g., a "doghouse" enclosure). For instance, the structures containing example cooling systems and/or components thereof disclosed herein can be sized such that access (e.g., the only access) to an interior of the structure is a port for service personnel to reach into the structure. In some examples, the structures containing example cooling systems and/or components thereof disclosed herein are be sized such that only a tool can reach into the enclosure because the structure may be supported by, for a utility pole or radio tower, or a larger structure.

Figure 2:
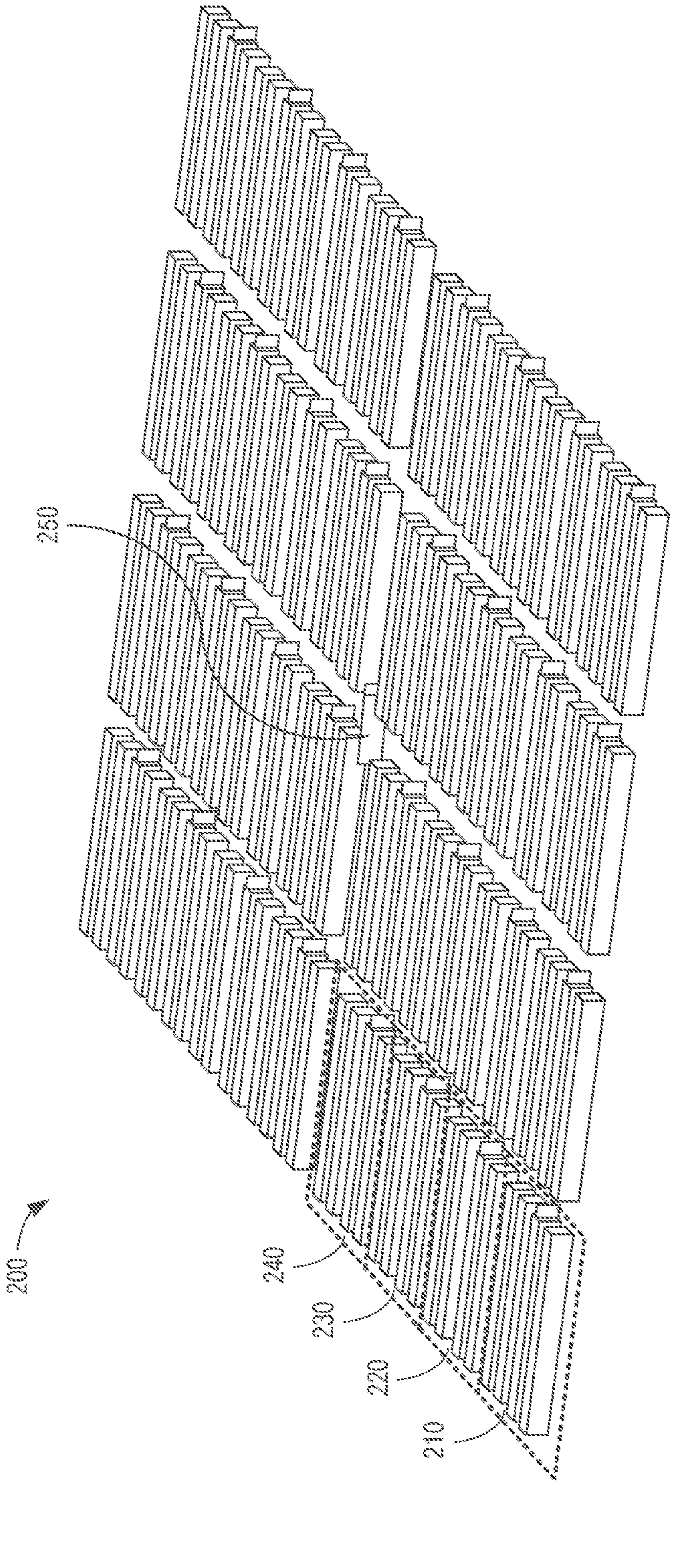
FIG. 2 illustrates at least one example of a data center for executing workloads with disaggregated resources.

FIG. 2 illustrates an example data center 200 in which disaggregated resources may cooperatively execute one or more workloads (e.g., applications on behalf of customers). The illustrated data center 200 includes multiple platforms 210, 220, 230, 240 (referred to herein as pods), each of which includes one or more rows of racks. Although the data center 200 is shown with multiple pods, in some examples, the data center 200 may be implemented as a single pod. As described in more detail herein, a rack may house multiple sleds. A sled may be primarily equipped with a particular type of resource (e.g., memory devices, data storage devices, accelerator devices, general purpose programmable circuitry), i.e., resources that can be logically coupled to form a composed node. Some such nodes may act as, for example, a server. In the illustrative example, the sleds in the pods 210, 220, 230, 240 are connected to multiple pod switches (e.g., switches that route data communications to and from sleds within the pod). The pod switches, in turn, connect with spine switches 250 that switch communications among pods (e.g., the pods 210, 220, 230, 240) in the data center 200. In some examples, the sleds may be connected with a fabric using Intel Omni-Path™ technology. In other examples, the sleds may be connected with other fabrics, such as InfiniBand or Ethernet. As described in more detail herein, resources within the sleds in the data center 200 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 210, 220, 230, 240. As such, some resources of a single sled may be allocated to one managed node while other resources of the same sled are allocated to a different managed node (e.g., first programmable circuitry assigned to one managed node and second programmable circuitry of the same sled assigned to a different managed node).

A data center including disaggregated resources, such as the data center 200, can be used in a wide variety of contexts, such as enterprise, government, cloud service provider, and communications service provider (e.g., Telco's), as well in a wide variety of sizes, from cloud service provider mega-data centers that consume over 200,000 sq. ft. to single- or multi-rack installations for use in base stations.

In some examples, the disaggregation of resources is accomplished by using individual sleds that include predominantly a single type of resource (e.g., compute sleds including primarily compute resources, memory sleds including primarily memory resources). The disaggregation of resources in this manner, and the selective allocation and deallocation of the disaggregated resources to form a managed node assigned to execute a workload, improves the operation and resource usage of the data center 200 relative to typical data centers. Such typical data centers include hyperconverged servers containing compute, memory, storage and perhaps additional resources in a single chassis. For example, because a given sled will contain mostly resources of a same particular type, resources of that type can be upgraded independently of other resources. Additionally, because different resource types (programmable circuitry, storage, accelerators, etc.) typically have different refresh rates, greater resource utilization and reduced total cost of ownership may be achieved. For example, a data center operator can upgrade the programmable circuitry throughout a facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 3:
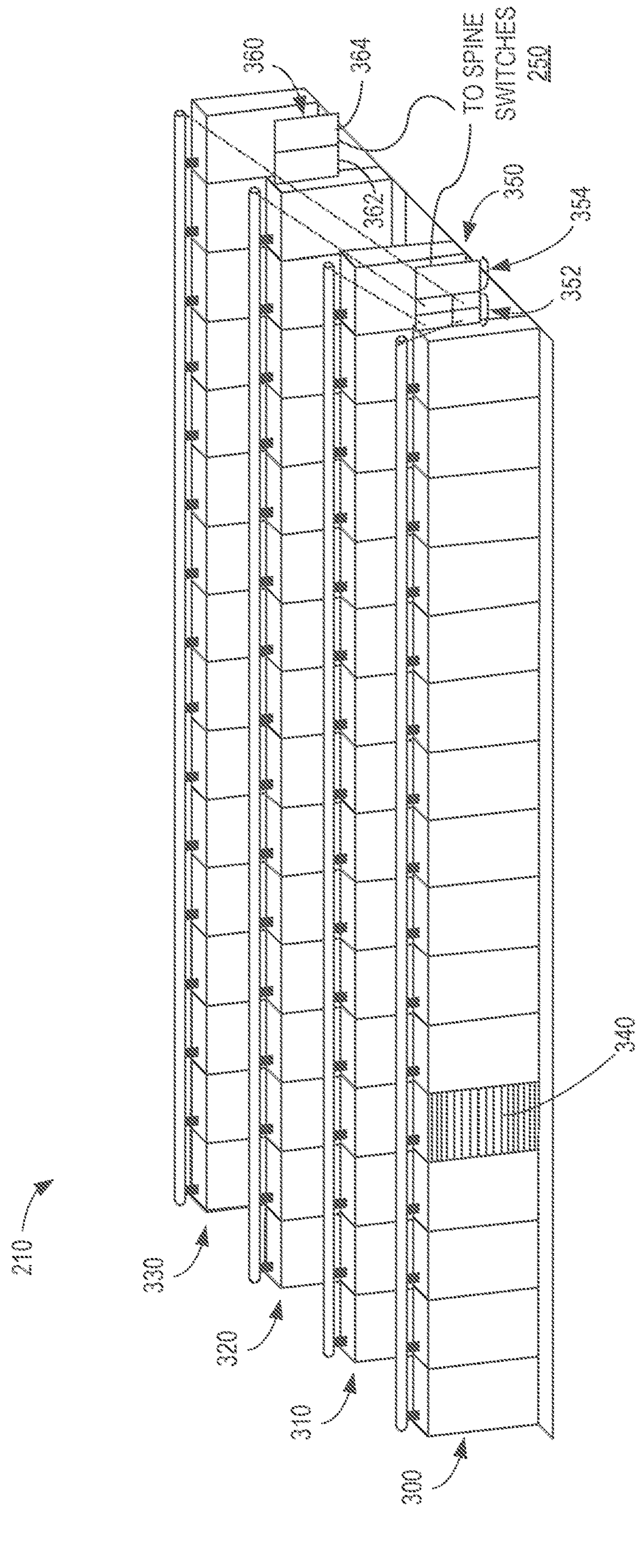
FIG. 3 illustrates at least one example of a pod that may be included in the data center of FIG. 2.

Referring now to FIG. 3, the pod 210, in the illustrative example, includes a set of rows 300, 310, 320, 330 of racks 340. Individual ones of the racks 340 may house multiple sleds (e.g., sixteen sleds) and provide power and data connections to the housed sleds, as described in more detail herein. In the illustrative example, the racks are connected to multiple pod switches 350, 360. The pod switch 350 includes a set of ports 352 to which the sleds of the racks of the pod 210 are connected and another set of ports 354 that connect the pod 210 to the spine switches 250 to provide connectivity to other pods in the data center 200. Similarly, the pod switch 360 includes a set of ports 362 to which the sleds of the racks of the pod 210 are connected and a set of ports 364 that connect the pod 210 to the spine switches 250. As such, the use of the pair of switches 350, 360 provides an amount of redundancy to the pod 210. For example, if either of the switches 350, 360 fails, the sleds in the pod 210 may still maintain data communication with the remainder of the data center 200 (e.g., sleds of other pods) through the other switch 350, 360. Furthermore, in the illustrative example, the switches 250, 350, 360 may be implemented as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that any one of the other pods 220, 230, 240 (as well as any additional pods of the data center 200) may be similarly structured as, and have components similar to, the pod 210 shown in and disclosed in regard to FIG. 3 (e.g., a given pod may have rows of racks housing multiple sleds as described above). Additionally, while two pod switches 350, 360 are shown, it should be understood that in other examples, a different number of pod switches may be present, providing even more failover capacity. In other examples, pods may be arranged differently than the rows-of-racks configuration shown in FIGS. 2 and 3. For example, a pod may include multiple sets of racks arranged radially, i.e., the racks are equidistant from a center switch.

Figure 4:
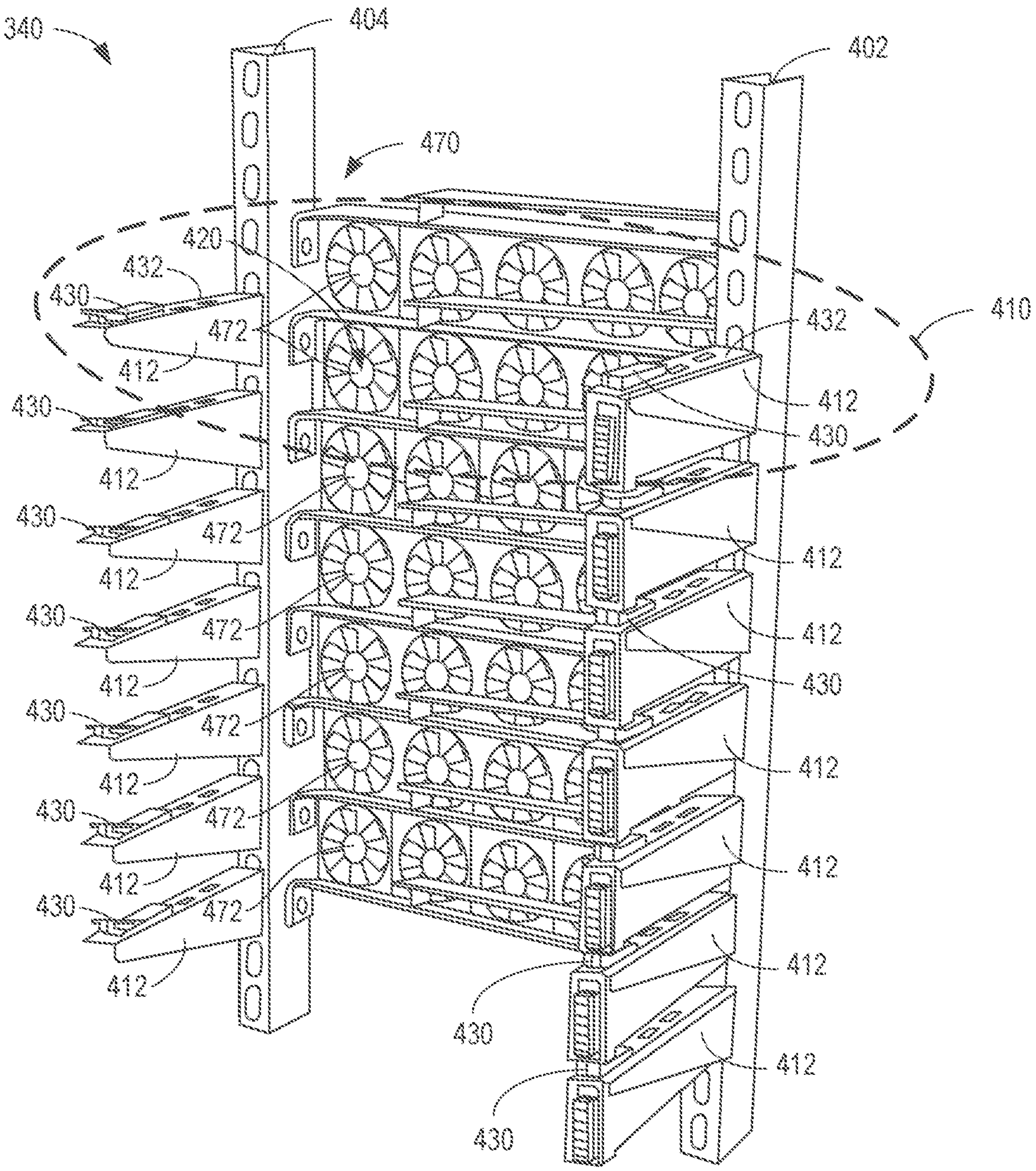
FIG. 4 is a perspective view of at least one example of a rack that may be included in the pod of FIG. 3.
Figure 5:
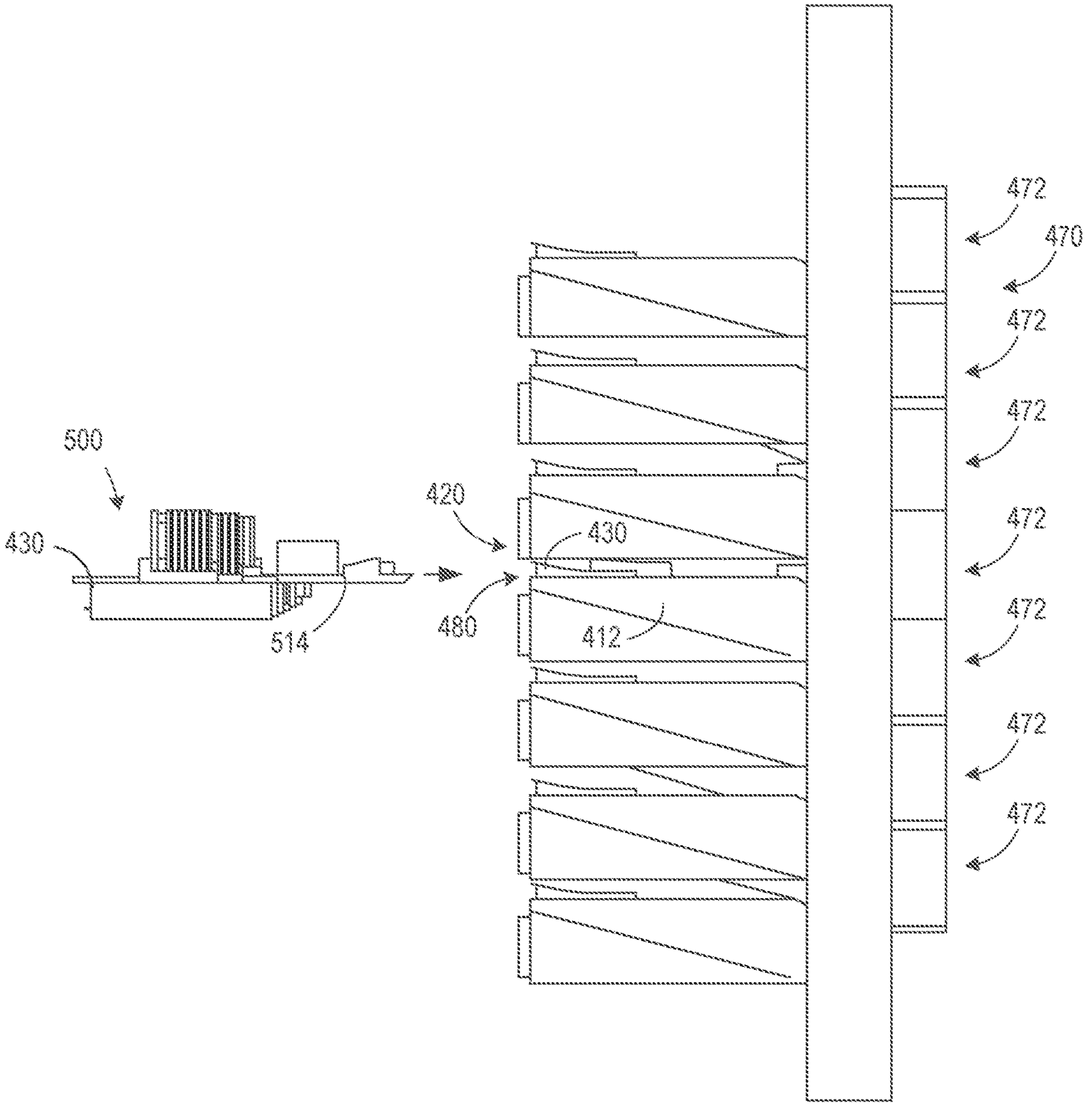
FIG. 5 is a side elevation view of the rack of FIG. 4.
Figure 6:
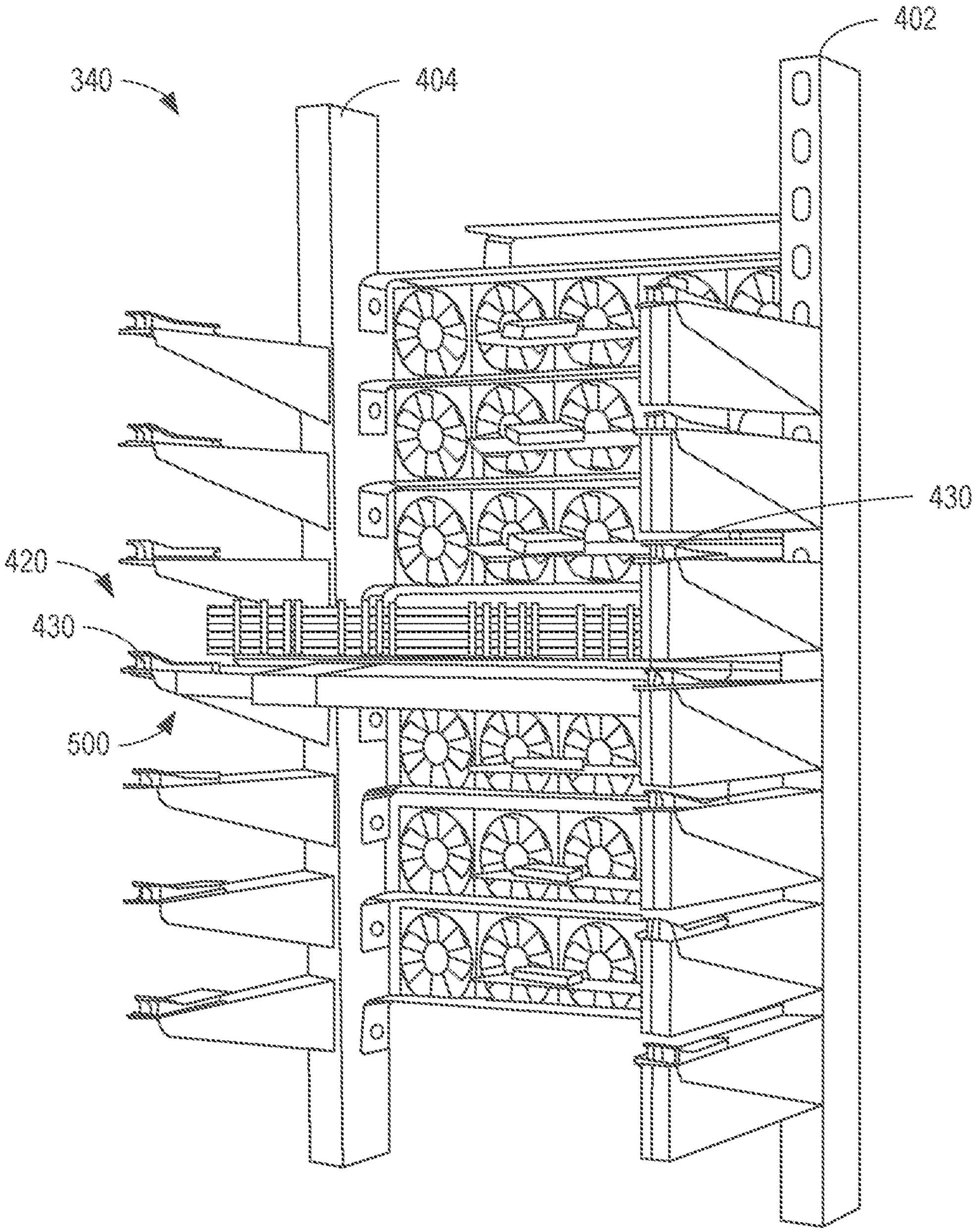
FIG. 6 is a perspective view of the rack of FIG. 4 having a sled mounted therein.

FIGS. 4-6 illustrate an example rack 340 of the data center 200. As shown in the illustrated example, the rack 340 includes two elongated support posts 402, 404, which are arranged vertically. For example, the elongated support posts 402, 404 may extend upwardly from a floor of the data center 200 when deployed. The rack 340 also includes one or more horizontal pairs 410 of elongated support arms 412 (identified in FIG. 4 via a dashed ellipse) configured to support a sled of the data center 200 as discussed below. One elongated support arm 412 of the pair of elongated support arms 412 extends outwardly from the elongated support post 402 and the other elongated support arm 412 extends outwardly from the elongated support post 404.

In the illustrative examples, at least some of the sleds of the data center 200 are chassis-less sleds. That is, such sleds have a chassis-less circuit board substrate on which physical resources (e.g., programmable circuitry, memory, accelerators, storage, etc.) are mounted as discussed in more detail below. As such, the rack 340 is configured to receive the chassis-less sleds. For example, a given pair 410 of the elongated support arms 412 defines a sled slot 420 of the rack 340, which is configured to receive a corresponding chassis-less sled. To do so, the elongated support arms 412 include corresponding circuit board guides 430 configured to receive the chassis-less circuit board substrate of the sled. The circuit board guides 430 are secured to, or otherwise mounted to, a top side 432 of the corresponding elongated support arms 412. For example, in the illustrative example, the circuit board guides 430 are mounted at a distal end of the corresponding elongated support arm 412 relative to the corresponding elongated support post 402, 404. For clarity of FIGS. 4-6, not every circuit board guide 430 may be referenced in each figure. In some examples, at least some of the sleds include a chassis and the racks 340 are suitably adapted to receive the chassis.

The circuit board guides 430 include an inner wall that defines a circuit board slot 480 configured to receive the chassis-less circuit board substrate of a sled 500 when the sled 500 is received in the corresponding sled slot 420 of the rack 340. To do so, as shown in FIG. 5, a user (or robot) aligns the chassis-less circuit board substrate of an illustrative chassis-less sled 500 to a sled slot 420. The user, or robot, may then slide the chassis-less circuit board substrate forward into the sled slot 420 such that each side edge 514 of the chassis-less circuit board substrate is received in a corresponding circuit board slot 480 of the circuit board guides 430 of the pair 410 of elongated support arms 412 that define the corresponding sled slot 420 as shown in FIG. 5. By having robotically accessible and robotically manipulable sleds including disaggregated resources, the different types of resource can be upgraded independently of one other and at their own optimized refresh rate. Furthermore, the sleds are configured to blindly mate with power and data communication cables in the rack 340, enhancing their ability to be quickly removed, upgraded, reinstalled, and/or replaced. As such, in some examples, the data center 200 may operate (e.g., execute workloads, undergo maintenance and/or upgrades, etc.) without human involvement on the data center floor. In other examples, a human may facilitate one or more maintenance or upgrade operations in the data center 200.

It should be appreciated that the circuit board guides 430 are dual sided. That is, a circuit board guide 430 includes an inner wall that defines a circuit board slot 480 on each side of the circuit board guide 430. In this way, the circuit board guide 430 can support a chassis-less circuit board substrate on either side. As such, a single additional elongated support post may be added to the rack 340 to turn the rack 340 into a two-rack solution that can hold twice as many sled slots 420 as shown in FIG. 4. The illustrative rack 340 includes seven pairs 410 of elongated support arms 412 that define seven corresponding sled slots 420. The sled slots 420 are configured to receive and support a corresponding sled 500 as discussed above. In other examples, the rack 340 may include additional or fewer pairs 410 of elongated support arms 412 (i.e., additional or fewer sled slots 420). It should be appreciated that because the sled 500 is chassis-less, the sled 500 may have an overall height that is different than typical servers. As such, in some examples, the height of a given sled slot 420 may be shorter than the height of a typical server (e.g., shorter than a single rank unit, referred to as "1U"). That is, the vertical distance between pairs 410 of elongated support arms 412 may be less than a standard rack unit "1U." Additionally, due to the relative decrease in height of the sled slots 420, the overall height of the rack 340 in some examples may be shorter than the height of traditional rack enclosures. For example, in some examples, the elongated support posts 402, 404 may have a length of six feet or less. Again, in other examples, the rack 340 may have different dimensions. For example, in some examples, the vertical distance between pairs 410 of elongated support arms 412 may be greater than a standard rack unit "1U". In such examples, the increased vertical distance between the sleds allows for larger heatsinks to be attached to the physical resources and for larger fans to be used (e.g., in the fan array 470 described below) for cooling the sleds, which in turn can allow the physical resources to operate at increased power levels. Further, it should be appreciated that the rack 340 does not include any walls, enclosures, or the like. Rather, the rack 340 is an enclosure-less rack that is opened to the local environment. In some cases, an end plate may be attached to one of the elongated support posts 402, 404 in those situations in which the rack 340 forms an end-of-row rack in the data center 200.

In some examples, various interconnects may be routed upwardly or downwardly through the elongated support posts 402, 404. To facilitate such routing, the elongated support posts 402, 404 include an inner wall that defines an inner chamber in which interconnects may be located. The interconnects routed through the elongated support posts 402, 404 may be implemented as any type of interconnects including, but not limited to, data or communication interconnects to provide communication connections to the sled slots 420, power interconnects to provide power to the sled slots 420, and/or other types of interconnects.

The rack 340, in the illustrative example, includes a support platform on which a corresponding optical data connector (not shown) is mounted. Such optical data connectors are associated with corresponding sled slots 420 and are configured to mate with optical data connectors of corresponding sleds 500 when the sleds 500 are received in the corresponding sled slots 420. In some examples, optical connections between components (e.g., sleds, racks, and switches) in the data center 200 are made with a blind mate optical connection. For example, a door on a given cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 340 also includes a fan array 470 coupled to the cross-support arms of the rack 340. The fan array 470 includes one or more rows of cooling fans 472, which are aligned in a horizontal line between the elongated support posts 402, 404. In the illustrative example, the fan array 470 includes a row of cooling fans 472 for the different sled slots 420 of the rack 340. As discussed above, the sleds 500 do not include any on-board cooling system in the illustrative example and, as such, the fan array 470 provides cooling for such sleds 500 received in the rack 340. In other examples, some or all of the sleds 500 can include on-board cooling systems. Further, in some examples, the sleds 500 and/or the racks 340 may include and/or incorporate a liquid and/or immersion cooling system to facilitate cooling of electronic component(s) on the sleds 500. The rack 340, in the illustrative example, also includes different power supplies associated with different ones of the sled slots 420. A given power supply is secured to one of the elongated support arms 412 of the pair 410 of elongated support arms 412 that define the corresponding sled slot 420. For example, the rack 340 may include a power supply coupled or secured to individual ones of the elongated support arms 412 extending from the elongated support post 402. A given power supply includes a power connector configured to mate with a power connector of a sled 500 when the sled 500 is received in the corresponding sled slot 420. In the illustrative example, the sled 500 does not include any on-board power supply and, as such, the power supplies provided in the rack 340 supply power to corresponding sleds 500 when mounted to the rack 340. A given power supply is configured to satisfy the power requirements for its associated sled, which can differ from sled to sled. Additionally, the power supplies provided in the rack 340 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 7:
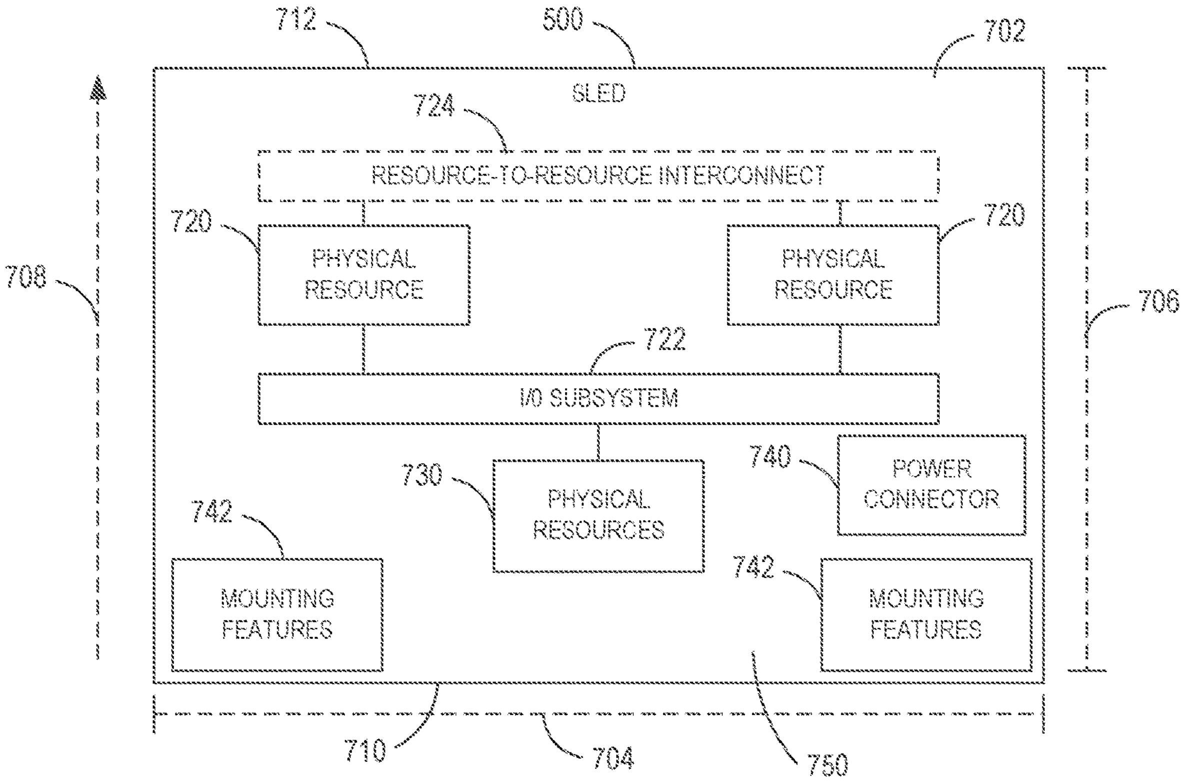
FIG. 7 is a is a block diagram of at least one example of a top side of the sled of FIG. 6.

Referring now to FIG. 7, the sled 500, in the illustrative example, is configured to be mounted in a corresponding rack 340 of the data center 200 as discussed above. In some examples, a give sled 500 may be optimized or otherwise configured for performing particular tasks, such as compute tasks, acceleration tasks, data storage tasks, etc. For example, the sled 500 may be implemented as a compute sled 900 as discussed below in regard to FIGS. 9 and 10, an accelerator sled 1100 as discussed below in regard to FIGS. 11 and 12, a storage sled 1300 as discussed below in regard to FIGS. 13 and 14, or as a sled optimized or otherwise configured to perform other specialized tasks, such as a memory sled 1500, discussed below in regard to FIG. 15.

As discussed above, the illustrative sled 500 includes a chassis-less circuit board substrate 702, which supports various physical resources (e.g., electrical components) mounted thereon. It should be appreciated that the circuit board substrate 702 is "chassis-less" in that the sled 500 does not include a housing or enclosure. Rather, the chassis-less circuit board substrate 702 is open to the local environment. The chassis-less circuit board substrate 702 may be formed from any material capable of supporting the various electrical components mounted thereon. For example, in an illustrative example, the chassis-less circuit board substrate 702 is formed from an FR-4 glass-reinforced epoxy laminate material. Other materials may be used to form the chassis-less circuit board substrate 702 in other examples.

As discussed in more detail below, the chassis-less circuit board substrate 702 includes multiple features that improve the thermal cooling characteristics of the various electrical components mounted on the chassis-less circuit board substrate 702. As discussed, the chassis-less circuit board substrate 702 does not include a housing or enclosure, which may improve the airflow over the electrical components of the sled 500 by reducing those structures that may inhibit air flow. For example, because the chassis-less circuit board substrate 702 is not positioned in an individual housing or enclosure, there is no vertically-arranged backplane (e.g., a back plate of the chassis) attached to the chassis-less circuit board substrate 702, which could inhibit air flow across the electrical components. Additionally, the chassis-less circuit board substrate 702 has a geometric shape configured to reduce the length of the airflow path across the electrical components mounted to the chassis-less circuit board substrate 702. For example, the illustrative chassis-less circuit board substrate 702 has a width 704 that is greater than a depth 706 of the chassis-less circuit board substrate 702. In one particular example, the chassis-less circuit board substrate 702 has a width of about 21 inches and a depth of about 9 inches, compared to a typical server that has a width of about 17 inches and a depth of about 39 inches. As such, an airflow path 708 that extends from a front edge 710 of the chassis-less circuit board substrate 702 toward a rear edge 712 has a shorter distance relative to typical servers, which may improve the thermal cooling characteristics of the sled 500. Furthermore, although not illustrated in FIG. 7, the various physical resources mounted to the chassis-less circuit board substrate 702 in this example are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 702 linearly in-line with each other along the direction of the airflow path 708 (i.e., along a direction extending from the front edge 710 toward the rear edge 712 of the chassis-less circuit board substrate 702). The placement and/or structure of the features may be suitable adapted when the electrical component(s) are being cooled via liquid (e.g., one phase or two phase cooling).

As discussed above, the illustrative sled 500 includes one or more physical resources 720 mounted to a top side 750 of the chassis-less circuit board substrate 702. Although two physical resources 720 are shown in FIG. 7, it should be appreciated that the sled 500 may include one, two, or more physical resources 720 in other examples. The physical resources 720 may be implemented as any type of programmable circuitry, controller, or other compute circuit capable of performing various tasks such as compute functions and/or controlling the functions of the sled 500 depending on, for example, the type or intended functionality of the sled 500. For example, as discussed in more detail below, the physical resources 720 may be implemented as high-performance processor circuitry in examples in which the sled 500 is implemented as a compute sled, as accelerator co-processor circuitry or circuits in examples in which the sled 500 is implemented as an accelerator sled, storage controllers in examples in which the sled 500 is implemented as a storage sled, or a set of memory devices in examples in which the sled 500 is implemented as a memory sled.

The sled 500 also includes one or more additional physical resources 730 mounted to the top side 750 of the chassis-less circuit board substrate 702. In the illustrative example, the additional physical resources include a network interface controller (NIC) as discussed in more detail below. Depending on the type and functionality of the sled 500, the physical resources 730 may include additional or other electrical components, circuits, and/or devices in other examples.

The physical resources 720 are communicatively coupled to the physical resources 730 via an input/output (I/O) subsystem 722. The I/O subsystem 722 may be implemented as circuitry and/or components to facilitate input/output operations with the physical resources 720, the physical resources 730, and/or other components of the sled 500. For example, the I/O subsystem 722 may be implemented as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative example, the I/O subsystem 722 is implemented as, or otherwise includes, a double data rate 4 (DDR4) data bus or a DDR5 data bus.

In some examples, the sled 500 may also include a resource-to-resource interconnect 724. The resource-to-resource interconnect 724 may be implemented as any type of communication interconnect capable of facilitating resource-to-resource communications. In the illustrative example, the resource-to-resource interconnect 724 is implemented as a high-speed point-to-point interconnect (e.g., faster than the I/O subsystem 722). For example, the resource-to-resource interconnect 724 may be implemented as a QuickPath Interconnect (QPI), an UltraPath Interconnect (UPI), or other high-speed point-to-point interconnect dedicated to resource-to-resource communications.

The sled 500 also includes a power connector 740 configured to mate with a corresponding power connector of the rack 340 when the sled 500 is mounted in the corresponding rack 340. The sled 500 receives power from a power supply of the rack 340 via the power connector 740 to supply power to the various electrical components of the sled 500. That is, the sled 500 does not include any local power supply (i.e., an on-board power supply) to provide power to the electrical components of the sled 500. The exclusion of a local or on-board power supply facilitates the reduction in the overall footprint of the chassis-less circuit board substrate 702, which may increase the thermal cooling characteristics of the various electrical components mounted on the chassis-less circuit board substrate 702 as discussed above. In some examples, voltage regulators are placed on a bottom side 850 (see FIG. 8) of the chassis-less circuit board substrate 702 directly opposite of programmable circuitry 920 (see FIG. 9), and power is routed from the voltage regulators to the programmable circuitry 920 by vias extending through the circuit board substrate 702. Such a configuration provides an increased thermal budget, additional current and/or voltage, and better voltage control relative to typical printed circuit boards in which processor power is delivered from a voltage regulator, in part, by printed circuit traces.

In some examples, the sled 500 may also include mounting features 742 configured to mate with a mounting arm, or other structure, of a robot to facilitate the placement of the sled 500 in a rack 340 by the robot. The mounting features 742 may be implemented as any type of physical structures that allow the robot to grasp the sled 500 without damaging the chassis-less circuit board substrate 702 or the electrical components mounted thereto. For example, in some examples, the mounting features 742 may be implemented as non-conductive pads attached to the chassis-less circuit board substrate 702. In other examples, the mounting features may be implemented as brackets, braces, or other similar structures attached to the chassis-less circuit board substrate 702. The particular number, shape, size, and/or make-up of the mounting feature 742 may depend on the design of the robot configured to manage the sled 500.

Figure 8:
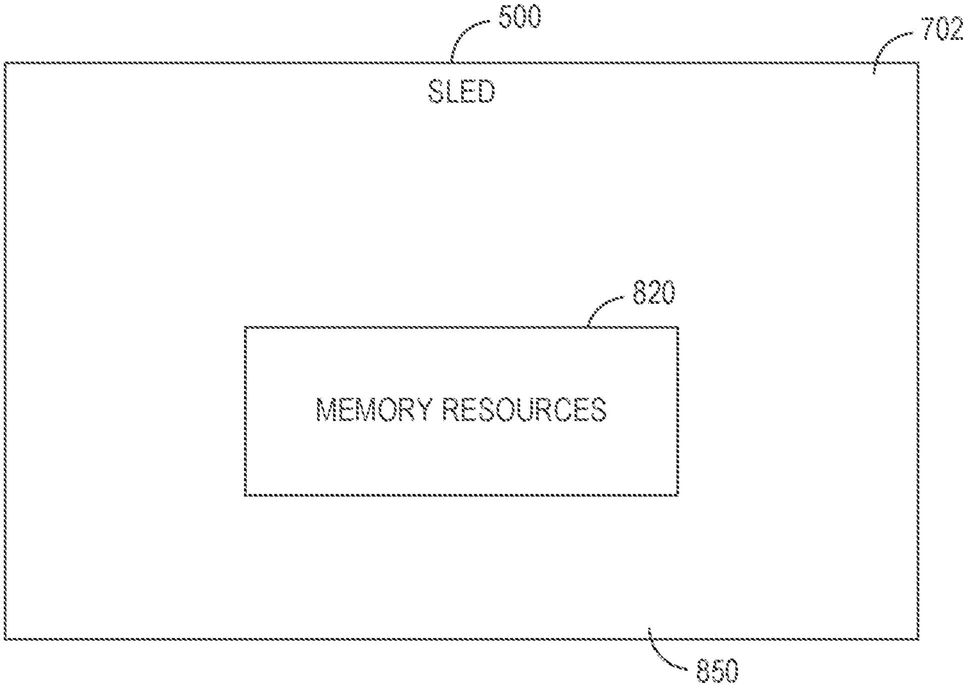
FIG. 8 is a block diagram of at least one example of a bottom side of the sled of FIG. 7.

Referring now to FIG. 8, in addition to the physical resources 730 mounted on the top side 750 of the chassis-less circuit board substrate 702, the sled 500 also includes one or more memory devices 820 mounted to a bottom side 850 of the chassis-less circuit board substrate 702. That is, the chassis-less circuit board substrate 702 is implemented as a double-sided circuit board. The physical resources 720 are communicatively coupled to the memory devices 820 via the I/O subsystem 722. For example, the physical resources 720 and the memory devices 820 may be communicatively coupled by one or more vias extending through the chassis-less circuit board substrate 702. Different ones of the physical resources 720 may be communicatively coupled to different sets of one or more memory devices 820 in some examples. Alternatively, in other examples, different ones of the physical resources 720 may be communicatively coupled to the same ones of the memory devices 820.

The memory devices 820 may be implemented as any type of memory device capable of storing data for the physical resources 720 during operation of the sled 500, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular examples, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one example, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some examples, the memory device may include a transistor-less stackable cross point architecture in which memory cells sit at the intersection of word lines and bit lines and are individually addressable and in which bit storage is based on a change in bulk resistance.

Figure 9:
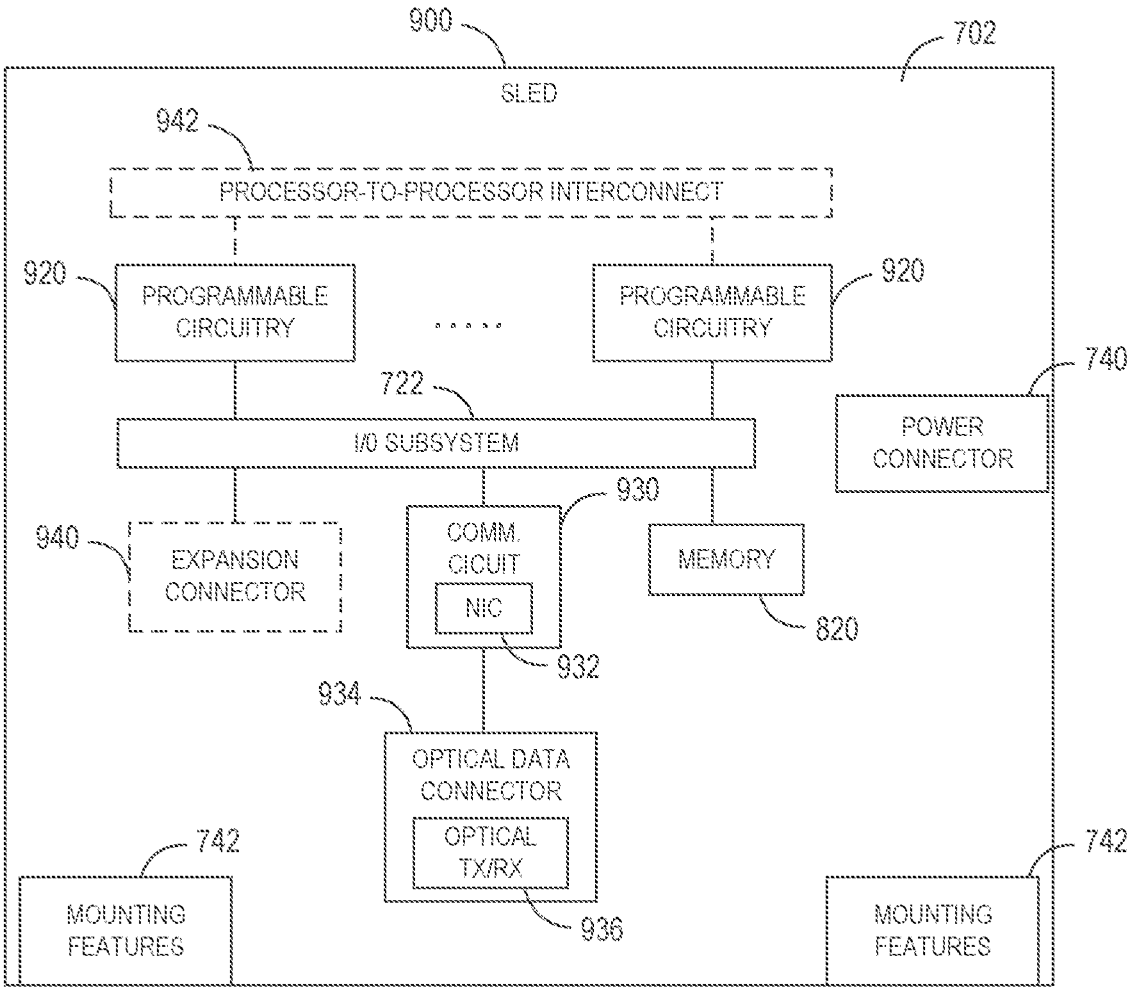
FIG. 9 is a block diagram of at least one example of a compute sled usable in the data center of FIG. 2.

Referring now to FIG. 9, in some examples, the sled 500 may be implemented as a compute sled 900. The compute sled 900 is optimized, or otherwise configured, to perform compute tasks. As discussed above, the compute sled 900 may rely on other sleds, such as acceleration sleds and/or storage sleds, to perform such compute tasks. The compute sled 900 includes various physical resources (e.g., electrical components) similar to the physical resources of the sled 500, which have been identified in FIG. 9 using the same reference numbers. The description of such components provided above in regard to FIGS. 7 and 8 applies to the corresponding components of the compute sled 900 and is not repeated herein for clarity of the description of the compute sled 900.

In the illustrative compute sled 900, the physical resources 720 include programmable circuitry 920. Although only two blocks of programmable circuitry 920 are shown in FIG. 9, it should be appreciated that the compute sled 900 may include additional programmable circuits 920 in other examples. Illustratively, the programmable circuitry 920 corresponds to high-performance processor circuitry 920 and may be configured to operate at a relatively high power rating. Although the high-performance programmable circuitry 920 generates additional heat operating at power ratings greater than typical processor circuitry (which operate at around 155-230 W), the enhanced thermal cooling characteristics of the chassis-less circuit board substrate 702 discussed above facilitate the higher power operation. For example, in the illustrative example, the programmable circuitry 920 is configured to operate at a power rating of at least 250 W. In some examples, the programmable circuitry 920 may be configured to operate at a power rating of at least 350 W.

In some examples, the compute sled 900 may also include a programmable circuitry-to-programmable circuitry interconnect 942. Similar to the resource-to-resource interconnect 724 of the sled 500 discussed above, the programmable circuitry-to-programmable circuitry interconnect 942 may be implemented as any type of communication interconnect capable of facilitating programmable circuitry-to-programmable circuitry interconnect 942 communications. In the illustrative example, the programmable circuitry-to-programmable circuitry interconnect 942 is implemented as a high-speed point-to-point interconnect (e.g., faster than the I/O subsystem 722). For example, the programmable circuitry-to-programmable circuitry interconnect 942 may be implemented as a QuickPath Interconnect (QPI), an Ultra- Path Interconnect (UPI), or other high-speed point-to-point interconnect dedicated to programmable circuitry-to-programmable circuitry communications.

The compute sled 900 also includes a communication circuit 930. The illustrative communication circuit 930 includes a network interface controller (NIC) 932, which may also be referred to as a host fabric interface (HFI). The NIC 932 may be implemented as, or otherwise include, any type of integrated circuit, discrete circuits, controller chips, chipsets, add-in-boards, daughtercards, network interface cards, or other devices that may be used by the compute sled 900 to connect with another compute device (e.g., with other sleds 500). In some examples, the NIC 932 may be implemented as part of a system-on-a-chip (SoC) that includes one or more processor circuits, or included on a multichip package that also contains one or more processor circuits. In some examples, the NIC 932 may include a local processor circuit (not shown) and/or a local memory (not shown) that are both local to the NIC 932. In such examples, the local processor circuit of the NIC 932 may be capable of performing one or more of the functions of the programmable circuitry 920. Additionally or alternatively, in such examples, the local memory of the NIC 932 may be integrated into one or more components of the compute sled at the board level, socket level, chip level, and/or other levels.

The communication circuit 930 is communicatively coupled to an optical data connector 934. The optical data connector 934 is configured to mate with a corresponding optical data connector of the rack 340 when the compute sled 900 is mounted in the rack 340. Illustratively, the optical data connector 934 includes a plurality of optical fibers which lead from a mating surface of the optical data connector 934 to an optical transceiver 936. The optical transceiver 936 is configured to convert incoming optical signals from the rack-side optical data connector to electrical signals and to convert electrical signals to outgoing optical signals to the rack-side optical data connector. Although shown as forming part of the optical data connector 934 in the illustrative example, the optical transceiver 936 may form a portion of the communication circuit 930 in other examples.

In some examples, the compute sled 900 may also include an expansion connector 940. In such examples, the expansion connector 940 is configured to mate with a corresponding connector of an expansion chassis-less circuit board substrate to provide additional physical resources to the compute sled 900. The additional physical resources may be used, for example, by the programmable circuitry 920 during operation of the compute sled 900. The expansion chassis-less circuit board substrate may be substantially similar to the chassis-less circuit board substrate 702 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processor circuitry, memory devices, storage devices, and/or accelerator circuits including, for example, field programmable gate arrays (FPGA), application-specific integrated circuits (ASICs), security co-processor circuits, graphics processing units (GPUs), machine learning circuits, or other specialized processor circuits, controllers, devices, and/or circuits.

Figure 10:
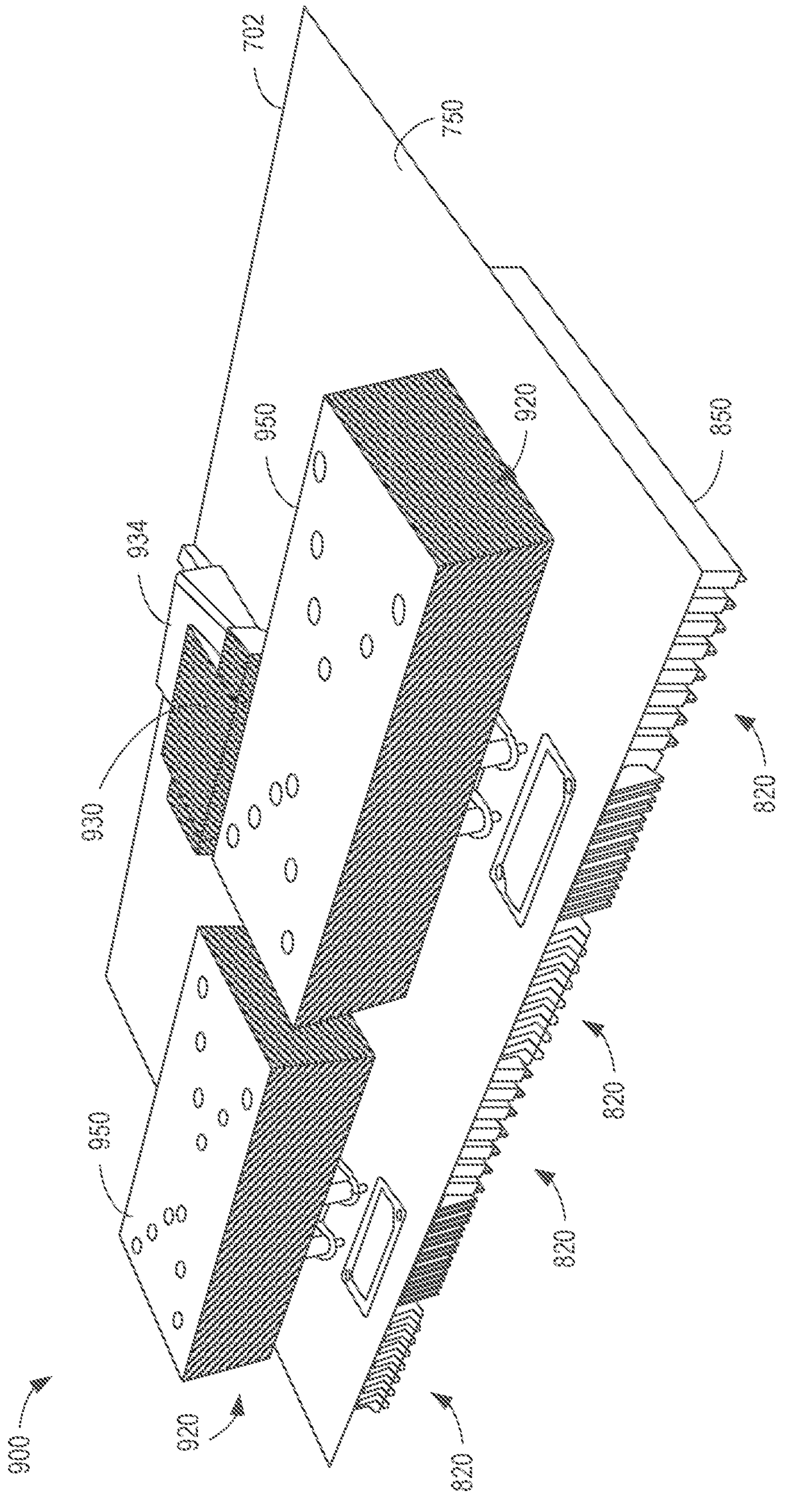
FIG. 10 is a top perspective view of at least one example of the compute sled of FIG. 9.

Referring now to FIG. 10, an illustrative example of the compute sled 900 is shown. As shown, the programmable circuitry 920, communication circuit 930, and optical data connector 934 are mounted to the top side 750 of the chassis-less circuit board substrate 702. Any suitable attachment or mounting technology may be used to mount the physical resources of the compute sled 900 to the chassis-less circuit board substrate 702. For example, the various physical resources may be mounted in corresponding sockets (e.g., a processor circuit socket), holders, or brackets. In some cases, some of the electrical components may be directly mounted to the chassis-less circuit board substrate 702 via soldering or similar techniques.

As discussed above, the separate programmable circuitry 920 and the communication circuit 930 are mounted to the top side 750 of the chassis-less circuit board substrate 702 such that no two heat-producing, electrical components shadow each other. In the illustrative example, the programmable circuitry 920 and the communication circuit 930 are mounted in corresponding locations on the top side 750 of the chassis-less circuit board substrate 702 such that no two of those physical resources are linearly in-line with others along the direction of the airflow path 708. It should be appreciated that, although the optical data connector 934 is in-line with the communication circuit 930, the optical data connector 934 produces no or nominal heat during operation.

The memory devices 820 of the compute sled 900 are mounted to the bottom side 850 of the of the chassis-less circuit board substrate 702 as discussed above in regard to the sled 500. Although mounted to the bottom side 850, the memory devices 820 are communicatively coupled to the programmable circuitry 920 located on the top side 750 via the I/O subsystem 722. Because the chassis-less circuit board substrate 702 is implemented as a double-sided circuit board, the memory devices 820 and the programmable circuitry 920 may be communicatively coupled by one or more vias, connectors, or other mechanisms extending through the chassis-less circuit board substrate 702. Different programmable circuitry 920 (e.g., different processor circuitry) may be communicatively coupled to a different set of one or more memory devices 820 in some examples. Alternatively, in other examples, different programmable circuitry 920 (e.g., different processor circuitry) may be communicatively coupled to the same ones of the memory devices 820. In some examples, the memory devices 820 may be mounted to one or more memory mezzanines on the bottom side of the chassis-less circuit board substrate 702 and may interconnect with a corresponding programmable circuitry 920 through a ball-grid array.

Different programmable circuitry 920 (e.g., different processor circuitry) include and/or is associated with corresponding heatsinks 950 secured thereto. Due to the mounting of the memory devices 820 to the bottom side 850 of the chassis-less circuit board substrate 702 (as well as the vertical spacing of the sleds 500 in the corresponding rack 340), the top side 750 of the chassis-less circuit board substrate 702 includes additional "free" area or space that facilitates the use of heatsinks 950 having a larger size relative to traditional heatsinks used in typical servers. Additionally, due to the improved thermal cooling characteristics of the chassis-less circuit board substrate 702, none of the programmable circuitry heatsinks 950 include cooling fans attached thereto. That is, the heatsinks 950 may be fan-less heatsinks. In some examples, the heatsinks 950 mounted atop the programmable circuitry 920 may overlap with the heatsink attached to the communication circuit 930 in the direction of the airflow path 708 due to their increased size, as illustratively suggested by FIG. 10.

Figure 11:
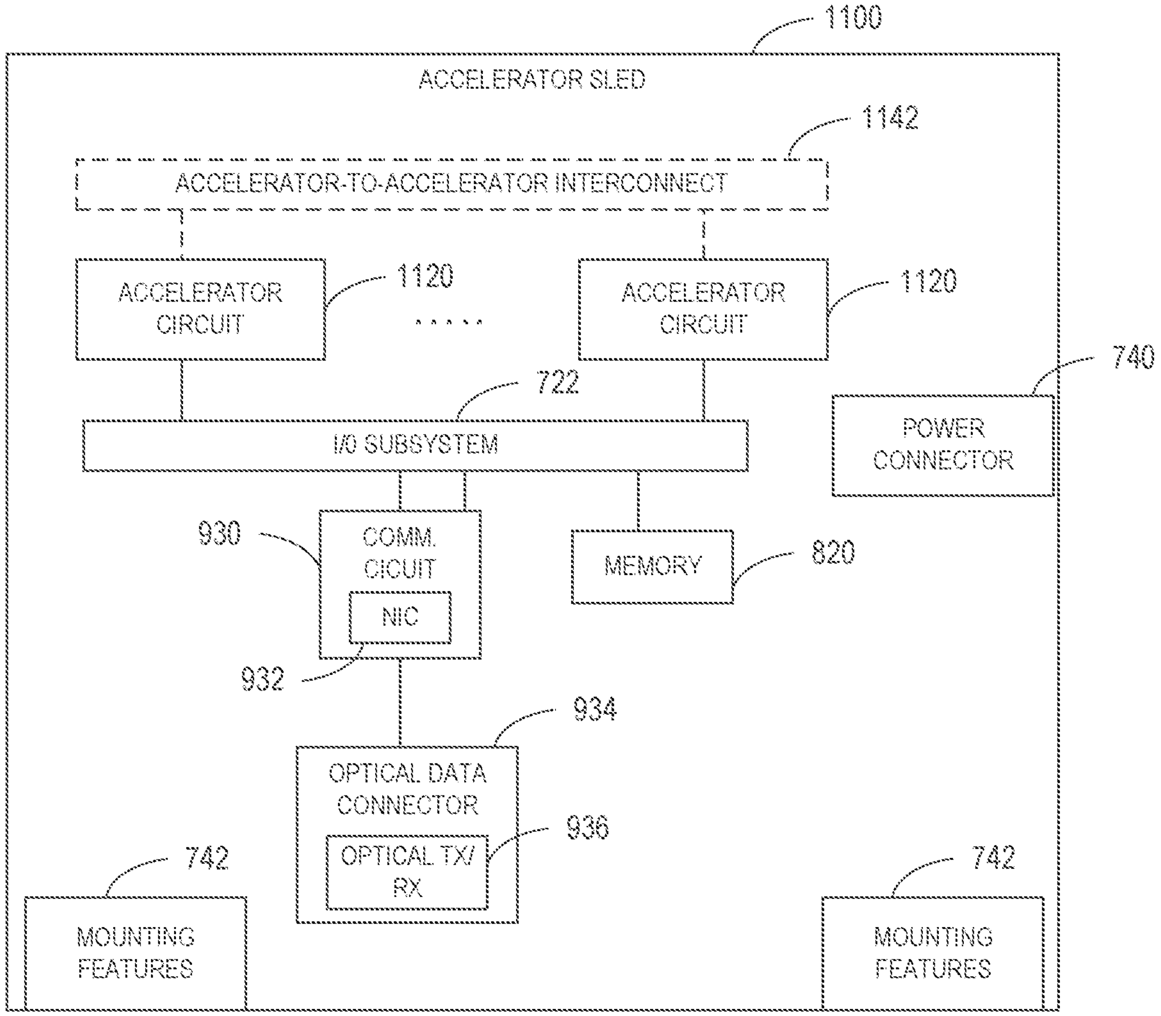
FIG. 11 is a block diagram of at least one example of an accelerator sled usable in the data center of FIG. 2.

Referring now to FIG. 11, in some examples, the sled 500 may be implemented as an accelerator sled 1100. The accelerator sled 1100 is configured, to perform specialized compute tasks, such as machine learning, encryption, hashing, or other computational-intensive task. In some examples, for example, a compute sled 900 may offload tasks to the accelerator sled 1100 during operation. The accelerator sled 1100 includes various components similar to components of the sled 500 and/or the compute sled 900, which have been identified in FIG. 11 using the same reference numbers. The description of such components provided above in regard to FIGS. 7, 8, and 9 apply to the corresponding components of the accelerator sled 1100 and is not repeated herein for clarity of the description of the accelerator sled 1100.

Figure 12:
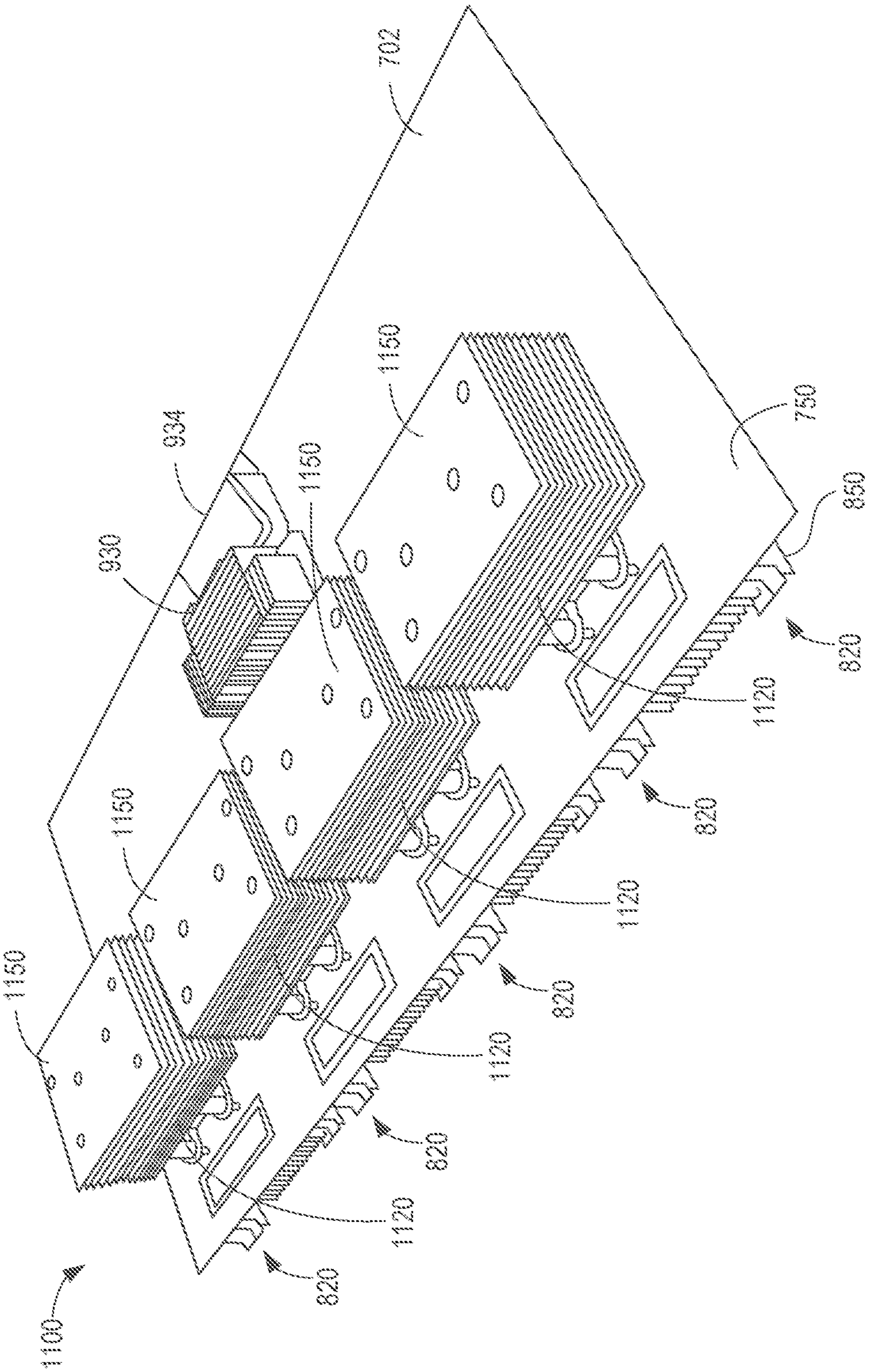
FIG. 12 is a top perspective view of at least one example of the accelerator sled of FIG. 11.

In the illustrative accelerator sled 1100, the physical resources 720 include accelerator circuits 1120. Although only two accelerator circuits 1120 are shown in FIG. 11, it should be appreciated that the accelerator sled 1100 may include additional accelerator circuits 1120 in other examples. For example, as shown in FIG. 12, the accelerator sled 1100 may include four accelerator circuits 1120. The accelerator circuits 1120 may be implemented as any type of processor circuitry, co-processor circuitry, compute circuit, or other device capable of performing compute or processing operations. For example, the accelerator circuits 1120 may be implemented as, for example, field programmable gate arrays (FPGA), application-specific integrated circuits (ASICs), security co-processor circuitry, graphics processing units (GPUs), neuromorphic processor units, quantum computers, machine learning circuits, or other specialized processor circuitry, controllers, devices, and/or circuits.

In some examples, the accelerator sled 1100 may also include an accelerator-to-accelerator interconnect 1142. Similar to the resource-to-resource interconnect 724 of the sled 500 discussed above, the accelerator-to-accelerator interconnect 1142 may be implemented as any type of communication interconnect capable of facilitating accelerator-to-accelerator communications. In the illustrative example, the accelerator-to-accelerator interconnect 1142 is implemented as a high-speed point-to-point interconnect (e.g., faster than the I/O subsystem 722). For example, the accelerator-to-accelerator interconnect 1142 may be implemented as a QuickPath Interconnect (QPI), an UltraPath Interconnect (UPI), or other high-speed point-to-point interconnect dedicated to programmable circuitry-to-programmable circuitry communications. In some examples, the accelerator circuits 1120 may be daisy-chained with a primary accelerator circuit 1120 connected to the NIC 932 and memory 820 through the I/O subsystem 722 and a secondary accelerator circuit 1120 connected to the NIC 932 and memory 820 through a primary accelerator circuit 1120.

Referring now to FIG. 12, an illustrative example of the accelerator sled 1100 is shown. As discussed above, the accelerator circuits 1120, the communication circuit 930, and the optical data connector 934 are mounted to the top side 750 of the chassis-less circuit board substrate 702. Again, the individual accelerator circuits 1120 and communication circuit 930 are mounted to the top side 750 of the chassis-less circuit board substrate 702 such that no two heat-producing, electrical components shadow each other as discussed above. The memory devices 820 of the accelerator sled 1100 are mounted to the bottom side 850 of the of the chassis-less circuit board substrate 702 as discussed above in regard to the sled 500. Although mounted to the bottom side 850, the memory devices 820 are communicatively coupled to the accelerator circuits 1120 located on the top side 750 via the I/O subsystem 722 (e.g., through vias). Further, the accelerator circuits 1120 may include and/or be associated with a heatsink 1150 that is larger than a traditional heatsink used in a server. As discussed above with reference to the heatsinks 950 of FIG. 9, the heatsinks 1150 may be larger than traditional heatsinks because of the "free" area provided by the memory resources 820 being located on the bottom side 850 of the chassis-less circuit board substrate 702 rather than on the top side 750.

Figure 13:
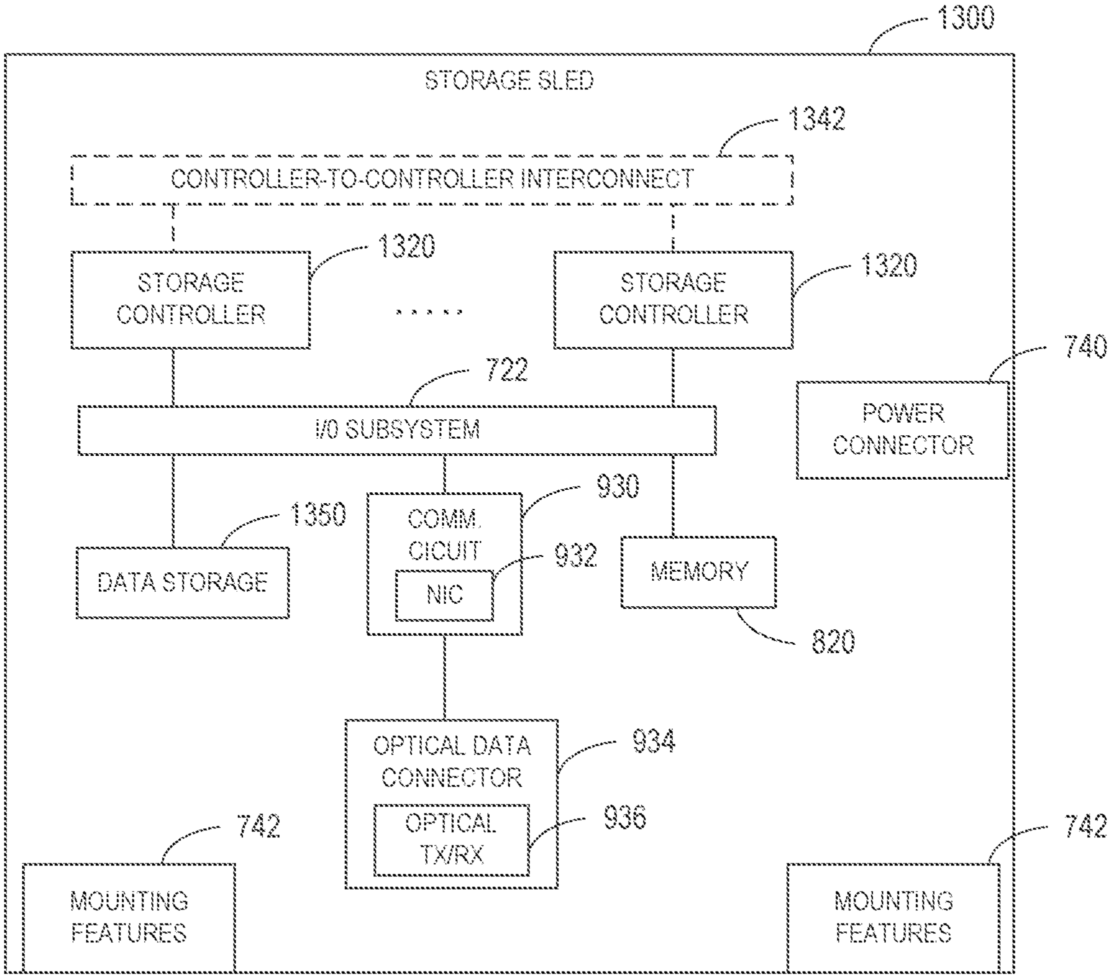
FIG. 13 is a block diagram of at least one example of a storage sled usable in the data center of FIG. 2.

Referring now to FIG. 13, in some examples, the sled 500 may be implemented as a storage sled 1300. The storage sled 1300 is configured, to store data in a data storage 1350 local to the storage sled 1300. For example, during operation, a compute sled 900 or an accelerator sled 1100 may store and retrieve data from the data storage 1350 of the storage sled 1300. The storage sled 1300 includes various components similar to components of the sled 500 and/or the compute sled 900, which have been identified in FIG. 13 using the same reference numbers. The description of such components provided above in regard to FIGS. 7, 8, and 9 apply to the corresponding components of the storage sled 1300 and is not repeated herein for clarity of the description of the storage sled 1300.

In the illustrative storage sled 1300, the physical resources 720 includes storage controllers 1320. Although only two storage controllers 1320 are shown in FIG. 13, it should be appreciated that the storage sled 1300 may include additional storage controllers 1320 in other examples. The storage controllers 1320 may be implemented as any type of programmable circuitry, controller, or control circuit capable of controlling the storage and retrieval of data into the data storage 1350 based on requests received via the communication circuit 930. In the illustrative example, the storage controllers 1320 are implemented as relatively low-power programmable circuitry or controllers. For example, in some examples, the storage controllers 1320 may be configured to operate at a power rating of about 75 watts.

In some examples, the storage sled 1300 may also include a controller-to-controller interconnect 1342. Similar to the resource-to-resource interconnect 724 of the sled 500 discussed above, the controller-to-controller interconnect 1342 may be implemented as any type of communication interconnect capable of facilitating controller-to-controller communications. In the illustrative example, the controller-to-controller interconnect 1342 is implemented as a high-speed point-to-point interconnect (e.g., faster than the I/O subsystem 722). For example, the controller-to-controller interconnect 1342 may be implemented as a QuickPath Interconnect (QPI), an UltraPath Interconnect (UPI), or other high-speed point-to-point interconnect dedicated to programmable circuitry-to-programmable circuitry communications.

Figure 14:
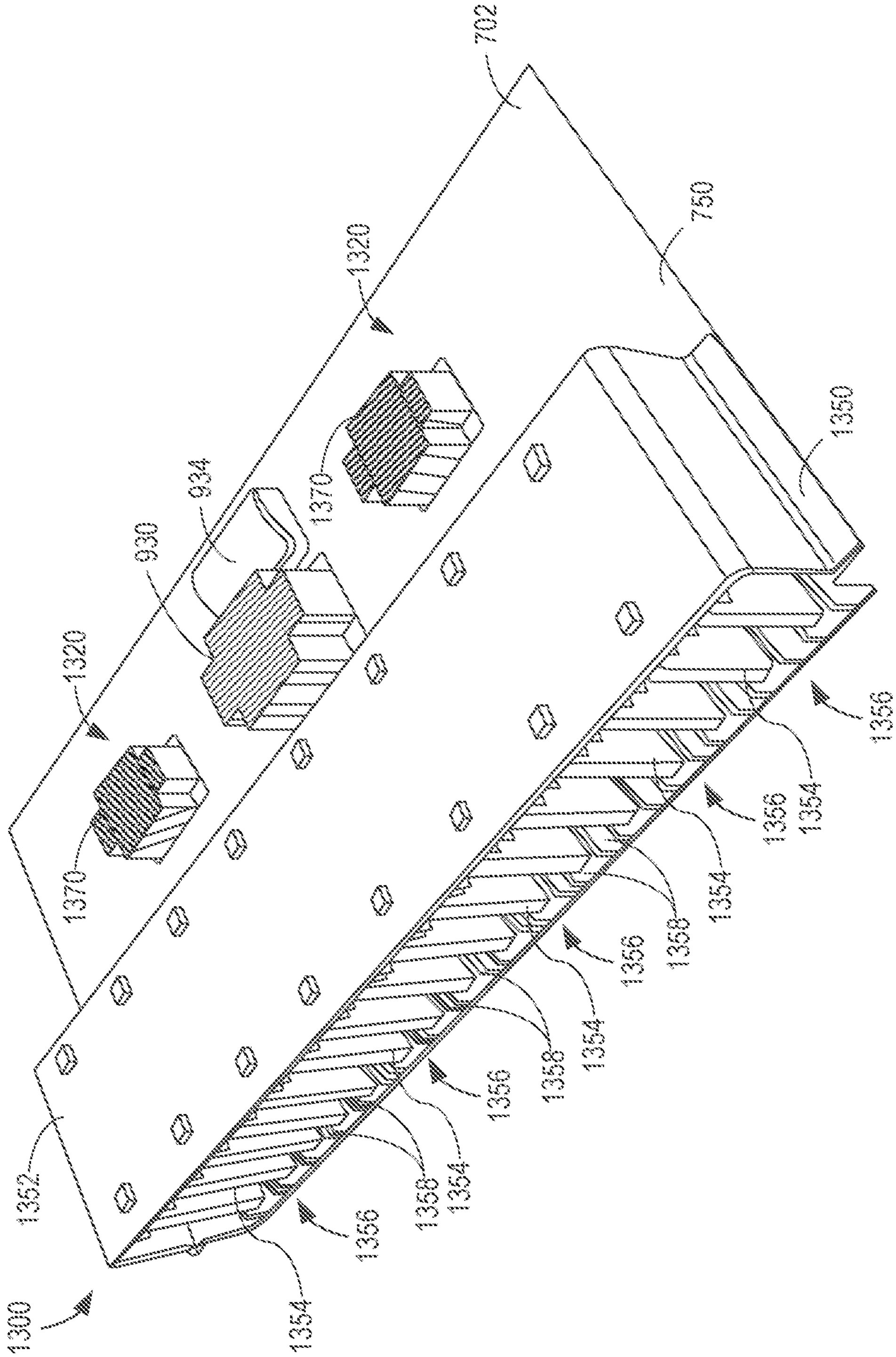
FIG. 14 is a top perspective view of at least one example of the storage sled of FIG. 13.

Referring now to FIG. 14, an illustrative example of the storage sled 1300 is shown. In the illustrative example, the data storage 1350 is implemented as, or otherwise includes, a storage cage 1352 configured to house one or more solid state drives (SSDs) 1354. To do so, the storage cage 1352 includes a number of mounting slots 1356, which are configured to receive corresponding solid state drives 1354. The mounting slots 1356 include a number of drive guides 1358 that cooperate to define an access opening of the corresponding mounting slot 1356. The storage cage 1352 is secured to the chassis-less circuit board substrate 702 such that the access openings face away from (i.e., toward the front of) the chassis-less circuit board substrate 702. As such, solid state drives 1354 are accessible while the storage sled 1300 is mounted in a corresponding rack 340. For example, a solid state drive 1354 may be swapped out of a rack 340 (e.g., via a robot) while the storage sled 1300 remains mounted in the corresponding rack 340.

The storage cage 1352 illustratively includes sixteen mounting slots 1356 and is capable of mounting and storing sixteen solid state drives 1354. The storage cage 1352 may be configured to store additional or fewer solid state drives 1354 in other examples. Additionally, in the illustrative example, the solid state drives are mounted vertically in the storage cage 1352, but may be mounted in the storage cage 1352 in a different orientation in other examples. A given solid state drive 1354 may be implemented as any type of data storage device capable of storing long term data. To do so, the solid state drives 1354 may include volatile and non-volatile memory devices discussed above.

As shown in FIG. 14, the storage controllers 1320, the communication circuit 930, and the optical data connector 934 are illustratively mounted to the top side 750 of the chassis-less circuit board substrate 702. Again, as discussed above, any suitable attachment or mounting technology may be used to mount the electrical components of the storage sled 1300 to the chassis-less circuit board substrate 702 including, for example, sockets (e.g., a processor circuit socket), holders, brackets, soldered connections, and/or other mounting or securing techniques.

As discussed above, the individual storage controllers 1320 and the communication circuit 930 are mounted to the top side 750 of the chassis-less circuit board substrate 702 such that no two heat-producing, electrical components shadow each other. For example, the storage controllers 1320 and the communication circuit 930 are mounted in corresponding locations on the top side 750 of the chassis-less circuit board substrate 702 such that no two of those electrical components are linearly in-line with each other along the direction of the airflow path 708.

The memory devices 820 (not shown in FIG. 14) of the storage sled 1300 are mounted to the bottom side 850 (not shown in FIG. 14) of the chassis-less circuit board substrate 702 as discussed above in regard to the sled 500. Although mounted to the bottom side 850, the memory devices 820 are communicatively coupled to the storage controllers 1320 located on the top side 750 via the I/O subsystem 722. Again, because the chassis-less circuit board substrate 702 is implemented as a double-sided circuit board, the memory devices 820 and the storage controllers 1320 may be communicatively coupled by one or more vias, connectors, or other mechanisms extending through the chassis-less circuit board substrate 702. The storage controllers 1320 include and/or are associated with a heatsink 1370 secured thereto. As discussed above, due to the improved thermal cooling characteristics of the chassis-less circuit board substrate 702 of the storage sled 1300, none of the heatsinks 1370 include cooling fans attached thereto. That is, the heatsinks 1370 may be fan-less heatsinks.

Figure 15:
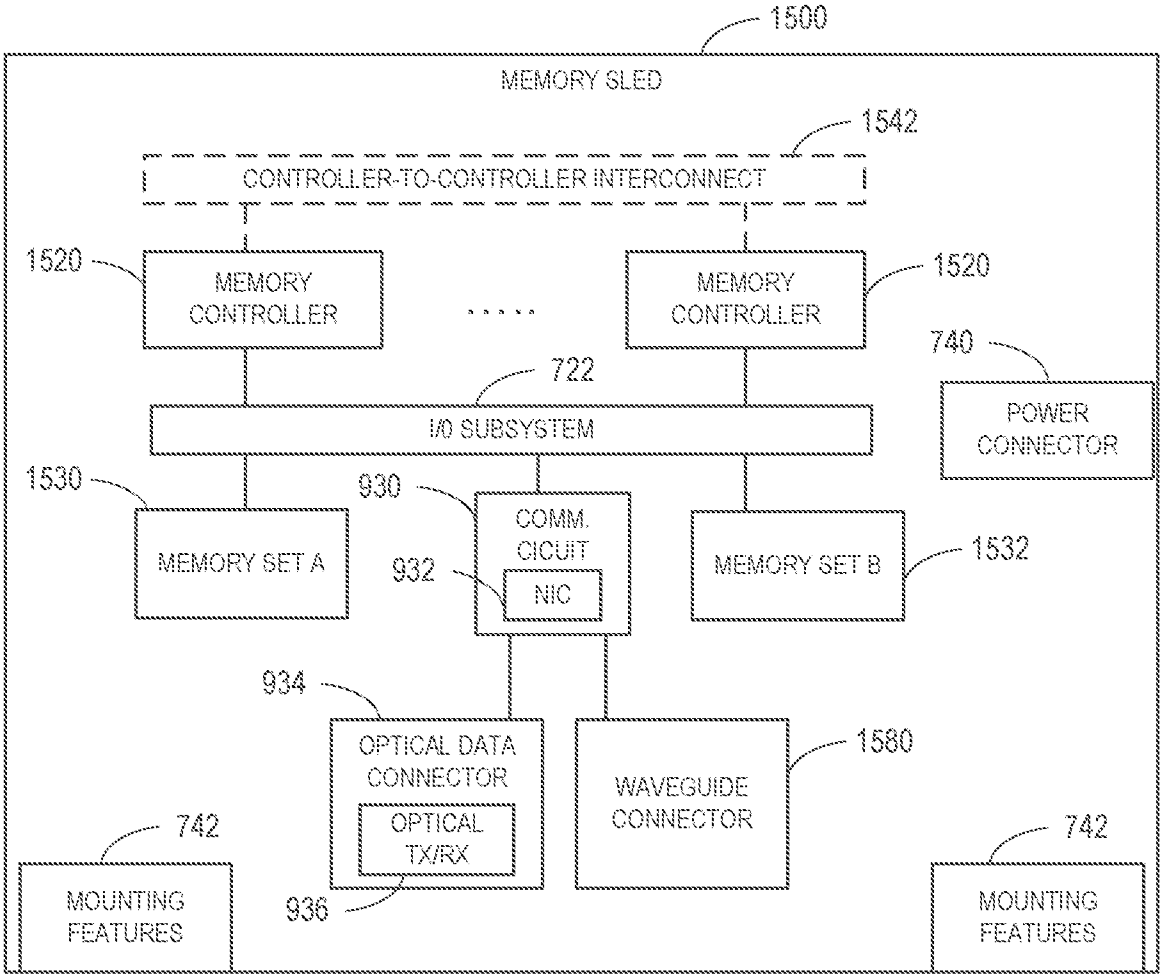
FIG. 15 is a block diagram of at least one example of a memory sled usable in the data center of FIG. 2.

Referring now to FIG. 15, in some examples, the sled 500 may be implemented as a memory sled 1500. The storage sled 1500 is optimized, or otherwise configured, to provide other sleds 500 (e.g., compute sleds 900, accelerator sleds 1100, etc.) with access to a pool of memory (e.g., in two or more sets 1530, 1532 of memory devices 820) local to the memory sled 1300. For example, during operation, a compute sled 900 or an accelerator sled 1100 may remotely write to and/or read from one or more of the memory sets 1530, 1532 of the memory sled 1300 using a logical address space that maps to physical addresses in the memory sets 1530, 1532. The memory sled 1500 includes various components similar to components of the sled 500 and/or the compute sled 900, which have been identified in FIG. 15 using the same reference numbers. The description of such components provided above in regard to FIGS. 7, 8, and 9 apply to the corresponding components of the memory sled 1500 and is not repeated herein for clarity of the description of the memory sled 1500.

In the illustrative memory sled 1500, the physical resources 720 include memory controllers 1520. Although only two memory controllers 1520 are shown in FIG. 15, it should be appreciated that the memory sled 1500 may include additional memory controllers 1520 in other examples. The memory controllers 1520 may be implemented as any type of programmable circuitry, controller, or control circuit capable of controlling the writing and reading of data into the memory sets 1530, 1532 based on requests received via the communication circuit 930. In the illustrative example, the memory controllers 1520 are connected to corresponding memory sets 1530, 1532 to write to and read from memory devices 820 (not shown) within the corresponding memory set 1530, 1532 and enforce any permissions (e.g., read, write, etc.) associated with sled 500 that has sent a request to the memory sled 1500 to perform a memory access operation (e.g., read or write).

In some examples, the memory sled 1500 may also include a controller-to-controller interconnect 1542. Similar to the resource-to-resource interconnect 724 of the sled 500 discussed above, the controller-to-controller interconnect 1542 may be implemented as any type of communication interconnect capable of facilitating controller-to-controller communications. In the illustrative example, the controller-to-controller interconnect 1542 is implemented as a high-speed point-to-point interconnect (e.g., faster than the I/O subsystem 722). For example, the controller-to-controller interconnect 1542 may be implemented as a QuickPath Interconnect (QPI), an UltraPath Interconnect (UPI), or other high-speed point-to-point interconnect dedicated to programmable circuitry-to-programmable circuitry communications. As such, in some examples, a memory controller 1520 may access, through the controller-to-controller interconnect 1542, memory that is within the memory set 1532 associated with another memory controller 1520. In some examples, a scalable memory controller is made of multiple smaller memory controllers, referred to herein as "chiplets", on a memory sled (e.g., the memory sled 1500). The chiplets may be interconnected (e.g., using EMIB (Embedded Multi-Die Interconnect Bridge) technology). The combined chiplet memory controller may scale up to a relatively large number of memory controllers and I/O ports, (e.g., up to 16 memory channels). In some examples, the memory controllers 1520 may implement a memory interleave (e.g., one memory address is mapped to the memory set 1530, the next memory address is mapped to the memory set 1532, and the third address is mapped to the memory set 1530, etc.). The interleaving may be managed within the memory controllers 1520, or from CPU sockets (e.g., of the compute sled 900) across network links to the memory sets 1530, 1532, and may improve the latency associated with performing memory access operations as compared to accessing contiguous memory addresses from the same memory device.

Further, in some examples, the memory sled 1500 may be connected to one or more other sleds 500 (e.g., in the same rack 340 or an adjacent rack 340) through a waveguide, using the waveguide connector 1580. In the illustrative example, the waveguides are 74 millimeter waveguides that provide 16 Rx (i.e., receive) lanes and 16 Tx (i.e., transmit) lanes. Different ones of the lanes, in the illustrative example, are either 16 GHz or 32 GHz. In other examples, the frequencies may be different. Using a waveguide may provide high throughput access to the memory pool (e.g., the memory sets 1530, 1532) to another sled (e.g., a sled 500 in the same rack 340 or an adjacent rack 340 as the memory sled 1500) without adding to the load on the optical data connector 934.

Figure 16:
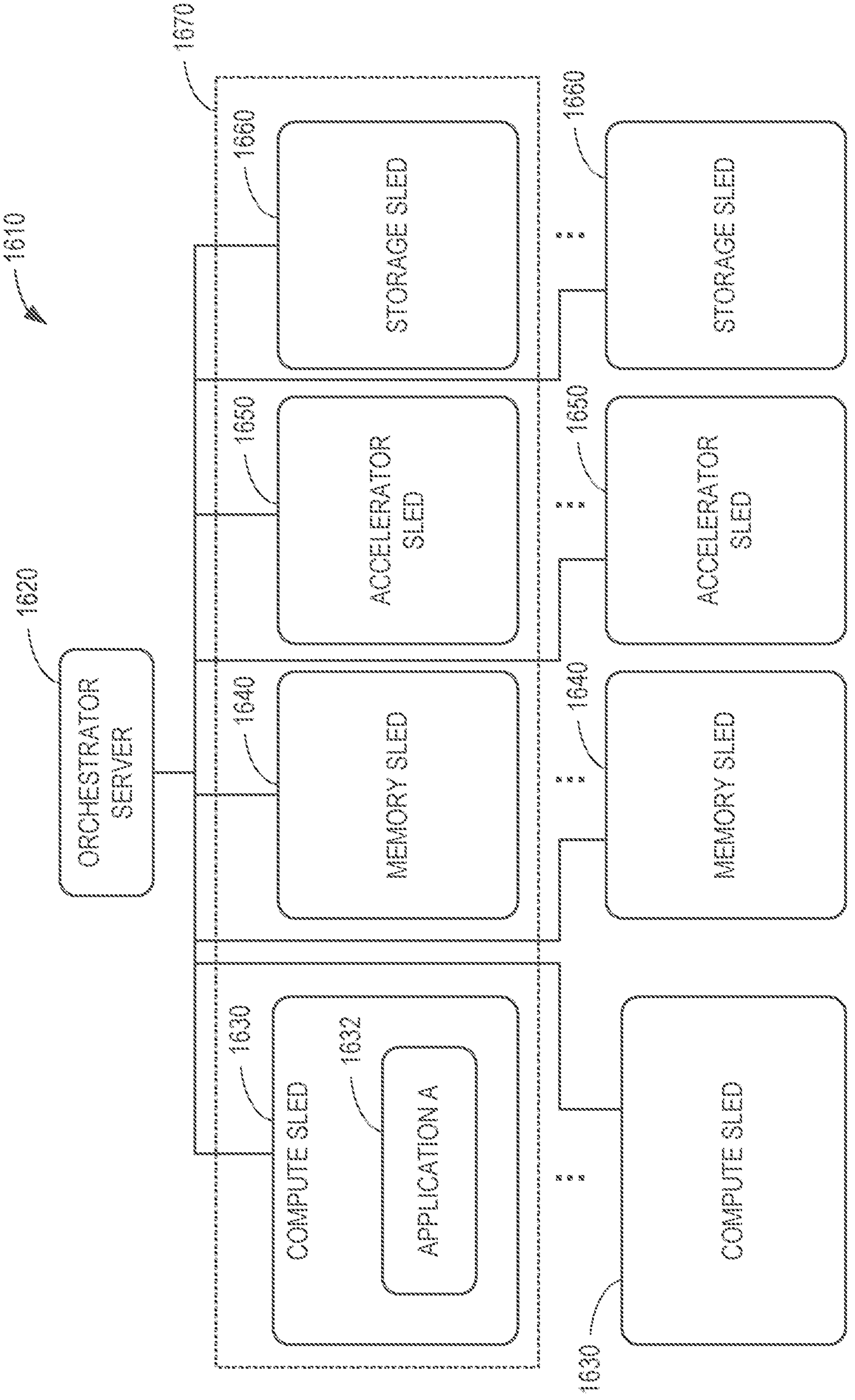
FIG. 16 is a block diagram of a system that may be established within the data center of FIG. 2 to execute workloads with managed nodes of disaggregated resources.

Referring now to FIG. 16, a system for executing one or more workloads (e.g., applications) may be implemented in accordance with the data center 200. In the illustrative example, the system 1610 includes an orchestrator server 1620, which may be implemented as a managed node including a compute device (e.g., programmable circuitry 920 on a compute sled 900) executing management software (e.g., a cloud operating environment, such as OpenStack) that is communicatively coupled to multiple sleds 500 including a large number of compute sleds 1630 (e.g., similar to the compute sled 900), memory sleds 1640 (e.g., similar to the memory sled 1500), accelerator sleds 1650 (e.g., similar to the memory sled 1500), and storage sleds 1660 (e.g., similar to the storage sled 1300). One or more of the sleds 1630, 1640, 1650, 1660 may be grouped into a managed node 1670, such as by the orchestrator server 1620, to collectively perform a workload (e.g., an application 1632 executed in a virtual machine or in a container). The managed node 1670 may be implemented as an assembly of physical resources 720, such as programmable circuitry 920, memory resources 820, accelerator circuits 1120, or data storage 1350, from the same or different sleds 500. Further, the managed node may be established, defined, or "spun up" by the orchestrator server 1620 at the time a workload is to be assigned to the managed node or at any other time, and may exist regardless of whether any workloads are presently assigned to the managed node. In the illustrative example, the orchestrator server 1620 may selectively allocate and/or deallocate physical resources 720 from the sleds 500 and/or add or remove one or more sleds 500 from the managed node 1670 as a function of quality of service (QoS) targets (e.g., a target throughput, a target latency, a target number of instructions per second, etc.) associated with a service level agreement for the workload (e.g., the application 1632). In doing so, the orchestrator server 1620 may receive telemetry data indicative of performance conditions (e.g., throughput, latency, instructions per second, etc.) in different ones of the sleds 500 of the managed node 1670 and compare the telemetry data to the quality of service targets to determine whether the quality of service targets are being satisfied. The orchestrator server 1620 may additionally determine whether one or more physical resources may be deallocated from the managed node 1670 while still satisfying the QoS targets, thereby freeing up those physical resources for use in another managed node (e.g., to execute a different workload). Alternatively, if the QoS targets are not presently satisfied, the orchestrator server 1620 may determine to dynamically allocate additional physical resources to assist in the execution of the workload (e.g., the application 1632) while the workload is executing. Similarly, the orchestrator server 1620 may determine to dynamically deallocate physical resources from a managed node if the orchestrator server 1620 determines that deallocating the physical resource would result in QoS targets still being met.

Additionally, in some examples, the orchestrator server 1620 may identify trends in the resource utilization of the workload (e.g., the application 1632), such as by identifying phases of execution (e.g., time periods in which different operations, having different resource utilizations characteristics, are performed) of the workload (e.g., the application 1632) and pre-emptively identifying available resources in the data center 200 and allocating them to the managed node 1670 (e.g., within a predefined time period of the associated phase beginning). In some examples, the orchestrator server 1620 may model performance based on various latencies and a distribution scheme to place workloads among compute sleds and other resources (e.g., accelerator sleds, memory sleds, storage sleds) in the data center 200. For example, the orchestrator server 1620 may utilize a model that accounts for the performance of resources on the sleds 500 (e.g., FPGA performance, memory access latency, etc.) and the performance (e.g., congestion, latency, bandwidth) of the path through the network to the resource (e.g., FPGA). As such, the orchestrator server 1620 may determine which resource(s) should be used with which workloads based on the total latency associated with different potential resource(s) available in the data center 200 (e.g., the latency associated with the performance of the resource itself in addition to the latency associated with the path through the network between the compute sled executing the workload and the sled 500 on which the resource is located).

In some examples, the orchestrator server 1620 may generate a map of heat generation in the data center 200 using telemetry data (e.g., temperatures, fan speeds, etc.) reported from the sleds 500 and allocate resources to managed nodes as a function of the map of heat generation and predicted heat generation associated with different workloads, to maintain a target temperature and heat distribution in the data center 200. Additionally or alternatively, in some examples, the orchestrator server 1620 may organize received telemetry data into a hierarchical model that is indicative of a relationship between the managed nodes (e.g., a spatial relationship such as the physical locations of the resources of the managed nodes within the data center 200 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of programmable circuitry or memory capacity) across the resources of different managed nodes. The orchestrator server 1620 may determine the differences based on the telemetry data stored in the hierarchical model and factor the differences into a prediction of future resource utilization of a workload if the workload is reassigned from one managed node to another managed node, to accurately balance resource utilization in the data center 200. In some examples, the orchestrator server 1620 may identify patterns in resource utilization phases of the workloads and use the patterns to predict future resource utilization of the workloads.

To reduce the computational load on the orchestrator server 1620 and the data transfer load on the network, in some examples, the orchestrator server 1620 may send self-test information to the sleds 500 to enable a given sled 500 to locally (e.g., on the sled 500) determine whether telemetry data generated by the sled 500 satisfies one or more conditions (e.g., an available capacity that satisfies a predefined threshold, a temperature that satisfies a predefined threshold, etc.). The given sled 500 may then report back a simplified result (e.g., yes or no) to the orchestrator server 1620, which the orchestrator server 1620 may utilize in determining the allocation of resources to managed nodes.

Figure 17A:
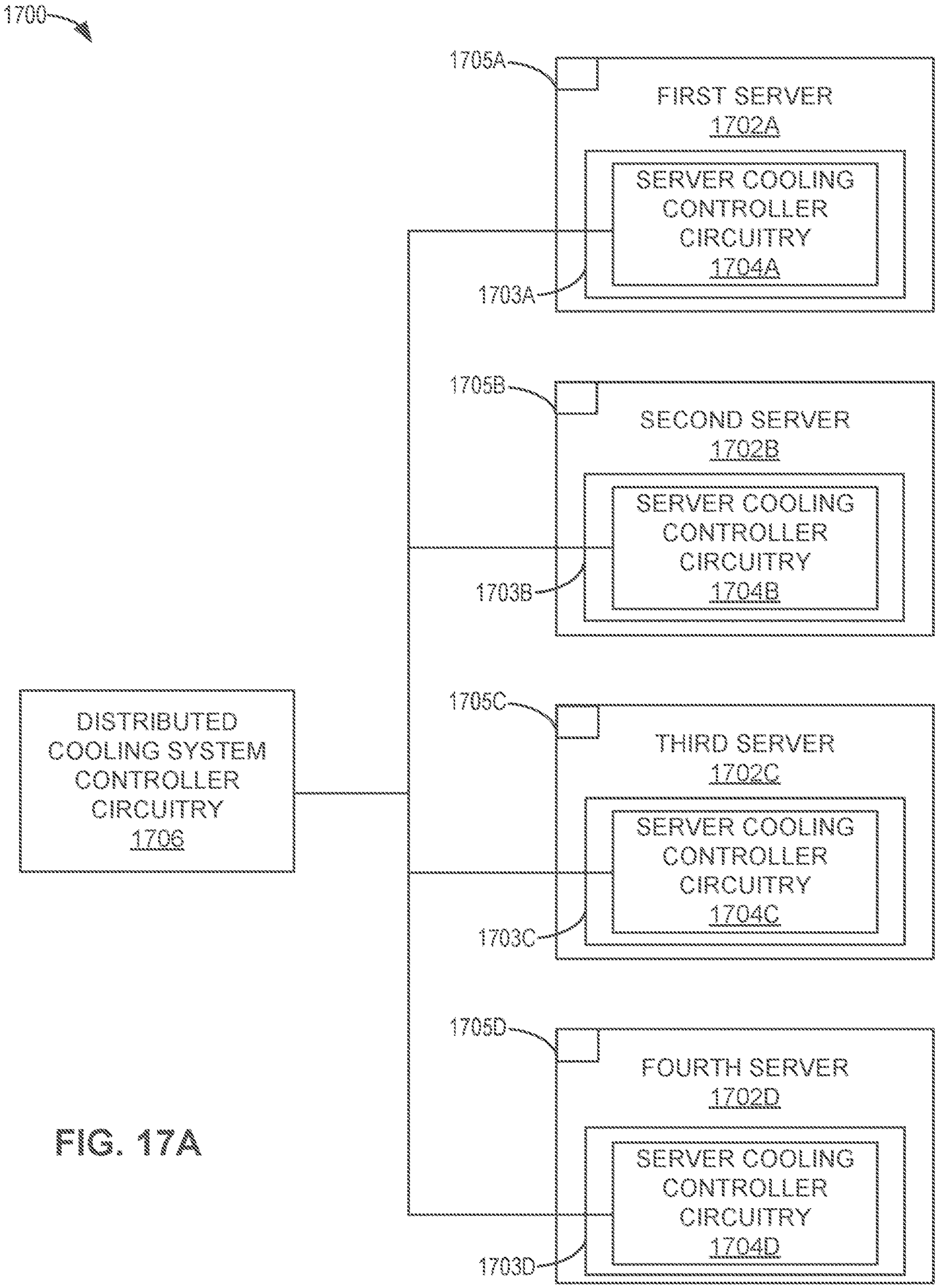
FIG. 17A is an example block diagram of a system implemented in accordance with teachings of this disclosure.

FIG. 17A illustrates an example system 1700 implemented in accordance with teachings of this disclosure. In the illustrated example of FIG. 17A, the system 1700 includes an example first server 1702A, an example second server 1702B, an example third server 1702C, and an example fourth server 1702D. In the illustrated example of FIG. 17A, the servers 1702A, 1702B, 1702C, 1702D are associated with an example first cooling system 1703A, an example second cooling system 1703B, an example third cooling system 1703C, and an example fourth cooling system 1703D, respectively. In the illustrated example of FIG. 17A, the servers 1702A, 1702B, 1702C, 1702D and/or the cooling systems 1703A, 1703B, 1703C, 1703D include example first server cooling controller circuitry 1704A, example second server cooling controller 1704B, example third server cooling controller circuitry 1704C, and example fourth server cooling controller circuitry 1704D, respectively. In the illustrated example of FIG. 17A, the servers 1702A, 1702B, 1702C, 1702D are associated with example first sensors 1705A, example second sensors 1705B, example third sensors 1705C, and example fourth sensors 1705D. In the illustrated example of FIG. 17A, the system 1700 further includes example distributed cooling system controller circuitry 1706.

The example system 1700 is a distributed compute system that includes a plurality of compute units (e.g., the servers 1702A, 1702B, 1702C, 1702D, etc.) and cooling systems (e.g., the cooling systems 1703A, 1703B, 1703C, 1703D, etc.). In some examples, the system 1700 can be a data center. In other examples, the system 1700 can be any other type of distributed compute system. The example system 1700 provides for managing the cooling and power consumption of the servers 1702A, 1702B, 1702C, 1702D.

The servers 1702A, 1702B, 1702C, 1702D each include a plurality of heat-generating compute components (e.g., memory, central processing units, graphical processing units, accelerators, mass storage, network interface controllers, etc.). In some examples, the compute components can be carried by one or more chassis, which can be supported by an appliance (e.g., a rack, etc.). In the illustrated example of FIG. 17A, the servers 1702A, 1702B, 1702C, 1702D use these compute components to execute one or more workloads, which can be assigned by the distributed cooling system controller circuitry 1706. During operation, the servers 1702A, 1702B, 1702C, 1702D use power. In the illustrated example of FIG. 17A, the servers 1702A, 1702B, 1702C, 1702D each draw power from different local sources (e.g., solar panels, batteries, etc.). Accordingly, the servers 1702A, 1702B, 1702C, 1702D operate with limited power supplies. In other examples, some or all of the servers 1702A, 1702B, 1702C, 1702D can share power sources. In other examples, some or all of the servers 1702A, 1702B, 1702C, 1702D can be coupled to a municipal power grid. In the illustrated example of FIG. 17A, the system 1700 includes four servers, namely, the servers 1702A, 1702B, 1702C, 1702D. In other examples, the system 1700 can include any other suitable number of servers (e.g., one, two, ten, fifty, etc.). The example servers of the system 1700 (e.g., the servers 1702A, 1702B, 1702C, 1702D, etc.) can include and/or be implemented by any of the example devices described above in connection with FIGS. 2-16, including the managed node 1670 of FIG. 16. While examples disclosed herein are described with reference to the servers 1702A, 1702B, 1702C, 1702D, it should be appreciated that the examples disclosed herein are also applicable to any high-performance compute system, a system including one or more compute components (e.g., components, etc.), and/or one or more compute devices.

The cooling systems 1703A, 1703B, 1703C, 1703D are associated with the servers 1702A, 1702B, 1702C, 1702D, respectively. While executing workloads, the components of the servers 1702A, 1702B, 1702C, 1702D generate heat, which is dissipated by the cooling systems 1703A, 1703B, 1703C, 1703D, respectively. The cooling systems 1703A, 1703B, 1703C, 1703D can be implemented (e.g., fully implemented, partially implemented, etc.) by an immersion cooling system (e.g., a single-phase immersion cooling system, a two-phase immersion cooling system, etc.), air-cooling systems, and/or any other suitable type of cooling system. In some examples, the cooling systems 1703A, 1703B, 1703C, 1703D can be different types of cooling systems. During operation, the cooling systems 1703A, 1703B, 1703C, 1703D consume power to operate. In the illustrated example of FIG. 17A, the cooling systems 1703A, 1703B, 1703C, 1703D draw power from the same power source as the servers 1702A, 1702B, 1702C, 1702D. In other examples, the cooling systems 1703A, 1703B, 1703C, 1703D can draw power from any other suitable source(s).

The sensors 1705A, 1705B, 1705C, 1705D include sensors that measure and output signals relating to the corresponding ones of the servers 1702A, 1702B, 1702C, 1702D, and to the corresponding ones of the cooling systems 1703A, 1703B, 1703C, 1703D. For example, the sensors 1705A, 1705B, 1705C, 1705D can include one or more temperature sensors that measure and output signals corresponding to the temperature of the coolant of the cooling systems 1703A, 1703B, 1703C, 1703D, and/or the temperature of one or more of the components of the servers 1702A, 1702B, 1702C, 1702D. In some examples, the sensors 1705A, 1705B, 1705C, 1705D can measure an ambient temperature of the servers 1702A, 1702B, 1702C, 1702D, respectively. In some such examples, the sensors 1705A, 1705B, 1705C, 1705D can include one or more thermocouple(s), one or more resistance temperature detector(s), one or more thermistor(s), one or more infrared optical sensor(s), one or more semiconductor-based sensors. In some examples, the sensors 1705A, 1705B, 1705C, 1705D are disposed (e.g., partially disposed, fully disposed, etc.) in an integrated circuit package associated with the servers 1702A, 1702B, 1702C, 1702D, respectively. Additionally or alternatively, the sensors 1705A, 1705B, 1705C, 1705D are disposed (e.g., partially disposed, fully disposed, etc.) in the flow rate, pressure, and/or any other characteristic of the coolant in the cooling systems 1703A, 1703B, 1703C, 1703D.

In the illustrated example of FIG. 17A, the signals output by the sensors 1705A, 1705B, 1705C, 1705D are transmitted to the distributed cooling system controller circuitry 1706 and/or the corresponding ones of the server cooling controller circuitries 1704A, 1704B, 1704C, 1704D. In some examples, the server cooling controller circuitries 1704A, 1704B, 1704C, 1704D, the sensors 1705A, 1705B, 1705C, 1705D, and/or the distributed cooling system controller circuitry 1706 can communicate via any suitable means (e.g., via a wired connection, via a wide area network (WAN), via a local area network (LAN), via the Internet, via a cellular network, etc.). In some examples, the server cooling controller circuitries 1704A, 1704B, 1704C, 1704D and the distributed cooling system controller circuitry 1706 can communicate via an out-of-band (00B) communication stream at a regular interval (e.g., every minute, hourly, daily, etc.).

The server cooling controller circuitries 1704A, 1704B, 1704C, 1704D can analyze the outputs of the sensors 1705A, 1705B, 1705C, 1705D, data from ambient sensors (not illustrated), and scheduled workloads to determine the upcoming cooling requirements of the servers 1702A, 1702B, 1702C, 1702D, respectively, and the power available for cooling the servers 1702A, 1702B, 1702C, 1702D. In some examples, the server cooling controller circuitries 1704A, 1704B, 1704C, 1704D can be implemented by an agent executing on the respective ones of the servers 1702A, 1702B, 1702C, 1702D. An example process flow that can be executed by one or more of the server cooling controller circuitries 1704A, 1704B, 1704C, 1704D is described below in conjunction with FIG. 17B.

The distributed cooling system controller circuitry 1706 can analyze the outputs of the server cooling controller circuitries 1704A, 1704B, 1704C, 1704D, data from ambient sensors (not illustrated), and scheduled workloads to determine the upcoming cooling requirements of the servers 1702A, 1702B, 1702C, 1702D, respectively, and the power available for cooling the servers 1702A, 1702B, 1702C, 1702D. In some examples, the distributed cooling system controller circuitry 1706 can aggregate the data from the server cooling controller circuitries 1704A, 1704B, 1704C, 1704D to determine system level mitigation actions. For example, the distributed cooling system controller circuitry 1706 can shift one or more workloads (e.g., conduct load balancing, etc.) from a server (e.g., the first server 1702A, etc.) that does not have enough power available to operate the corresponding cooling system (e.g., the first cooling system 1703A, etc.). In some examples, the distributed cooling system controller circuitry 1706 can adjust system level cooling systems based on the information from the server cooling controller circuitries 1704A, 1704B, 1704C, 1704D, which can be desirable if the cooling systems 1703A, 1703B, 1703C, 1703D are absent. For example, the distributed cooling system controller circuitry 1706 can change the output of a computer room air conditioning (CRAC) unit, activate additional CRAC unit(s), and/or manage a temperature-controlled aisle of the data center (e.g., a hot aisle, a cold aisle, etc.). An example process flow that can be executed by the distributed cooling system controller circuitry 1706 is described below in conjunction with FIG. 17B.

In some examples, the distributed cooling system controller circuitry 1706 can be implemented (e.g., partially implemented, fully implemented, etc.) by the orchestration server 1620 of FIG. 16 and/or another device managing the servers 1702A, 1702B, 1702C, 1702D (e.g., an infrastructure processing unit (IDU), etc.). Additionally or alternatively, the distributed cooling system controller circuitry 1706 can be implemented by a same device as some or all of the server cooling controller circuitries 1704A, 1704B, 1704C, 1704D.

Figure 17B:
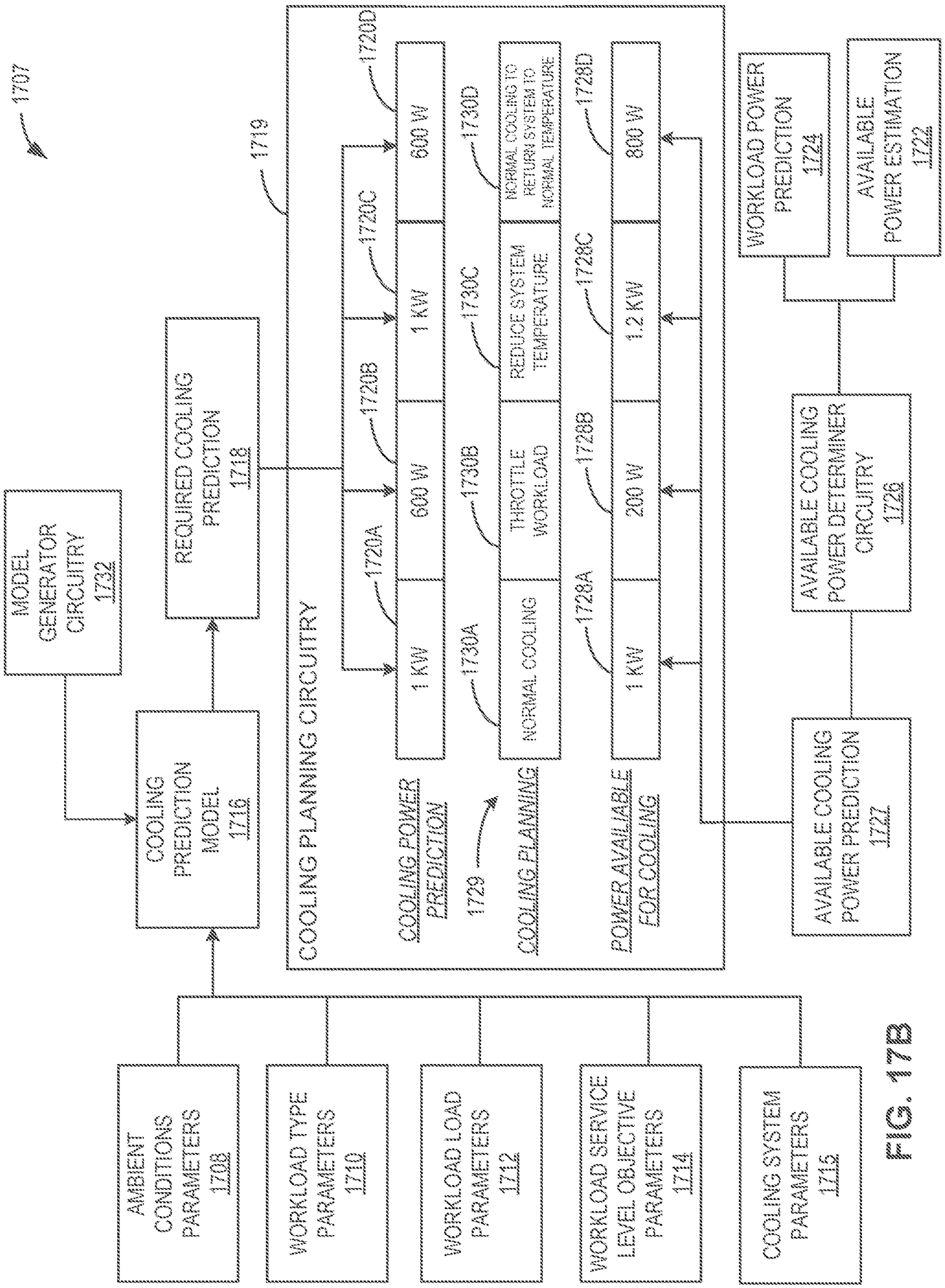
FIG. 17B is a block diagram of a process implemented in accordance with teachings of this disclosure.

FIG. 17B is a schematic diagram that illustrates an example process 1707 that can be executed by a compute unit, including one or more of the server cooling controller circuitries 1704A, 1704B, 1704C, 1704D, and/or distributed cooling system controller circuitry 1706. In the illustrated example of FIG. 17B, example ambient conditions parameters 1708, example workload type parameters 1710, example workload load parameters 1712, example workload service level objective (SLO) parameters 1714, and example cooling system parameters 1715 are input into an example cooling prediction model 1716, which outputs an example required cooling prediction 1718. In the illustrated example of FIG. 17B, example cooling planning circuitry 1719 divides the required cooling prediction 1718 into an example first prediction 1720A, an example second prediction 1720B, an example third prediction 1720C, and an example fourth prediction 1720D.

The ambient condition parameters 1708 include parameters relating to the ambient conditions of the compute unit being analyzed. For example, the ambient condition parameters 1708 can include parameters relating to the current ambient temperature, the current ambient humidity, the current ambient pressure, the current solar irradiance on the compute unit, and/or the current precipitation. In some examples, the ambient condition parameters 1708 can also include predictions (e.g., weather forecasts, etc.) of future ambient conditions on the compute unit being analyzed (e.g., future ambient temperature, the future ambient humidity, the future ambient pressure, the future solar irradiance on the compute unit, and/or the future precipitation, etc.). In some examples, the ambient condition parameters 1708 can also include historic records relating to past ambient conditions of the compute unit being considered. In some such examples, the historic records of ambient conditions can be used to estimate the future ambient conditions of the compute unit. In some examples, the records of ambient conditions, the current ambient conditions, and the predicted future ambient conditions can be used by the cooling prediction model 1716 to estimate the upcoming ambient conditions of the compute unit. In some examples, the ambient conditions parameters 1708 can include weather forecasts for the region containing the compute unit.

The workload type parameters 1710, the workload load parameters 1712, and the workload SLO parameters 1714 relate to the workload(s) currently being executed and to be executed by the compute unit being analyzed. The workload type parameters 1710 correspond to a type of workload to be executed by the compute unit. For example, the workload type parameters 1710 can include an indication of whether the workload will be processing image data, hosting a camera stream, processing sensor data, operating local devices, etc. In some examples, the workload type parameters 1710 can also provide an indication as to what input/output devices will be used by the workloads and/or what instruction sets will be used by the workloads. In some examples, particular instruction sets (e.g., Advanced Vector Extensions (AVX)-512, etc.) can create a greater cooling demand for the workload than other instruction sets. In some examples, some input/output devices generate a comparatively greater amount of heat than other devices, which affects the cooling requirements associated with a workload.

The workload load parameters 1712 are parameters relating to a quantity of workloads to be executed by the compute unit For example, if the workload is providing a camera stream, the workload load parameters 1712 can include parameters relating to the number of camera streams to be provided by the compute unit. Similarly, the workload load parameters 1712 can include an indication of a number of sensors being analyzed, a number of calculations to be performed concurrently, etc. The workload SLO parameters 1714 include parameters corresponding to contractually obligated performance levels of the workloads on the compute unit. In some examples, the workload SLOs parameters 1714 can include an indication of the performance level at which the workload(s) are to be operated. For example, if the workload is providing a camera stream, the workload SLO parameters 1714 can include a target frames per second (fps) to be provided by the compute unit. The workload SLO parameters 1714 can be determined via a workload service level agreement between an operator of the compute unit and one or more user(s) scheduling workloads on the compute unit.

The cooling system parameters 1715 are parameters relating to the hardware and/or efficiency of the cooling system of the compute unit to be cooled. For example, if the cooling requirements of the first server 1702A are being analyzed, the cooling system parameters 1715 would correspond to the cooling system 1703A. The cooling system parameters 1715 can correspond to a type of cooling system (e.g., air-cooled, single-phase immersion cooling, two-phase immersion cooling, etc.), a type of coolant in use, and/or the hardware used by the cooling system (e.g., the model of pumps, the model of fans, etc.). In some examples, the cooling system parameters 1715 can include parameters relating to the geometry and/or orientation of features of the compute unit to be analyzed and the associated cooling system.

The cooling prediction model 1716 is a model that receives the operational parameters 1708, 1710, 1712, 1714, 1715 and outputs the required cooling prediction 1718. In some examples, the cooling prediction model 1716 can be implemented by a machine-learning model, an artificial intelligence model, and/or a neural network. In some examples, the cooling prediction model 1716 can be implemented by a long short-term memory (LSTM) neural network. In other examples, the cooling prediction model 1716 can be implemented by another feedback-incorporating neural network (e.g., a gated recurrent unit (GRU), an echo state network (ESU), etc.) and/or any other suitable type of model (e.g., convolutional neural network (CNN), a feedforward neural network (FNN), etc.). In some examples, the cooling prediction model 1716 can be trained via supervised learning using training data including the operational parameters 1708, 1710, 1712, 1714, 1715, and the resulting required power to cool the compute unit. In other examples, the cooling prediction model 1716 can be trained in any other suitable manner (e.g., unsupervised learning, etc.). In some such examples, the cooling prediction model 1716 can undergo federated training across multiple compute units to identify efficient cooling methods to manage the cooling of the compute unit.

In some examples, the cooling prediction model 1716 can be implemented by multiple machine learning models. For example, in some examples, the cooling prediction model 1716 can include different cooling prediction models based on the ambient conditions parameters 1708 (e.g., a model for periods of high solar irradiance (a daytime model), a model for periods of low solar irradiance (a nighttime model), a model for periods where it is raining, etc.). In some examples, the performance of the cooling prediction model 1716 can be tracked by comparing the cooling predictions 1718 to the actual cooling requirements of the compute unit. In some such examples, if the cooling prediction model 1716 does not satisfy an accuracy threshold, the cooling prediction model 1716 can be re-evaluated and/or retrained. The required cooling prediction 1718 includes time-based predictions of the cooling requirements of the compute unit. For example, the required cooling prediction 1718 can output a series of discrete values that indicate the predicted power required to cool the compute unit in a corresponding time period.

In the illustrated example of FIG. 17B, the cooling planning circuitry 1719 divides the required cooling prediction 1718 into four predictions, namely the first prediction 1720A, the second prediction 1720B, the third prediction 1720C, and the fourth prediction 1720D, that are the power required in a corresponding time segment to maintain the compute unit at an operational temperature (e.g., 40 degrees Celsius, etc.). That is, each of the four successive predictions 1720A-D correspond to successive time segments in the future. For example, the first prediction 1720A indicates that 1 kilowatt (kW) of power is predicted to be required to cool the compute unit in a first time segment (e.g., a next time segment, etc.), the second prediction 1720B indicates that 600 Watts is predicted to be required to cool the compute unit in a second time segment (e.g., the time segment following the first time segment, etc.), the third prediction 1720C indicates that 1 kW of power is predicted to be required in a third time segment (e.g., the time segment following the second time segment, etc.), and the fourth prediction 1706D indicates that 600 Watts is predicted to be required in a fourth time segment (e.g., the time segment following the third time segment, etc.). In other examples, the required cooling prediction 1718 can be for any suitable time period (e.g., two hours, four hours, a day, a week, a month, etc.), which can be divided by the cooling planning circuitry 1719 into segments of any suitable time period (e.g., minute-by-minute, hourly, daily, bi-hourly, etc.).

In the illustrated example of FIG. 17B, an example available power estimation 1722, and an example workload power prediction 1724 are used by example available cooling power determiner circuitry 1726 to generate an example available cooling power prediction 1727. The available power estimation 1722 is an estimation of the amount of power the compute unit will have access to in the future. In some examples, the available power is based on an amount of power stored in a battery coupled to the unit, an estimated solar irradiance on solar panels associated with the compute unit, etc. In some examples, the available power estimation 1722 is based on a power cap set by an operator of the compute unit. In other examples, the available power estimation 1722 can be based on any other suitable input.

The workload power prediction 1724 is an amount of power estimated to be used to execute the workload (e.g., operate the components of the compute unit, etc.). In some examples, the workload power prediction 1724 can be generated using a machine-learning model, an artificial intelligence model, and/or a neural network. In some such examples, the workload power prediction 1724 can be based on the workload type parameters 1710, the workload load parameters 1712, the workload SLO parameters 1714, and/or other parameters (e.g., parameters relating to the hardware components of the compute unit, etc.). In other examples, the workload power prediction 1724 can be generated in any other suitable manner.

The available cooling power determiner circuitry 1726 determines the available cooling power prediction 1727 based on the available power estimation 1722, and the workload power prediction 1724. For example, the available cooling power determiner circuitry 1726 can determine the available cooling power prediction 1727 based on the difference between the available power estimation 1722 and the workload power prediction 1724. In some examples, the available cooling power prediction 1727 can include a series of discrete values that indicate the power available to operate the cooling system (e.g., the cooling system 1703A of the first server 1702A, etc.). In some examples, the discrete values output by the available cooling power prediction 1727 can correspond to the same time periods as the discrete values associated with the predictions 1720A, 1720B, 1720C, 1720D that indicate the predicted power required to cool the compute unit. In other examples, the available cooling power prediction 1727 can include a function having the available power for cooling as an output and the time as an input.

While an example manner of implementing the circuitry of the available cooling power determiner circuitry 1726 is illustrated in FIG. 17B, one or more of the elements, processes, and/or devices illustrated in FIG. 17B may be combined, divided, re-arranged, omitted, eliminated, and/or implemented in any other way. Further, the example available cooling power determiner circuitry 1726 of FIG. 17B may be implemented by hardware alone or by hardware in combination with software and/or firmware. Thus, for example, any of the available cooling power determiner circuitry 1726 of FIG. 17B could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the available cooling power determiner circuitry 1726 of FIG. 17B may include one or more elements, processes, and/or devices in addition to, or instead of, those illustrated in FIG. 17B, and/or may include more than one of any or all of the illustrated elements, processes and devices.

In the illustrated example of FIG. 17B, the example cooling planning circuitry 1719 receives the available cooling power prediction 1727 from the available cooling power determiner circuitry 1726. In the illustrated example of FIG. 17B, the example cooling planning circuitry 1719 divides the available cooling power prediction 1727 into four availabilities, namely a first power availability prediction 1728A, a second power availability prediction 1728B, a third power availability prediction 1728C, and a fourth power availability prediction 1728D. In some examples, as with the cooling power predictions 1720A-D discussed above, each of the power availability predictions 1728A-D correspond to successive time segments or points in time. In some examples, the time segments for both sets of predictions 1720A-D, 1728A-D match (e.g., are synchronized) so that the predictions can be compared and/or used in combination. For example, the first power availability prediction 1728A indicates that 1 kW of power is available to cool the compute unit in the time segment corresponding to the first prediction 1720A, the second power availability prediction 1728B indicates that 200 W of power is available to cool the compute unit in the time segment corresponding to the second prediction 1720B, the third power availability prediction 1728C indicates that 1.2 kW of power is available to cool the compute unit in the time segment corresponding to the third prediction 1720C, and the fourth power availability prediction 1728D indicates that 800 W of power is available to cool the compute unit in the time segment corresponding to the fourth prediction 1720D. In other examples, the available cooling power prediction 1727 can be associated with any suitable time period (e.g., two hours, four hours, a day, a week, etc.) and can be divided by the cooling planning circuitry 1719 into segments of any suitable length (e.g., a same time length as the predictions 1720A, 1720B, 1720C, 1720D, etc.).

The cooling planning circuitry 1719 generates and implements an example overall cooling plan 1729 based on a comparison of the cooling predictions 1718 and the available cooling power prediction 1727. The overall cooling plan 1729 is one or more planned operations of the system (e.g., the system 1700, one or more of the servers 1702A, 1702B, 1702C, 1702D, etc.) associated with the process 1707 during one or more corresponding time segments. In some examples, the cooling planning circuitry 1719 can implement the overall cooling plan 1729 by interfacing with one or more controllable features of the servers 1702A, 1702B, 1702C, 1702D, and/or the cooling systems 1703A, 1703B, 1703C, 1703D. In the illustrated example of FIG. 17B, the overall cooling plan 1729 includes an example first temporally segmented cooling plan 1730A, an example second temporally segmented cooling plan 1730B, an example third temporally segmented cooling plan 1730C, and an example fourth temporally segmented cooling plan 1730D. In other examples, any suitable number of temporally segmented cooling plans can be generated (e.g., corresponding to the number of, frequency, and/or number of the predictions 1720A, 1720B, 1720C, 1720D, corresponding to the number of and/or available cooling power prediction 1727, based on a user preference, etc.).

In the illustrated example of FIG. 17B, the first temporally segmented cooling plan 1730A results from a comparison of the first prediction 1720A and the first power availability prediction 1728A and describes potential actions taken by the compute unit and/or the cooling system during the first time segment. In the illustrated example of FIG. 17B, the first prediction 1720A, and the first power availability prediction 1728A are equal, which indicates that there is not an power deficiency or surplus during the first time segment. As such, in the illustrated example of FIG. 17B, the cooling planning circuitry generates the first temporally segmented cooling plan 1730A, which includes a plan to operate the cooling system normally.

In the illustrated example of FIG. 17B, the second temporally segmented cooling plan 1730B results from a comparison of the second prediction 1720B and the second power availability prediction 1728B and describes potential actions taken by the compute unit and/or the cooling system during the second time segment. In the illustrated example of FIG. 17B, the second prediction 1720B is greater than the second power availability prediction 1728B, which indicates that there is a predicted deficiency of power (for cooling purposes) during the second time segment. In the illustrated example of FIG. 17B, the cooling planning circuitry 1719 generates the second temporally segmented cooling plan 1730B, which includes a plan to throttle the workload to be executed on the compute unit to reduce the power required to execute the workload and the amount of required cooling. In some examples, the cooling planning circuitry 1719 can generate an alert for an operator of the system that there is a predicted power deficiency. Additionally or alternatively, other actions can be taken by the cooling planning circuitry 1719 to mitigate the predicted power deficiently (e.g., capping the power output of the compute unit via a power control unit, redeploying the workload to another compute unit, reducing the frequency of the processing cores of the compute unit, etc.). For example, if the process 1707 is being executed on the distributed cooling system controller circuitry 1706 and a power deficiency is identified on the first server 1702A, the distributed cooling system controller circuitry 1706 can shift some of the workload(s) on the first server 1702A to another server (e.g., the second server 1702B, the third server 1702C, the fourth server 1702D, etc.) that has a power surplus during the same time segment.

In the illustrated example of FIG. 17B, the third temporally segmented cooling plan 1730C results from a comparison of the third prediction 1720C and the third power availability prediction 1728C and describes potential actions taken by the compute unit and/or the cooling system during the third time segment. In the illustrated example of FIG. 17B, the third prediction 1720C is less than the third power availability prediction 1728C, which indicates that there is a predicted surplus of power during the third time segment. In the illustrated example of FIG. 17C, the cooling planning circuitry 1719 generates the third temporally segmented cooling plan 1730C, which includes plans to decrease the operating temperature of the compute unit (e.g., reduce the temperature of the compute unit from 40 degrees Celsius to 30 degrees Celsius, etc.). In some examples, the reduced temperature is achieved by increasing the operation of the cooling system (using the excess or surplus power) to increase thermal transfer of heat away from the compute unit. In some examples, reducing the operating temperature of the compute unit can enable the system to accommodate power deficits in future time periods and/or increase the efficiency of the workload executed due to the reduced temperature. In other examples, the excess power can be stored in a battery associated with the compute unit.

In the illustrated example of FIG. 17B, the fourth temporally segmented cooling plan 1730D results from a comparison of the fourth prediction 1720D and the fourth power availability prediction 1728D and describes potential actions taken by the compute unit and/or the cooling system during the fourth time segment. In the illustrated example of FIG. 17B, the fourth prediction 1720D is greater than the fourth power availability prediction 1728D, which indicates that there is a predicted surplus of power during the fourth time segment. In some such examples, because the operating temperature of the compute unit was lowered in the third time segment, the cooling planning circuitry 1719 can generate the fourth temporally segmented cooling plan 1730D, which includes a plan to operate the cooling system normally and allow the temperature of the compute unit to return to target operating temperatures level (e.g., a design operating temperature, etc.). As used herein, a server (e.g., the servers 1702A, 1702B, 1702C, 1702D, etc.) is operating "normally" when it operates a workload according to a workload service level operating agreement. As used herein, a cooling system (e.g., the cooling system 1703A, 1703B, 1703C, 1703D, etc.) is operating "normally" when it cools a server to dissipates heat generated by the operation of an associated server. In other examples, any other suitable actions can be taken, including those described above in conjunction with the second temporally segmented cooling plan 1730B. An example implementation of the cooling planning circuitry 1719 is described below in conjunction with FIG. 19. In some examples, the cooling planning circuitry 1719 can be implemented by one or more of the server cooling controller circuitries 1704A, 1704B, 1704C, 1704D, and/or the distributed cooling system controller circuitry 1706.

In the illustrated example of FIG. 17B, the cooling prediction model 1716 is generated by example model generator circuitry 1732. For example, the model generator circuitry 1732 can create training data via sensor data from the sensors 1705A, 1705B, 1705C, 1705D, the operational parameters 1708, 1710, 1712, 1714, 1715, and the actual cooling power used by the system (e.g., one or more of the servers 1702A, 1702B, 1702C, 1702D, etc.). In some examples, the model generator circuitry 1732 can create the cooling prediction model 1716 via supervised learning and the labeled training data. In other examples, the model generator circuitry 1732 can generate the cooling prediction model 1716 via any other suitable method (e.g., unsupervised learning, etc.). In other examples, the model generator circuitry 1732 can generate the cooling prediction model 1716 as any suitable type of neural network (e.g., a feed-forward neural network, a recurrent neural network (RNN), a long short-term memory (LSTM) network, etc.) and/or machine learning algorithm (e.g., a regression, support vector machine algorithm, etc.). An example implementation of the model generator circuitry 1732 is described below in conjunction with FIG. 18. In some examples, the model generator circuitry 1732 can be implemented by one or more of the server cooling controller circuitries 1704A, 1704B, 1704C, 1704D, and/or the distributed cooling system controller circuitry 1706.

Figure 18:
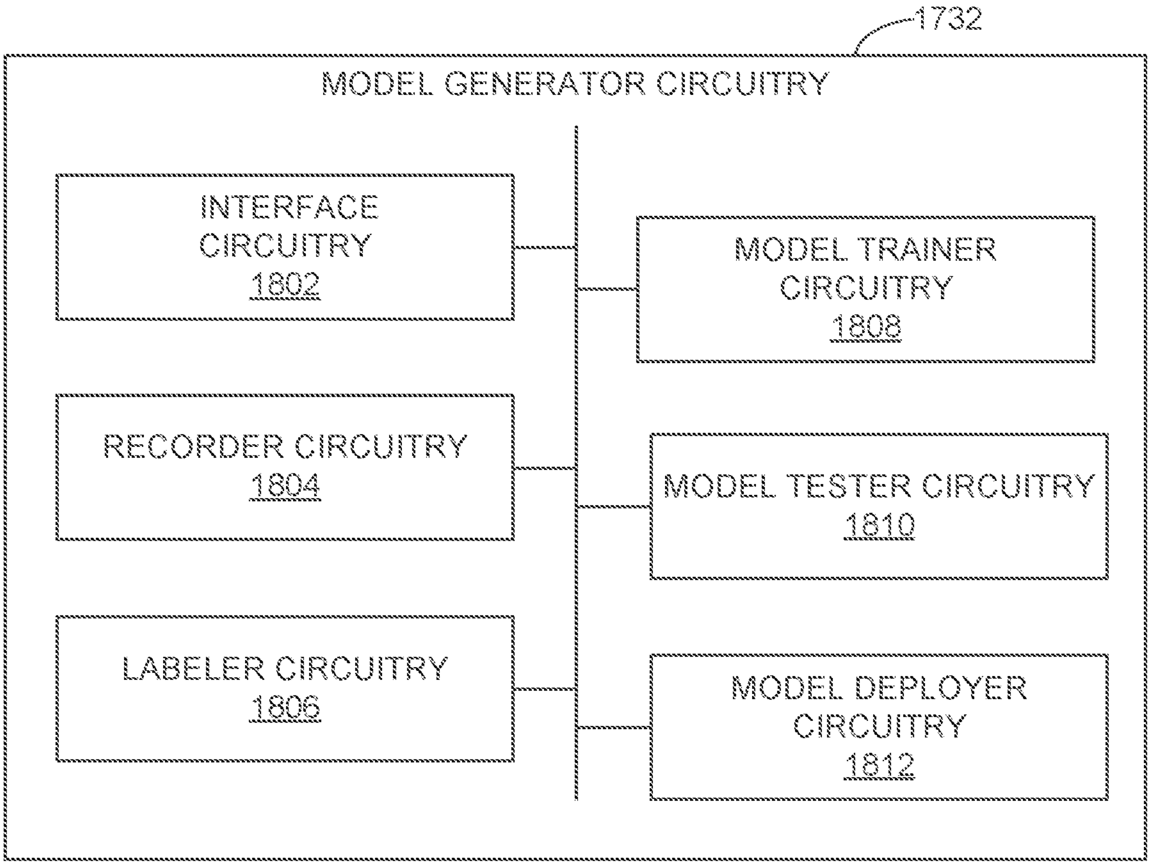
FIG. 18 is a block diagram of an example implementation of the model generation circuitry of the example system of FIG. 17B.

FIG. 18 is a block diagram of the model generator circuitry 1732 to generate a cooling prediction model. In the illustrated example of FIG. 18, the model generator circuitry 1732 includes example interface circuitry 1802, example recorder circuitry 1804, example labeler circuitry 1806, example model trainer circuitry 1808, example model tester circuitry 1810, and example model deployer circuitry 1812. The model generator circuitry 1732 of FIG. 18 may be instantiated (e.g., creating an instance of, bring into being for any length of time, materialize, implement, etc.) by programmable circuitry such as a Central Processing Unit (CPU) executing first instructions. Additionally or alternatively, the model generator circuitry 1732 of FIG. 18 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 18 may, thus, be instantiated at the same or different times. Some or all of the circuitry of FIG. 18 may be instantiated, for example, in one or more threads executing concurrently on hardware and/or in series on hardware. Moreover, in some examples, some or all of the circuitry of FIG. 18 may be implemented by microprocessor circuitry and/or FPGA circuitry performing operations executing instructions to implement one or more virtual machines and/or containers.

The interface circuitry 1802 accesses sensor data from the sensors 1705A, 1705B, 1705C, 1705D of FIG. 17A and/or other data from other sources. For example, the interface circuitry 1802 can access sensor data corresponding to one or more period(s) of operation of one or more server(s) (e.g., the first server 1702A, the second server 1702B, the third server 1702C, the fourth server 1702D, etc.) and/or one or more cooling systems (e.g., the first cooling system 1703A, the second cooling system 1703B, the third cooling system 1703C, the fourth cooling system 1703D, etc.). For example, the interface circuitry 1802 can receive sensor data from one or more of the sensors 1705A, 1705B, 1705C, 1705D associated with the servers 1702A, 1702B, 1702C, 1702D, respectively, and/or cooling system 1703A, 1703B, 1703C, 1703D, respectively. In some examples, the sensors 1705A, 1705B, 1705C, 1705D can provide data relating to the operational temperature of the servers 1702A, 1702B, 1702C, 1702D, a performance metric of one or more of the servers 1702A, 1702B, 1702C, 1702D (e.g., processor speed, memory speed, etc.), a performance metric of the cooling system 1703A, 1703B, 1703C, 1703D (e.g., a pump power, a flow rate, etc.), a volume of coolant in the cooling system 1703A, 1703B, 1703C, 1703D, etc.

In some examples, the interface circuitry 1802 can access related operational parameters of one or more of the servers 1702A, 1702B, 1702C, 1702D and/or one or more of the cooling systems 1703A, 1703B, 1703C, 1703D. For example, the interface circuitry 1802 can interface with one or more external systems and/or databases to receive information relating to the operational conditions of the servers 1702A, 1702B, 1702C, 1702D. In some examples, the operational parameters can include the ambient conditions parameters 1708 of FIG. 17B, the workload type parameters 1710 of FIG. 17B, the workload load parameters 1712 of FIG. 17B, the workload service level objective parameters 1714 of FIG. 17B, and/or the cooling system parameters 1715 of FIG. 17B. For example, the interface circuitry 1802 can retrieve the ambient conditions parameters 1708 from a weather service, a database of historic weather records, and/or other sensors associated with the system 1700 (e.g., temperature sensors, atmospheric pressure sensors, humidity sensors, radiant light sensors, etc.). In some examples, the interface circuitry 1802 can receive the workload type parameters 1710, the workload load parameters 1712, the workload SLO parameters 1714, and/or the cooling system parameters 1715 from a database associated with one or more of the servers 1702A, 1702B, 1702C, 1702D (e.g., local memory of one or more servers 1702A, 1702B, 1702C, 1702D, etc.), a remote database associated with the servers 1702A, 1702B, 1702C, 1702D (e.g., database associated with an operator of the servers 1702A, 1702B, 1702C, 1702D, etc.), a database associated with the distributed cooling system controller circuitry 1706, and/or a server associated with one or more of the server cooling controller circuitries 1704A, 1704B, 1704C, 1704D, etc. In some examples, the interface circuitry 1802 can transform the received sensor data from a machine-readable format (e.g., a voltage, a current, etc.) to a human-readable format (e.g., a string, a floating-point number, an integer, etc.). In some examples, the interface circuitry 1802 is instantiated by programmable circuitry executing interface instructions and/or configured to perform operations such as those represented by the flowchart of FIG. 20.

In some examples, the model generator circuitry 1732 includes means for interfacing. For example, the means for interfacing may be implemented by the interface circuitry 1802. In some examples, the interface circuitry 1802 may be instantiated by programmable circuitry such as the example programmable circuitry 2212 of FIG. 22. For instance, the interface circuitry 1802 may be instantiated by the example microprocessor 2400 of FIG. 24 executing machine executable instructions such as those implemented by at least blocks 2002, 2004 of FIG. 20. In some examples, the interface circuitry 1802 may be instantiated by hardware logic circuitry, which may be implemented by an ASIC, XPU, or the FPGA circuitry 2500 of FIG. 25 structured to perform operations corresponding to the machine readable instructions. Additionally or alternatively, the interface circuitry 1802 may be instantiated by any other combination of hardware, software, and/or firmware. For example, the interface circuitry 1802 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The recorder circuitry 1804 records sensor data and operational parameters 1708, 1710, 1712, 1714, 1715 in memory and/or a database associated with the model generator circuitry 1732. For example, the recorder circuitry 1804 can record the sensor data and the operational parameters 1708, 1710, 1712, 1714, 1715 accessed by the interface circuitry 1802 in memory (e.g., the local memory 2213 of FIG. 22, the volatile memory 2214 of FIG. 22, the non-volatile memory 2216 of FIG. 22, and/or the mass storage 2228 of FIG. 22, etc.). In some examples, the record circuitry 1804 can create a data structure (e.g., a matrix, a vector, etc.) that includes the accessed data and a timestamp associated with the accessed data (e.g., a timestamp associated with an upcoming workload associated with the workload type parameters 1710, the workload load parameters 1712, and/or the workload SLO parameters 1714, etc.). In other examples, the record circuitry 1804 can record (e.g., save, store, etc.) the accessed sensor data and operational parameters in any other suitable memory (e.g., memory associated with the distributed cooling system controller circuitry 1706, memory associated with one or more of the server cooling controller circuitries 1704A, 1704B, 1704C, 1704D, etc.).

In some examples, the recorder circuitry 1804 also records the actual cooling power use of one or more of the cooling systems 1703A, 1703B, 1703C, 1703D and the related temperature change of the corresponding ones of the servers 1702A, 1702B, 1702C, 1702D over a time period. For example, the recorder circuitry 1804 records the actual cooling power and related temperature change of the servers 1702A, 1702B, 1702C, 1702D use in memory (e.g., the local memory 2213 of FIG. 22, the volatile memory 2214 of FIG. 22, the non-volatile memory 2216 of FIG. 22, and/or the mass storage 2228 of FIG. 22, etc.). In some examples, the recorder circuitry 1804 can record the actual cooling power use in a same data structure used to store the operational parameters and/or sensor data. In some such examples, the recorder circuitry 1804 can use a timestamp associated with the data structure to associate the actual cooling power use of the cooling systems 1703A, 1703B, 1703C, 1703D and related temperature change of the servers 1702A, 1702B, 1702C, 1702D. In some examples, the actual cooling power use and related temperature change can be input by an operator of the servers 1702A, 1702B, 1702C, 1702D, the cooling systems 1703A, 1703B, 1703C, 1703D, and/or the model generator circuitry 1732. Additionally or alternatively, the actual cooling power and related temperature change can be received by the interface circuitry 1802 from one or more of the sensors 1705A, 1705B, 1705C, 1705D, and/or other sensors associated with the system 1700. In some examples, the recorder circuitry 1804 is instantiated by programmable circuitry executing recorder instructions and/or configured to perform operations such as those represented by the flowchart of FIG. 20.

In some examples, the model generator circuitry 1732 includes means for recording. For example, the means for recording may be implemented by the recorder circuitry 1804. In some examples, the recorder circuitry 1804 may be instantiated by programmable circuitry such as the example programmable circuitry 2212 of FIG. 22. For instance, the recorder circuitry 1804 may be instantiated by the example microprocessor 2400 of FIG. 24 executing machine executable instructions such as those implemented by at least blocks 2006, 2008 of FIG. 20. In some examples, the recorder circuitry 1804 may be instantiated by hardware logic circuitry, which may be implemented by an ASIC, XPU, or the FPGA circuitry 2500 of FIG. 25 structured to perform operations corresponding to the machine readable instructions. Additionally or alternatively, the recorder circuitry 1804 may be instantiated by any other combination of hardware, software, and/or firmware. For example, the recorder circuitry 1804 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The labeler circuitry 1806 generates labeled training data to train and test the cooling prediction model 1716. For example, the labeler circuitry 1806 can use the recorded sensor data, the recorded operational parameters, the actual cooling power use of the cooling systems, and the temperature change of the server(s) to generate training data. For example, the labeler circuitry 1806 can use the data structure generated by the recorder circuitry 1804 to generate labeled training data including the recorded sensor data and the recorded operational data as inputs and the actual cooling power use of the cooling systems 1703A, 1703B, 1703C, 1703D and the related heat change of the corresponding one of the servers 1702A, 1702B, 1702C, 1702D as outputs. For example, the labeler circuitry 1806 can create an instance of training data using the data from the first sensors 1705A and the operational parameters 1708, 1710, 1712, 1714, 1715 of the first server 1702A and the first cooling system 1703A as inputs and the power use of the first cooling system 1703A and the temperature increase of the first server 1702A during a time period as outputs. If the labeler circuitry 1806 is creating training data for an entire data center (e.g., for a data center including each of the servers 1702A, 1702B, 1702C, 1702D, etc.), the labeler circuitry 1806 can create an instance of training data using the data from the sensors 1705A, 1705B, 1705C, 1705D and the operational parameters 1708, 1710, 1712, 1714, 1715 of the servers 1702A, 1702B, 1702C, 1702D and the cooling systems 1703A, 1703B, 1703C, 1703D as inputs and the power use of the cooling systems 1703A, 1703B, 1703C, 1703D and the temperature increase of the servers 1702A, 1702B, 1702C, 1702D during a time period as outputs. In other examples, the labeler circuitry 1806 can create training data from the recorded data in any other suitable manner.

In some examples, the labeler circuitry 1806 continues to generate training data until a threshold amount of training data has been generated (e.g., one hundred instances, one thousand instances, etc.). Additionally or alternatively, the labeler circuitry 1806 can generate training data until all data recorded by the recorder circuitry 1804 is used to generate training data. In other examples, the labeler circuitry 1806 can generate training data until receiving a command from an operator of the model generator circuitry 1732. In some examples, the labeler circuitry 1806 is instantiated by programmable circuitry executing model trainer instructions and/or configured to perform operations such as those represented by the flowchart of FIG. 20.

In some examples, the model generator circuitry 1732 includes means for labeling training data. For example, the means for labeling training data may be implemented by the labeler circuitry 1806. In some examples, the labeler circuitry 1806 may be instantiated by programmable circuitry such as the example programmable circuitry 2212 of FIG. 22. For instance, the labeler circuitry 1806 may be instantiated by the example microprocessor 2400 of FIG. 24 executing machine executable instructions such as those implemented by at least blocks 2010, 2012 of FIG. 20. In some examples, the labeler circuitry 1806 may be instantiated by hardware logic circuitry, which may be implemented by an ASIC, XPU, or the FPGA circuitry 2500 of FIG. 25 structured to perform operations corresponding to the machine readable instructions. Additionally or alternatively, the labeler circuitry 1806 may be instantiated by any other combination of hardware, software, and/or firmware. For example, the labeler circuitry 1806 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The model trainer circuitry 1808 trains a cooling prediction model (e.g., the cooling prediction model 1716 of FIG. 17A, etc.) using a first portion of the labeled training data. For example, the model trainer circuitry 1808 can train a neural network using the labeled training data via supervised learning. In some such examples, the model trainer circuitry 1808 can use any suitable supervised learning method (e.g., support vector machine, linear regressions, logistic regression, discriminant function analysis, decision tree learning, etc.). In some examples, the model trainer circuitry 1808 can train a neural network that is a long short-term memory (LSTM) neural network. In other examples, the machine learning model trained by the model trainer circuitry 1808 can be another type of neural network (e.g., a different recurrent neural network (RNN), a feedforward neural network (FNN), etc.). In other examples, the model trainer circuitry 1808 can train a neural network using any other suitable training technique, including unsupervised learning. In some examples, the model trainer circuitry 1808 is instantiated by programmable circuitry executing model trainer instructions and/or configured to perform operations such as those represented by the flowchart of FIG. 20.

In some examples, the model generator circuitry 1732 includes means for training a machine learning model. For example, the means for training a machine learning model may be implemented by the model trainer circuitry 1808. In some examples, the model trainer circuitry 1808 may be instantiated by programmable circuitry such as the example programmable circuitry 2212 of FIG. 22. For instance, the model trainer circuitry 1808 may be instantiated by the example microprocessor 2400 of FIG. 24 executing machine executable instructions such as those implemented by at least blocks 2014 of FIG. 20. In some examples, the model trainer circuitry 1808 may be instantiated by hardware logic circuitry, which may be implemented by an ASIC, XPU, or the FPGA circuitry 2500 of FIG. 25 structured to perform operations corresponding to the machine readable instructions. Additionally or alternatively, the model trainer circuitry 1808 may be instantiated by any other combination of hardware, software, and/or firmware. For example, the model trainer circuitry 1808 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The model tester circuitry 1810 tests the cooling prediction model 1716 using a second portion of the labeled training data. For example, the model tester circuitry 1810 can input the second portion of the labeled training data into the trained neural network, generated by the model trainer circuitry 1808, record the output of the neural network (e.g., a predicted cooling power use of a cooling system and a predicted temperature change of the server, etc.), and compare the trained neural network to labels of the second training portion. In some such examples, the model tester circuitry 1810 can generate a confidence value (e.g., a percentage of outputs of the cooling model that match the corresponding label generated by the labeler circuitry 1806, an average error of the cooling model, other accuracy statistics, etc.). In some examples, the model tester circuitry 1810 can compare the confidence value generated by the model tester circuitry 1810 to a preset accuracy threshold. In some such examples, the accuracy threshold can be any suitable value (e.g., 75%, 90%, 99%, etc.). In other examples, the model tester circuitry 1810 can determine if the cooling prediction model 1716 is sufficiently accurate in any other suitable manner. In some examples, the model tester circuitry 1810 is instantiated by programmable circuitry executing model tester instructions and/or configured to perform operations such as those represented by the flowchart of FIG. 20.

In some examples, the model generator circuitry 1732 includes means for testing a machine learning model. For example, the means for testing a machine learning model may be implemented by the model tester circuitry 1810. In some examples, the model tester circuitry 1810 may be instantiated by programmable circuitry such as the example programmable circuitry 2212 of FIG. 22. For instance, the model tester circuitry 1810 may be instantiated by the example microprocessor 2400 of FIG. 24 executing machine executable instructions such as those implemented by at least blocks 2016, 2018 of FIG. 20. In some examples, the model tester circuitry 1810 may be instantiated by hardware logic circuitry, which may be implemented by an ASIC, XPU, or the FPGA circuitry 2500 of FIG. 25 structured to perform operations corresponding to the machine readable instructions. Additionally or alternatively, the model tester circuitry 1810 may be instantiated by any other combination of hardware, software, and/or firmware. For example, the model tester circuitry 1810 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The model deployer circuitry 1812 deploys the cooling prediction model 1716. For example, the model deployer circuitry 1812 can transmit the cooling prediction model 1716 to one or more of the server cooling controller circuitries 1704A, 1704B, 1704C, 1704D, and/or the distributed cooling system controller circuitry 1706. Additionally or alternatively, the model deployer circuitry 1812 can publish the cooling prediction model 1716 to the cloud platform, an edge platform, and/or another suitable platform. In other examples, the model deployer circuitry 1812 can deploy the cooling prediction model 1716 in any other suitable manner. In some examples, the model deployer circuitry 1812 is instantiated by programmable circuitry executing model tester instructions and/or configured to perform operations such as those represented by the flowchart of FIG. 20.

In some examples, the model generator circuitry 1732 includes means for deploying a machine learning model. For example, the means for deploying a machine learning model may be implemented by the model deployer circuitry 1812. In some examples, the model deployer circuitry 1812 may be instantiated by programmable circuitry such as the example programmable circuitry 2212 of FIG. 22. For instance, the model deployer circuitry 1812 may be instantiated by the example microprocessor 2400 of FIG. 24 executing machine executable instructions such as those implemented by at least blocks 2020 of FIG. 20. In some examples, the model deployer circuitry 1812 may be instantiated by hardware logic circuitry, which may be implemented by an ASIC, XPU, or the FPGA circuitry 2500 of FIG. 25 structured to perform operations corresponding to the machine readable instructions. Additionally or alternatively, the model deployer circuitry 1812 may be instantiated by any other combination of hardware, software, and/or firmware. For example, the model deployer circuitry 1812 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

While an example manner of implementing the model generator circuitry 1732 of FIG. 17B is illustrated in FIG. 18, one or more of the elements, processes, and/or devices illustrated in FIG. 18 may be combined, divided, re-arranged, omitted, eliminated, and/or implemented in any other way. Further, the example interface circuitry 1802, example recorder circuitry 1804, example labeler circuitry 1806, example model trainer circuitry 1808, example model tester circuitry 1810, example model deployer circuitry 1812 and/or, more generally, the example model generator circuitry 1732 of FIG. 17B, may be implemented by hardware alone or by hardware in combination with software and/or firmware. Thus, for example, any of the example interface circuitry 1802, example recorder circuitry 1804, example labeler circuitry 1806, example model trainer circuitry 1808, example model tester circuitry 1810, example model deployer circuitry 1812, and/or, more generally, the example model generator circuitry 1732, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example model generator circuitry 1732 of FIG. 17B may include one or more elements, processes, and/or devices in addition to, or instead of, those illustrated in FIG. 18, and/or may include more than one of any or all of the illustrated elements, processes and devices.

Figure 19:
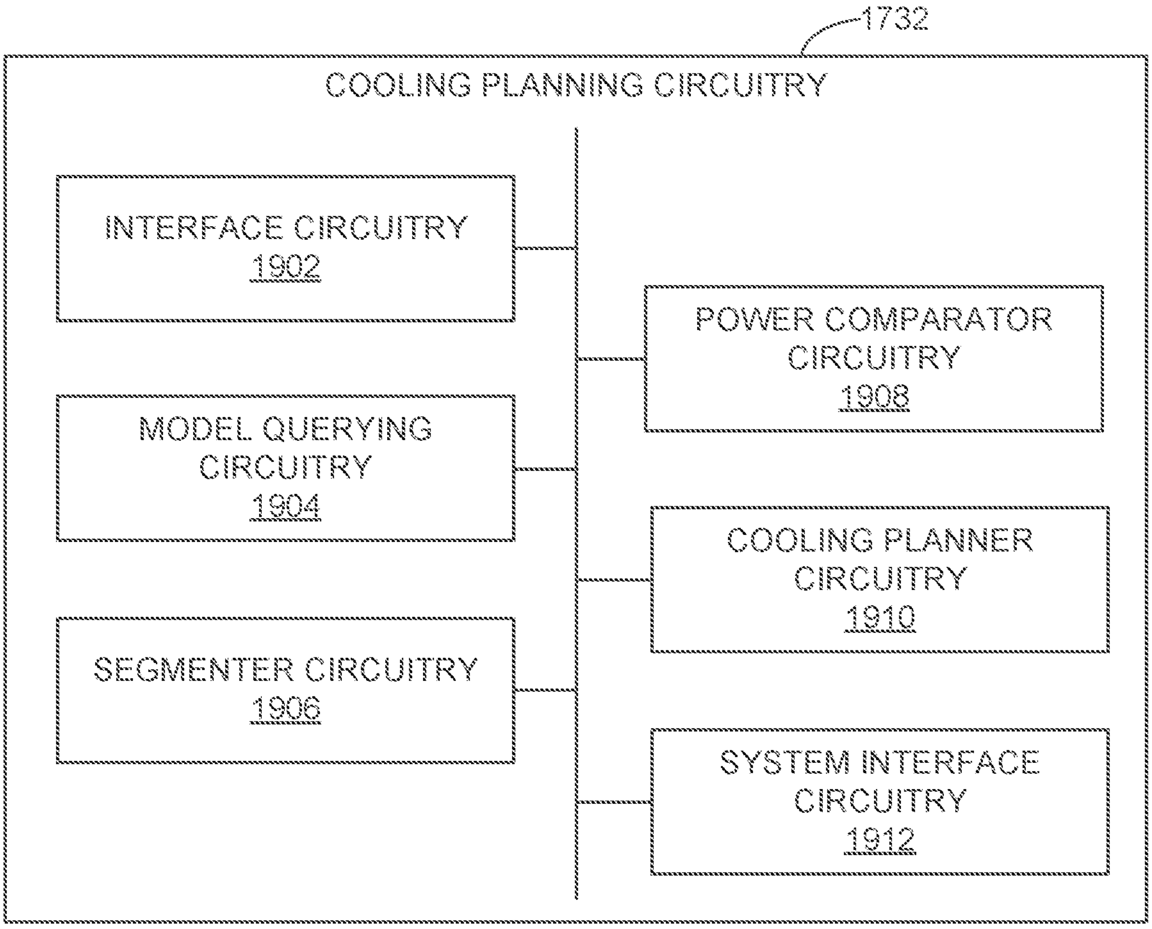
FIG. 19 is a block diagram of an example implementation of the cooling planning circuitry of the example system of FIG. 17B.

FIG. 19 is a block diagram of the cooling planning circuitry 1719 of FIG. 17B to create a cooling plan for a server (e.g., one of the servers 1702A, 1702B, 1702C, 1702D of FIG. 17A, etc.) and/or a distributed compute system (e.g., the system 1700 of FIG. 17A, etc.). The cooling planning circuitry 1719 includes example interface circuitry

1902, example model querying circuitry 1904, example segmenter circuitry 1906, example power comparator circuitry 1908, example cooling planner circuitry 1910, and example system interface circuitry 1912. The cooling planning circuitry 1719 of FIG. 19 may be instantiated (e.g., creating an instance of, bring into being for any length of time, materialize, implement, etc.) by programmable circuitry such as a CPU executing first instructions. Additionally or alternatively, the cooling planning circuitry 1719 of FIG. 19 may be instantiated (e.g., creating an instance of, bring into being for any length of time, materialize, implement, etc.) by (i) an ASIC and/or (ii) an FPGA structured and/or configured in response to execution of second instructions to perform operations corresponding to the first instructions. It should be understood that some or all of the circuitry of FIG. 19 may, thus, be instantiated at the same or different times. Some or all of the circuitry may be instantiated, for example, in one or more threads executing concurrently on hardware and/or in series on hardware. Moreover, in some examples, some or all of the circuitry of FIG. 19 may be implemented by microprocessor circuitry executing instructions and/or FPGA circuitry performing operations to implement one or more virtual machines and/or containers.

The interface circuitry 1902 accesses sensor data corresponding to one or more time period(s) of operation of the first server 1702A and/or the first cooling systems 1703A. For example, the interface circuitry 1802 can receive sensor data from one or more of the sensors 1705A, 1705B, 1705C, 1705D associated with corresponding ones of the servers 1702A, 1702B, 1702C, 1702D, and/or corresponding ones of the cooling systems 1703A, 1703B, 1703C, 1703D. In some examples, the sensors 1705A, 1705B, 1705C, 1705D can provide data relating to the operational temperature of corresponding ones of the servers 1702A, 1702B, 1702C, 1702D, a performance metric of corresponding ones of the servers 1702A, 1702B, 1702C, 1702D (e.g., processor speed, memory speed, etc.), a performance metric of corresponding ones of the cooling systems 1703A, 1703B, 1703C, 1703D (e.g., a pump power, a flow rate, etc.), a volume of coolant in corresponding ones of the cooling systems 1703A, 1703B, 1703C, 1703D, etc. In some examples, the interface circuitry 1902 can access the available cooling power prediction 1727 from the available cooling power determiner circuitry 1726. Additionally or alternatively, the available cooling power determiner circuitry 1726 can periodically transmit the available cooling power prediction 1727 to the interface circuitry 1902.

In some examples, the interface circuitry 1902 can access related operational parameters of the system 1700. For example, the interface circuitry 1802 can interface with one or more external systems and/or databases to receive information relating to the operational conditions of the system 1700. In some examples, the operational parameters can include the ambient conditions parameters 1708 of FIG. 17B, the workload type parameters 1710 of FIG. 17B, the workload load parameters 1712 of FIG. 17B, the workload SLO parameters 1714 of FIG. 17B, and/or the cooling system parameters 1715 of FIG. 17B. For example, the interface circuitry 1902 can retrieve the ambient conditions parameters 1708 from a weather service, a database of historic weather records, and/or other sensors associated with the system 1700 (e.g., temperature sensors, atmospheric pressure sensors, humidity sensors, radiant light sensors, etc.). In some examples, the interface circuitry 1902 can receive the workload type parameters 1710, the workload load parameters 1712, the workload SLO parameters 1714, and/or the cooling system parameters 1715 from a database associate with the servers 1702A (e.g., local memory of the first servers 1702A, etc.), a remote database associated with the first server 1702A (e.g., database associated with an operator of the first server 1702A, etc.), a database associated with the distributed cooling system controller circuitry 1706, a server associated with one or more of the first server cooling controller circuitry 1704A, etc. In some examples, the interface circuitry 1902 is instantiated by programmable circuitry executing interface instructions and/or configured to perform operations such as those represented by the flowchart of FIG. 21.

In some examples, the cooling planning circuitry 1719 includes means for interfacing. For example, the means for interfacing may be implemented by the interface circuitry 1902. In some examples, the interface circuitry 1902 may be instantiated by programmable circuitry such as the example programmable circuitry 2312 of FIG. 23. For instance, the interface circuitry 1902 may be instantiated by the example microprocessor 2400 of FIG. 24 executing machine executable instructions such as those implemented by at least blocks 2102, 2104, 2110 of FIG. 21. In some examples, the interface circuitry 1902 may be instantiated by hardware logic circuitry, which may be implemented by an ASIC, XPU, or the FPGA circuitry 2500 of FIG. 25 structured to perform operations corresponding to the machine readable instructions. Additionally or alternatively, the interface circuitry 1902 may be instantiated by any other combination of hardware, software, and/or firmware. For example, the interface circuitry 1902 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The model querying circuitry 1904 queries and interfaces with the cooling prediction model 1716 of FIG. 17B. For example, the model querying circuitry 1904 can input the sensor data and operational parameters accessed by the interface circuitry 1902 into the cooling prediction model 1716. In some examples, the model querying circuitry 1904 can query a locally stored instance of the cooling prediction model 1716 (e.g., stored in memory associated with the cooling planning circuitry 1719, etc.). Additionally or alternatively, the model querying circuitry 1904 can query the cooling prediction model 1716 via a request sent via a local area network and/or a wired connection. In other examples, if the cooling prediction model 1716 is stored remotely (e.g., via the cloud, via a remote database, etc.), the model querying circuitry 1904 can query the cooling prediction model 1716 over a wide area network. In some examples, the model querying circuitry 1904 can access (e.g., receive, etc.) the required cooling prediction 1718 for the time period from the cooling prediction model 1716. In some examples, the model querying circuitry 1904 is instantiated by programmable circuitry executing model querying instructions and/or configured to perform operations such as those represented by the flowchart of FIG. 21.

In some examples, the cooling planning circuitry 1719 includes means for querying a machine learning model. For example, the means for querying a machine learning model may be implemented by the model querying circuitry 1904. In some examples, the model querying circuitry 1904 may be instantiated by programmable circuitry such as the example programmable circuitry 2312 of FIG. 23. For instance, the model querying circuitry 1904 may be instantiated by the example microprocessor 2400 of FIG. 24 executing machine executable instructions such as those implemented by at least blocks 2106, 2108 of FIG. 21. In some examples, the model querying circuitry 1904 may be instantiated by hardware logic circuitry, which may be implemented by an ASIC, XPU, or the FPGA circuitry 2500 of FIG. 25 structured to perform operations corresponding to the machine readable instructions. Additionally or alternatively, the model querying circuitry 1904 may be instantiated by any other combination of hardware, software, and/or firmware. For example, the model querying circuitry 1904 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The segmenter circuitry 1906 divides an upcoming time period associated with the required cooling prediction 1718 and/or the available cooling power prediction 1727 into discrete segments (e.g., time segments, discrete-time portions, periods, durations, etc.). For example, the segmenter circuitry 1906 can generate a plurality of time segments of equal duration (e.g., one-minute segments, five-minute segments, thirty-minute segments, 1-hour segments, etc.). In other examples, the segmenter circuitry 1906 can generate a plurality of time segments of non-equal durations. In other examples, the segmenter circuitry 1906 can divide the time period into a fixed number of segments (e.g., twenty-four segments, five segments, two segments, etc.). In some examples, the segmenter circuitry 1906 can divide the time period into segments based on the ambient conditions (e.g., a segment corresponding to a forecast sunny period, a segment corresponding to a forecast raining period, and/or time of day, etc.). In some examples, the segmenter circuitry 1906 is instantiated by programmable circuitry executing segmenter instructions and/or configured to perform operations such as those represented by the flowchart of FIG. 21.

In some examples, the cooling planning circuitry 1719 includes means for segmenting. For example, the means for segmenting may be implemented by the segmenter circuitry 1906. In some examples, the segmenter circuitry 1906 may be instantiated by programmable circuitry such as the example programmable circuitry 2312 of FIG. 23. For instance, the segmenter circuitry 1906 may be instantiated by the example microprocessor 2400 of FIG. 24 executing machine executable instructions such as those implemented by at least blocks 2112, 2114 of FIG. 21. In some examples, the segmenter circuitry 1906 may be instantiated by hardware logic circuitry, which may be implemented by an ASIC, XPU, or the FPGA circuitry 2500 of FIG. 25 structured to perform operations corresponding to the machine readable instructions. Additionally or alternatively, the segmenter circuitry 1906 may be instantiated by any other combination of hardware, software, and/or firmware. For example, the segmenter circuitry 1906 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The power comparator circuitry 1908 compares the required cooling prediction 1718 with the available cooling power prediction 1727 for the segment. For example, the power comparator circuitry 1908, for a selected time segment, can compare the predicted cooling power required for that time segment, determined via the required cooling prediction 1718, and the available cooling power for that time segment, determined via the available cooling power prediction 1727. In some examples, the power comparator circuitry 1908 can determine a difference between the cooling prediction for that segment and the available cooling power for that time segment. For example, the power comparator circuitry 1908 can compare the first prediction 1720A of FIG. 17B to the first power availability prediction 1728A of FIG. 17B to determine a difference of 0 kW. Similarly, if another segment was selected, the power comparator circuitry 1908 can compare the second prediction 1720B of FIG. 17B to the second power availability prediction 1728B of FIG. 17B to determine a difference of −400 W (e.g., a cooling deficiency of 400 Watts). Similarly, if another segment was selected, the power comparator circuitry 1908 can compare the third prediction 1720C of FIG. 17B to the third power availability prediction 1728C of FIG. 17B to determine a difference of 200 W (e.g., a cooling excess of 200 Watts). In some examples, the power comparator circuitry 1908 is instantiated by programmable circuitry executing power comparator instructions and/or configured to perform operations such as those represented by the flowchart of FIG. 21.

In some examples, the cooling planning circuitry 1719 includes means for comparing power. For example, the means for comparing power may be implemented by the power comparator circuitry 1908. In some examples, the power comparator circuitry 1908 may be instantiated by programmable circuitry such as the example programmable circuitry 2312 of FIG. 23. For instance, the power comparator circuitry 1908 may be instantiated by the example microprocessor 2400 of FIG. 24 executing machine executable instructions such as those implemented by at least block 2116 of FIG. 21. In some examples, the power comparator circuitry 1908 may be instantiated by hardware logic circuitry, which may be implemented by an ASIC, XPU, or the FPGA circuitry 2500 of FIG. 25 structured to perform operations corresponding to the machine readable instructions. Additionally or alternatively, the power comparator circuitry 1908 may be instantiated by any other combination of hardware, software, and/or firmware. For example, the power comparator circuitry 1908 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The cooling planner circuitry 1910 creates the overall cooling plan 1729 for the operation of one or more of the servers 1702A, 1702B, 1702C, 1702D based on the output of the power comparator circuitry 1908 for the time period. For example, the cooling planner circuitry 1910 can create a temporally segmented cooling plan (e.g., the temporally segmented cooling plans 1730A, 1730B, 1730C, 1730D of FIG. 17B, etc.) for each of the generated segments. In some examples, the cooling planner circuitry 1910 can create a temporally segmented cooling plan (e.g., the first temporally segmented cooling plan 1730A, etc.) to operate the system normally if the available cooling power for the segment is greater than or substantially equal to the predicted cooling power. In some examples, for a segment with a predicted cooling power excess (e.g., the predicted available cooling power is greater than the predicted cooling power requirement, etc.), the cooling planner circuitry 1910 can create a plan portion (e.g., the third temporally segmented cooling plan 1730C of FIG. 17B, etc.) to decrease the temperature of the system. In some examples, reducing the temperature of the system can improve the computational performance of the system (e.g., reducing the temperature of one or more of the servers 1702A, 1702B, 1702C, 1702D improves the performance of corresponding ones of the servers 1702A, 1702B, 1702C, 1702D and/or the system 1700 as a whole, etc.).

In some examples, for a segment with a predicted cooling deficiency (e.g., the available cooling power during that segment is less than the predicted cooling power, etc.), the cooling planner circuitry 1910 can create a plan portion (e.g., the second temporally segmented cooling plan 1730B of FIG. 17B, etc.) to modify the workload on the system (e.g., throttle the workload on the system, cap the power output of the system via a power control unit, redeploy the workload to another server, reduce the frequency of the processing cores of the first server, etc.). Additionally or alternatively, for a segment with a predicted cooling deficiency, the cooling planner circuitry 1910 can create a plan portion (e.g., the fourth temporally segmented cooling plan 1730D of FIG. 17B, etc.) to increase the temperature of the system. In some such examples, the cooling planner circuitry 1910 can create a plan to increase the temperature of the system if a previous segment has an associated temporally segmented cooling plan to decrease the temperature of the system (e.g., the cooling planner circuitry 1910 expects the system to be operating below target operational temperature, etc.) and/or if an upcoming segment has an associated temporally segmented cooling plan to decrease the temperature of the system (e.g., the cooling planner circuitry 1910 expects the system to operate above the target operational temperature temporarily until said upcoming segment, etc.). In some examples, the cooling planner circuitry 1910 is instantiated by programmable circuitry executing cooling planner instructions and/or configured to perform operations such as those represented by the flowchart of FIG. 21.

In some examples, the cooling planning circuitry 1719 includes means for planning operation of one or more server(s) and cooling system(s). For example, the means for planning operation of one or more server(s) and cooling system(s) may be implemented by the cooling planner circuitry 1910. In some examples, the cooling planner circuitry 1910 may be instantiated by programmable circuitry such as the example programmable circuitry 2312 of FIG. 23. For instance, the cooling planner circuitry 1910 may be instantiated by the example microprocessor 2400 of FIG. 24 executing machine executable instructions such as those implemented by at least blocks 2118-2132, 2136 of FIG. 21. In some examples, the cooling planner circuitry 1910 may be instantiated by hardware logic circuitry, which may be implemented by an ASIC, XPU, or the FPGA circuitry 2500 of FIG. 25 structured to perform operations corresponding to the machine readable instructions. Additionally or alternatively, the cooling planner circuitry 1910 may be instantiated by any other combination of hardware, software, and/or firmware. For example, the cooling planner circuitry 1910 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

The system interface circuitry 1912 implements the overall cooling plan 1729. For example, the system interface circuitry 1912 can cause one or more of the servers 1702A, 1702B, 1702C, 1702D and/or one or more of the cooling systems 1703A, 1703B, 1703C, 1703D to operate according to the temporally segmented cooling plans during the corresponding time segments. In some examples, the system interface circuitry 1912 can, during the time corresponding to a first segment, cause the system 1700 to operate according to the first temporally segmented cooling plan 1730A. During the time corresponding to a second segment, the system interface circuitry 1912 can cause the system 1700 to operate according to the second temporally segmented cooling plan 1730B. During the time corresponding to a third segment the system interface circuitry 1912 can cause the system 1700 to operate according to the third temporally segmented cooling plan 1730C. During the time corresponding to a fourth segment, the system interface circuitry 1912 can cause the system 1700 to operate according to the fourth temporally segmented cooling plan 1730D, etc. In some examples, the system interface circuitry 1912 can control the operation of one or more of the cooling systems 1703A, 1703B, 1703C, 1703D via one or more controllable feature(s) (e.g., pump speed, a valve, etc.) of the cooling systems 1703A, 1703B, 1703C, 1703D. Similarly, the system interface circuitry 1912 can control the operation of one or more of the servers 1702A, 1702B, 1702C, 1702D via one or more controllable feature(s) of the servers 1702A, 1702B, 1702C, 1702D. In some examples, the system interface circuitry 1912 is instantiated by programmable circuitry executing system interface instructions and/or configured to perform operations such as those represented by the flowchart of FIG. 21.

In some examples, the cooling planning circuitry 1719 includes means for interfacing with one or more cooling system(s) and server(s). For example, the means for interfacing with one or more cooling system(s) and server(s) may be implemented by the system interface circuitry 1912. In some examples, the system interface circuitry 1912 may be instantiated by programmable circuitry such as the example programmable circuitry 2312 of FIG. 23. For instance, the system interface circuitry 1912 may be instantiated by the example microprocessor 2400 of FIG. 24 executing machine executable instructions such as those implemented by at least block 2136 of FIG. 21. In some examples, the system interface circuitry 1912 may be instantiated by hardware logic circuitry, which may be implemented by an ASIC, XPU, or the FPGA circuitry 2500 of FIG. 25 structured to perform operations corresponding to the machine readable instructions. Additionally or alternatively, the system interface circuitry 1912 may be instantiated by any other combination of hardware, software, and/or firmware. For example, the system interface circuitry 1912 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured or structured to execute some or all of the machine readable instructions and/or to perform some or all of the operations corresponding to the machine readable instructions without executing software or firmware, but other structures are likewise appropriate.

While an example manner of implementing the cooling planning circuitry 1719 of FIG. 17B is illustrated in FIG. 19, one or more of the elements, processes, and/or devices illustrated in FIG. 19 may be combined, divided, re-arranged, omitted, eliminated, and/or implemented in any other way. Further, the example interface circuitry 1902, the example model querying circuitry 1904, the power comparator circuitry 1908, the segmenter circuitry 1906, the cooling planner circuitry 1910, the system interface circuitry 1912, and/or, more generally, the example cooling planning circuitry 1719 of FIGS. 17B and 19, may be implemented by hardware alone or by hardware in combination with software and/or firmware. Thus, for example, any of the example interface circuitry 1902, the example model querying circuitry 1904, the power comparator circuitry 1908, the segmenter circuitry 1906, the cooling planner circuitry 1910, the system interface circuitry 1912, and/or, more generally, the example cooling planning circuitry 1719, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGA(s). Further still, the example cooling planning circuitry 1719 of FIGS. 17B and/or 19 may include one or more elements, processes, and/or devices in addition to, or instead of, those illustrated in FIG. 19, and/or may include more than one of any or all of the illustrated elements, processes and devices.

Figure 22:
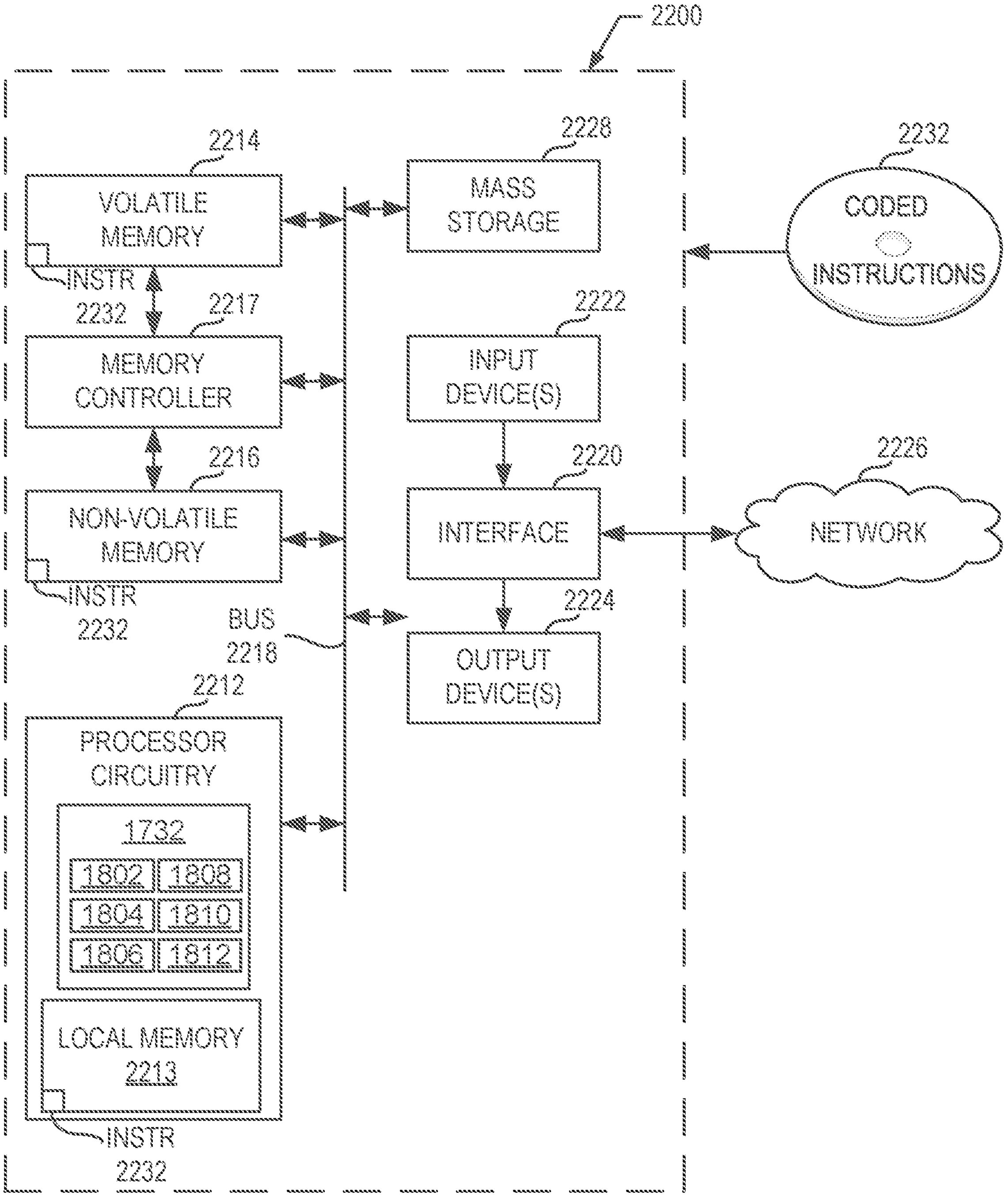
FIG. 22 is a block diagram of an example processing platform including programmable circuitry structured to execute, instantiate, and/or performed example machine readable instructions and/or perform example operations to implement the circuitry of the example model generator circuitry of FIGS. 17B and/or 18.

A flowchart representative of example machine readable instructions, which may be executed by programmable circuitry to implement and/or instantiate the model generator circuitry 1732 of FIG. 17B and/or representative of example operations which may be performed by programmable circuitry to implement and/or instantiate the model generator circuitry 1732 of FIG. 17B is shown in FIG. 22. The machine readable instructions may be one or more executable programs or portion(s) of one or more executable programs for execution by programmable circuitry, such as the programmable circuitry 2212 shown in the example programmable circuitry platform 2200 discussed below in connection with FIG. 22 and/or may be one or more functions or portion(s) of functions to be performed by the example programmable circuitry (e.g., FPGA) discussed below in connection with FIGS. 24 and/or 25. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 20, many other methods of implementing the example the model generator circuitry 1732 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.) For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination thereof.

Figure 20:
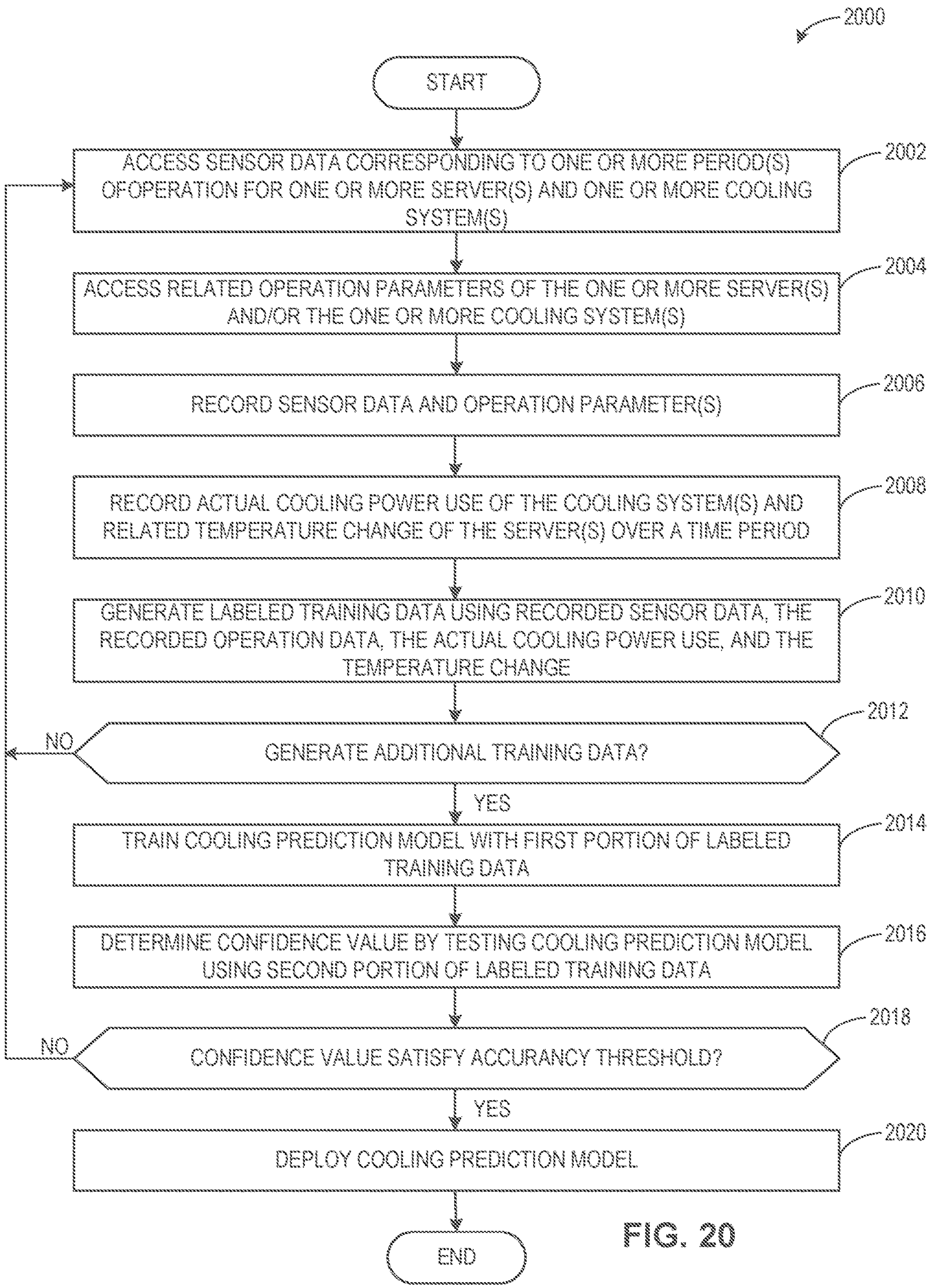
FIG. 20 is a flowchart representative of example machine readable instructions and/or example operations that may be executed, instantiated, and/or performed by example programmable circuitry to implement the model generation circuitry of FIG. 18.

FIG. 20 is a flowchart representative of example machine readable instructions and/or example operations 2000 that may be executed, instantiated, and/or performed by programmable circuitry to train and deploy a machine-learning model to determine the cooling requirements of a server (e.g., the first server 1702A, etc.). The example machine readable instructions and/or the example operations 2000 of FIG. 20 begin at block 2002, at which the interface circuitry 1802 accesses sensor data corresponding to one or more period(s) of operation of one or more server(s) (e.g., the first server 1702A, the second server 1702B, the third server 1702C, the fourth server 1702D, etc.) and/or one or more cooling systems (e.g., the first cooling system 1703A, the second cooling system 1703B, the third cooling system 1703C, the fourth cooling system 1703D, etc.). For example, the interface circuitry 1802 can receive sensor data from one or more of the sensors 1705A, 1705B, 1705C, 1705D associated with the servers 1702A, 1702B, 1702C, 1702D, respectively, and/or the associated with the cooling system 1703A, 1703B, 1703C, 1703D, etc. In some examples, the sensors 1705A, 1705B, 1705C, 1705D can provide data relating to the operational temperature of the servers 1702A, 1702B, 1702C, 1702D, a performance metric of one or more of the servers 1702A, 1702B, 1702C, 1702D (e.g., processor speed, memory speed, etc.), a performance metric of the cooling system 1703A, 1703B, 1703C, 1703D (e.g., a pump power, a flow rate, etc.), a volume of coolant in the cooling system 1703A, 1703B, 1703C, 1703D, etc. In some examples, the interface circuitry 1802 can transform the received sensor data from a machine-readable format (e.g., a voltage, a current, etc.) to a human-readable format (e.g., a string, a floating-point number, an integer, etc.).

At block 2004, the interface circuitry 1802 accesses related operational parameters of one or more of the servers 1702A, 1702B, 1702C, 1702D and/or the one or more cooling systems 1703A, 1703B, 1703C, 1703D. For example, the interface circuitry 1802 can interface with one or more external systems and/or databases to receive information relating to the operational conditions of the servers 1702A, 1702B, 1702C, 1702D. In some examples, the operational parameters can include the ambient conditions parameters 1708 of FIG. 17A, the workload type parameters 1710 of FIG. 17A, the workload load parameters 1712 of FIG. 17A, the workload SLO parameters 1714 of FIG. 17A, and/or the cooling system parameters 1715 of FIG. 17A. In some examples, the interface circuitry 1802 can retrieve the ambient conditions parameters 1708 from a weather service, a database of historic weather records, and/or other sensors associated with the system 1700 (e.g., temperature sensors, atmospheric pressure sensors, humidity sensors, radiant light sensors, etc.). In some examples, the interface circuitry 1802 can receive the workload type parameters 1710, the workload load parameters 1712, the workload SLO parameters 1714, and/or the cooling system parameters 1715 from a database associated with one or more of the servers 1702A, 1702B, 1702C, 1702D (e.g., local memory of one or more servers 1702A, 1702B, 1702C, 1702D, etc.), a remote database associated with the servers 1702A, 1702B, 1702C, 1702D (e.g., a database associated with an operator of the servers 1702A, 1702B, 1702C, 1702D, etc.), a database associated with the distributed cooling system controller circuitry 1706, and/or a server associated with one or more of the server cooling controller circuitries 1704A, 1704B, 1704C, 1704D, etc. In some examples, the interface circuitry 1802 can transform the received data from a machine-readable format (e.g., a voltage, a current, etc.) to a human-readable format (e.g., a string, a floating-point number, an integer, etc.).

At block 2006, the recorder circuitry 1804 records sensor data and operational parameters. For example, the recorder circuitry 1804 can record the sensor data, accessed by the interface circuitry 1802 during the execution of block 2002, and the operational parameters 1708, 1710, 1712, 1714, 1715, accessed by the interface circuitry 1802 during the execution of block 2004, in memory (e.g., the local memory 2213 of FIG. 22, the volatile memory 2214 of FIG. 22, the non-volatile memory 2216 of FIG. 22, and/or the mass storage 2228 of FIG. 22, etc.). In some examples, the record circuitry 1804 can create a data structure (e.g., a matrix, a vector, etc.) that includes the accessed data and a timestamp associated with the accessed data (e.g., a timestamp associated with an upcoming workload associated with the workload type parameters 1710, the workload load parameters 1712, and/or the workload SLO parameters 1714, etc.). In other examples, the record circuitry 1804 can record (e.g., save, store, etc.) the accessed sensor data and operational parameters in any other suitable memory (e.g., memory associated with the distributed cooling system controller circuitry 1706, memory associated with one or more of the server cooling controller circuitries 1704A, 1704B, 1704C, 1704D, etc.).

At block 2008, the recorder circuitry 1804 records the actual cooling power use of one or more of the cooling systems 1703A, 1703B, 1703C, 1703D and the related temperature change of corresponding ones of the servers 1702A, 1702B, 1702C, 1702D over one or more time period(s). For example, the recorder circuitry 1804 records the actual cooling power used by the cooling systems 1703A, 1703B, 1703C, 1703D and the related temperature change of the servers 1702A, 1702B, 1702C, 1702D in memory (e.g., the local memory 2213 of FIG. 22, the volatile memory 2214 of FIG. 22, the non-volatile memory 2216 of FIG. 22, and/or the mass storage 2228 of FIG. 22, etc.). In some examples, the recorder circuitry 1804 can record the actual cooling power use in a same data structure created during the execution of block 2006. In some such examples, the recorder circuitry 1804 can use a timestamp associated with the data structure to associate the actual cooling power use of the cooling systems 1703A, 1703B, 1703C, 1703D and related temperature change of the servers 1702A, 1702B, 1702C, 1702D. In some examples, the actual cooling power use and related temperature change can be input by an operator of the servers 1702A, 1702B, 1702C, 1702D, the cooling systems 1703A, 1703B, 1703C, 1703D, and/or the model generator circuitry 1732. Additionally or alternatively, the actual cooling power and related temperature change can be received by the interface circuitry 1802 from one or more of the sensors 1705A, 1705B, 1705C, 1705D, and/or other sensors associated with the system 1700.

At block 2010, the labeler circuitry 1806 generates labeled training data using the recorded sensor data, the recorded operational data, the actual cooling power use of the cooling system(s), and the temperature change of the server(s). For example, the labeler circuitry 1806 can use the data structure generated during the execution of blocks 2006, 2008 to generate labeled training data including the recorded sensor data and the recorded operational data as inputs and the actual cooling power use of the cooling systems 1703A, 1703B, 1703C, 1703D and the related heat change of the corresponding one of the servers 1702A, 1702B, 1702C, 1702D. For example, the labeler circuitry 1806 can create an instance of training data using the data from the first sensors 1705A and the operational parameters 1708, 1710, 1712, 1714, 1715 of the first server 1702A and the first cooling system 1703A as inputs and the power use of the first cooling system 1703A and the temperature increase of the first server 1702A during a time period. If the labeler circuitry 1806 is creating training data from an entire system (e.g., for a data center including each of the servers 1702A, 1702B, 1702C, 1702D, etc.), the labeler circuitry 1806 can create an instance of training data using the data from the sensors 1705A, 1705B, 1705C, 1705D and the operational parameters 1708, 1710, 1712, 1714, 1715 of the servers 1702A, 1702B, 1702C, 1702D and the cooling systems 1703A, 1703B, 1703C, 1703D as inputs and the power use of the cooling systems 1703A, 1703B, 1703C, 1703D and the temperature increase of the servers 1702A, 1702B, 1702C, 1702D during a time period. In other examples, the labeler circuitry 1806 can create training data from the recorded data in any other suitable manner.

At block 2012, the labeler circuitry 1806 determines if additional training data is to be generated. For example, the labeler circuitry 1806 can continue to generate training data until a threshold amount of training data has been generated (e.g., one hundred instances, one thousand instances, etc.). Additionally or alternatively, the labeler circuitry 1806 can generate training data until all data recorded during the execution of blocks 2006, 2008 is used to generate training data. In other examples, the labeler circuitry 1806 can generate training data until receiving a command from an operator of the model generator circuitry 1732 and/or after a threshold time period has elapsed. If the label circuitry 1806 determines additional training data is to be generated, the operations 2000 return to block 2002. If the label circuitry 1806 determines additional training data is not to be generated, the operations 2000 advance to block 2014.

At block 2014, the model trainer circuitry 1808 trains a cooling prediction model (e.g., the cooling prediction model 1716 of FIG. 17A, etc.) using a first portion of the labeled training data. For example, the model trainer circuitry 1808 trains a machine learning model with labeled training data. For example, the model trainer circuitry 1808 can train a neural network using the labeled training data via supervised learning. In some such examples, the model trainer circuitry 1808 can use any suitable supervised learning method (e.g., support vector machine, linear regressions, logistic regression, discriminant function analysis, decision tree learning, etc.). In some examples, the model trainer circuitry 1808 can train a neural network that is a long short-term memory (LSTM) neural network. In other examples, the machine learning model trained by the model trainer circuitry 1808 can be another type of neural network (e.g., a different recurrent neural network (RNN), a feedforward neural network (FNN), etc.). In other examples, the model trainer circuitry 1808 can train the neural network via any other suitable training technique, including unsupervised learning.

At block 2016, the model tester circuitry 1810 determines a confidence value by testing the cooling prediction model using a second portion of the labeled training data. For example, the model tester circuitry 1810 can input the second portion of the labeled training data into the trained neural network, generated by the model trainer circuitry 1808, record the output of the neural network (e.g., a predicted cooling power use of a cooling system and a predicted temperature change of the server, etc.), and compare the outputs of the trained neural network to labels of the second training portion. In some such examples, the model tester circuitry 1810 can generate a confidence value (e.g., a percentage of outputs of the cooling model that match the corresponding label generated by the labeler circuitry 1806, an average error of the cooling model, etc.). In other examples, the model tester circuitry 1810 can test the generated neural network in any other suitable manner.

At block 2018, the model tester circuitry 1810 determines if the confidence value satisfies an accuracy threshold. For example, the model tester circuitry 1810 can compare the confidence value generated by the model tester circuitry 1810 to a preset accuracy threshold. In some such examples, the accuracy threshold can be any suitable value (e.g., 75%, 90%, 99%, etc.). In other examples, the model tester circuitry 1810 can determine if the generated cooling model is sufficiently accurate in any other suitable manner. If the model tester circuitry 1810 determines the confidence value satisfies the accuracy threshold, the operations 2000 advance to block 2020. If the model tester circuitry 1810 determines the confidence value does not satisfy the accuracy threshold, the operations 2000 return to block 2002.

At block 2020, the model deployer circuitry 1812 deploys the cooling model. For example, the model deployer circuitry 1812 deploys the cooling prediction model 1716 for use in the process 1707 of FIG. 17B. In some examples, the model deployer circuitry 1812 can transmit the neural network to one or more of the server cooling controller circuitries 1704A, 1704B, 1704C, 1704D, and/or the distributed cooling system controller circuitry 1706. Additionally or alternatively, the model deployer circuitry 1812 can publish the neural network to the cloud platform, an edge platform, and/or another suitable platform(s). In other examples, the model deployer circuitry 1812 can deploy the neural network in any other suitable manner. Thereafter, the operations 2000 end.

Figure 21:
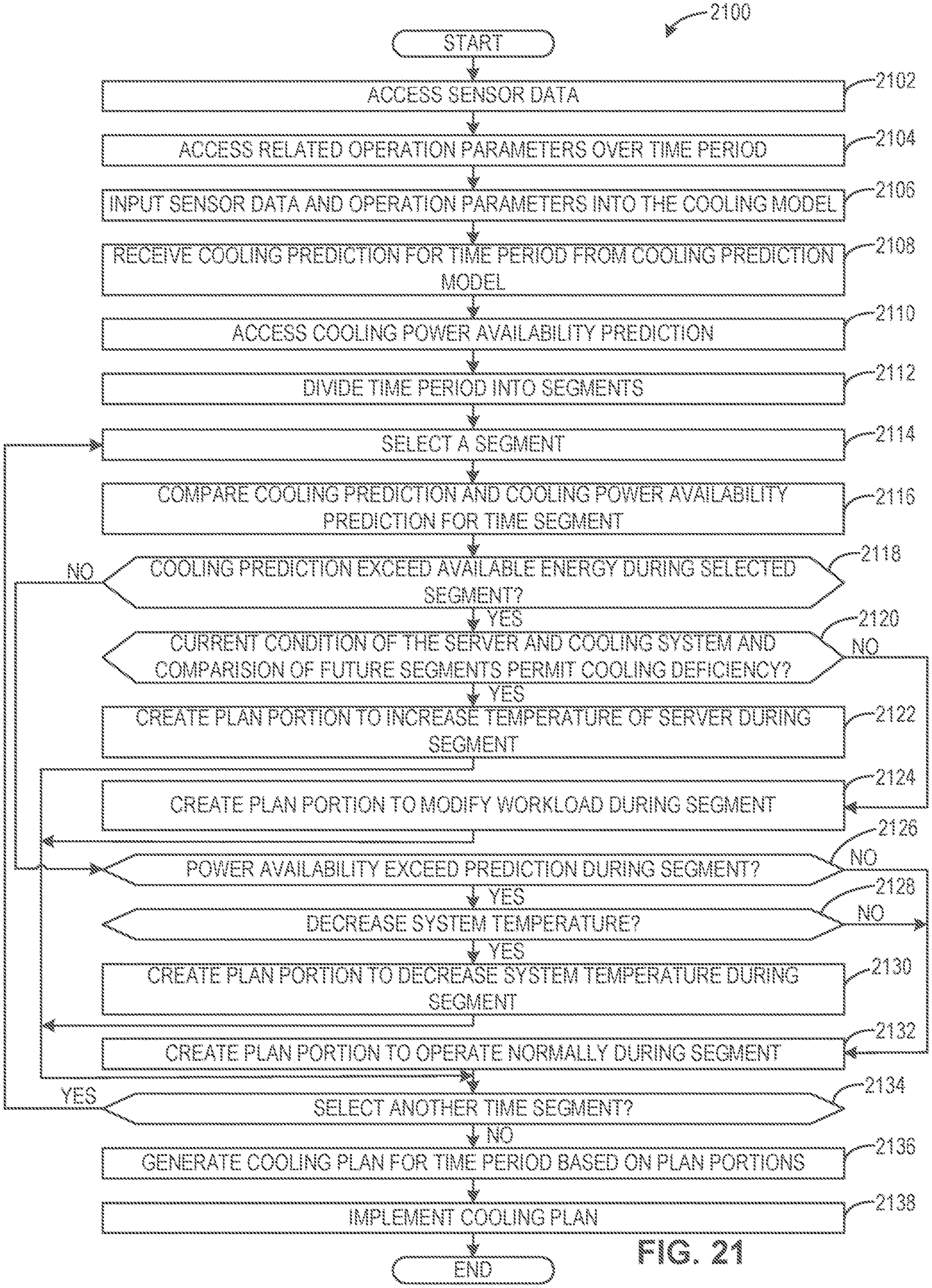
FIG. 21 is a flowchart representative of example machine readable instructions and/or example operations that may be executed, instantiated, and/or performed by example programmable circuitry to implement the cooling planning circuitry of FIGS. 17B and/or 19.

A flowchart representative of example machine readable instructions, which may be executed by programmable circuitry to implement and/or instantiate the cooling planning circuitry 1719 of FIG. 17B and/or representative of example operations which may be performed by programmable circuitry to implement and/or instantiate the cooling planning circuitry 1719 of FIG. 17B, is shown in FIG. 21. The machine readable instructions may be one or more executable programs or portion(s) of one or more executable programs for execution by programmable circuitry, such as the programmable circuitry 2312 shown in the example programmable circuitry platform 2300 discussed below in connection with FIG. 23 and/or may be one or more function(s) or portion(s) of functions to be performed by the example programmable circuitry (e.g., FPGA) discussed below in connection with FIGS. 24 and/or 25. In some examples, the machine readable instructions cause an operation, a task, etc., to be carried out and/or performed in an automated manner in the real world.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 21, many other methods of implementing the example cooling planning circuitry 1719 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., programmable circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core CPU, a multi-core processor (e.g., a multi-core CPU, an XPU, etc.) For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 20 and 21 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 21 is a flowchart representative of example machine readable instructions and/or example operations 2100 that may be executed, instantiated, and/or performed by programmable circuitry to plan the operation of one or more servers (e.g., a first server 1702A, the second server 1702B, etc.) and/or one or more cooling systems (e.g., a first cooling system 1703A, a second cooling system 1703B, etc.). While the proceeding paragraphs and FIG. 21 describe the operations 2100 with reference to the first server 1702A and the first cooling system 1703A, it should be appreciated the operations 2100 can be applied to other servers (e.g., the servers 1702B, 1702C, 1702D, etc.), other cooling systems (e.g., the cooling systems 1703B, 1703C, 1703D, etc.) and/or compute system as a whole (e.g., the system 1700 of FIG. 17A, etc.).

The example machine readable instructions and/or the example operations 2100 of FIG. 21 begin at block 2102, at which the interface circuitry 1902 accesses sensor data. For example, the interface circuitry 1902 accesses sensor data corresponding to one or more time period(s) of operation of the first server 1702A and/or the first cooling systems 1703A. For example, the interface circuitry 1902 can receive sensor data from one or more of the sensors 1705A associated with the first server 1702A and/or the first cooling system 1703A. In some examples, the sensors 1705A can provide data relating to the operational temperature of the first server 1702A, a performance metric of the first server 1702A (e.g., processor speed, memory speed, etc.), a performance metric of the first cooling system 1703A (e.g., a pump power, a flow rate, etc.), a volume of coolant in the cooling system 1703A, etc. In some examples, the interface circuitry 1902 can transform the received sensor data from a machine-readable format (e.g., a voltage, a current, etc.) to a human-readable format (e.g., a string, a floating-point number, an integer, etc.).

At block 2104, the interface circuitry 1902 accesses related operational parameters over a time period. For example, the interface circuitry 1902 the interface circuitry 1902 can access related operational parameters of the first servers 1702A and/or the first cooling systems 1703A. For example, the interface circuitry 1902 can interface with one or more external systems and/or databases to receive information relating to the operational conditions of the first server 1702A. In some examples, the operational parameters can include the ambient conditions parameters 1708 of FIG. 17A, the workload type parameters 1710, the workload load parameters 1712, the workload SLO parameters 1714, and/or the cooling system parameters 1715 of FIG. 17A. For example, the interface circuitry 1902 can retrieve the ambient conditions parameters 1708 from a weather service, a database of historic weather records, and/or other sensors associated with the system 1700 (e.g., temperature sensors, atmospheric pressure sensors, humidity sensors, radiant light sensors, etc.). In some examples, the interface circuitry 1902 can receive workload type parameters 1710, the workload load parameters 1712, and/or the workload SLO parameters 1714, and/or the cooling system parameters 1715 from a database associated with the servers 1702A (e.g., local memory of the first servers 1702A, etc.), a remote database associated with the first server 1702A (e.g., a database associated with an operator of the first server 1702A, etc.), a database associated with the distributed cooling system controller circuitry 1706, a server associated with one or more of the first server cooling controller circuitry 1704A, etc. In some examples, the interface circuitry 1902 can transform the received sensor data from a machine-readable format (e.g., a voltage, a current, etc.) to a human-readable format (e.g., a string, a floating-point number, an integer, etc.).

At block 2106, the model querying circuitry 1904 inputs the sensor data and operational parameters into the cooling prediction model 1716. For example, the model querying circuitry 1904 inputs sensor data and operational parameters into the cooling prediction model 1716 by querying the cooling prediction model 1716 that is deployed locally on the first server 1702A. In some examples, the cooling prediction model 1716 can be stored locally on the first server 1702A and/or another location in a data center in the first server 1702A. In some such examples, the model querying circuitry 1904 can query the cooling prediction model 1716 via a request sent via a local area network and/or a wired connection. In other examples, if the cooling prediction model 1716 is stored remotely (e.g., via the cloud, via a remote database, etc.), the model querying circuitry 1904 can query the cooling prediction model 1716 via a wide area network. In other examples, the model querying circuitry 1904 can query the cooling model in any other suitable way.

At block 2108, the model querying circuitry 1904 receives the required cooling prediction 1718 for the time period from the cooling prediction model 1716. For example, the model querying circuitry 1904 can receive the required cooling prediction 1718 from the cooling model over a wired connection, over a local area network, and/or a wide area network. Additionally or alternatively, the model querying circuitry 1904 can receive the cooling prediction 1718 from memory associated with the first server 1702A. In other examples, the model querying circuitry 1904 can receive the cooling prediction 1718 in any other suitable means.

At block 2110, the interface circuitry 1902 accesses the available cooling power prediction 1727. For example, the interface circuitry 1902 can access an power availability estimate from the available cooling power prediction 1727 from the available cooling power determiner circuitry 1726. In some such examples, the interface circuitry 1902 can request the available cooling power prediction 1727 for the time period. Additionally or alternatively, the available cooling power determiner circuitry 1726 can periodically transmit the available cooling power prediction 1727 to the interface circuitry 1902. In other examples, the interface circuitry 1902 can access the available cooling power prediction 1727 in any other suitable manner.

At block 2112, the segmenter circuitry 1906 divides the time period into segments. For example, the segmenter circuitry 1906 can generate a plurality of time segments of equal duration (e.g., one-minute segments, five-minute segments, thirty-minute segments, 1-hour segments, etc.). In other examples, the segmenter circuitry 1906 can generate a plurality of time segments of non-equal durations. In other examples, the segmenter circuitry 1906 can divide the time period into a fixed number of segments (e.g., twenty-four segments, five segments, 2 segments, etc.). In some examples, the segmenter circuitry 1906 can divide the time period into segments based on the ambient conditions (e.g., a segment corresponding to a forecast sunny period, a segment corresponding to a forecast raining period, and/or time of day (e.g., a morning segment, an evening segment, etc.). At block 2114, the segmenter circuitry 1906 selects a segment. For example, the segmenter circuitry 1906 selects a segment of the time segments. In some examples, the segmenter circuitry 1906 can select a first one of the time segments and/or the next chronological one of the time segments. In other examples, the segmenter circuitry 1906 can select any previously unselected time segment of the time segments.

At block 2116, the power comparator circuitry 1908 compares the required cooling prediction 1718 with the available cooling power prediction 1727 for the segment. For example, the power comparator circuitry 1908, for the selected time segment, can compare the predicted cooling power required for that time segment, determined via the required cooling prediction 1718, and the available cooling power for that time segment, determined via the available cooling power prediction 1727. In some examples, the power comparator circuitry 1908 can determine a difference between the cooling prediction for that segment and the available cooling power for that time segment. For example, the power comparator circuitry 1908 can compare the first prediction 1720A of FIG. 17B to the first power availability prediction 1728A of FIG. 17B to determine a difference of 0 kW. Similarly, if another segment was selected, the power comparator circuitry 1908 can compare the second prediction 1720B of FIG. 17B to the second power availability prediction 1728B of FIG. 17B to determine a difference of −400 W (e.g., a cooling deficiency of 400 Watts). Similarly, if another segment was selected, the power comparator circuitry 1908 can compare the third prediction 1720C of FIG. 17B to the third power availability prediction 1728C of FIG. 17B to determine a difference 200 W (e.g., a cooling excess of 200 Watts).

At block 2118, the cooling planner circuitry 1910 determines if the cooling prediction exceeds available power during the selected segment. For example, the cooling planner circuitry 1910 can determine, based on the output of the power comparator circuitry 1908 during the execution of block 2116, determine if there is an expected cooling excess (e.g., the predicted available power for cooling exceeds the predicted required cooling power during the segment, etc.) or an expected cooling deficiency (e.g., the predicted required cooling power exceeds the predicted available power, etc.). If the cooling planner circuitry 1910 determines the cooling prediction exceeds the available power during the selected segment, the operations 2100 advance to block 2120. If the cooling planner circuitry 1910 determines the cooling prediction does not exceed the available power during the selected segment, the operations 2100 advance to block 2124.

At block 2120, the cooling planner circuitry 1910 determines if the current condition of the server 1702A and the cooling system 1703A and the comparison of the cooling prediction and power availability permits a cooling deficiency. For example, the cooling planner circuitry 1910 can determine to allow a cooling deficiency based on a future predicted cooling excess (e.g., proceeding segment of the time duration, etc.). Additionally or alternatively, if the first server 1702A is operating below a target operating temperature, the cooling planner circuitry 1910 can determine to allow a cooling deficiency. In other examples, the cooling planner circuitry 1910 can allow a cooling power overrun under any other suitable conditions (e.g., a user setting, expected ambient conditions, etc.). If the cooling planner circuitry 1910 determines the current condition of the server 1702A and the cooling system 1703A and the comparison of the cooling prediction and power availability do permit a cooling deficiency, the operations 2100 advances to block 2122. If the cooling planner circuitry 1910 the current condition of the server 1702A and the cooling system 1703A and the comparison of the cooling prediction and power availability do not permit a cooling deficiency, the operations 2100 advance to block 2124.

At block 2122, the cooling planner circuitry 1910 creates a plan portion to increase the temperature of the first server 1702A during the segment. For example, the cooling planner circuitry 1910 can create a temporally segmented cooling plan (e.g., an operation plan portion, etc.) corresponding to the selected segment that indicates the cooling system 1703A and the first server 1702A to operate normally (e.g., the first server 1702A executes the workload accordingly to the workload service level agreement, the cooling system 1703A uses all available power to cool the server 1702A, etc.) In some such examples, because the cooling system 1703A will not be able to dissipate all heat generated by the first server 1702A, the temperature of the first server 1702A is planned to increase during the selected segment. In some examples, the cooling planner circuitry 1910 can predict a temperature increase of the first server 1702A based on the cooling deficiency of the first cooling system 1703A (e.g., the cooling system 1703A is unable to dissipate 400 W of heat output by the first server 1702A causing the first server 1702A to increase in temperature by 10 degrees, etc.).

At block 2124, the cooling planner circuitry 1910 creates a plan portion to modify the workload of the first server 1702A during the selected segment. For example, the cooling planner circuitry 1910 can throttle the workload to be executed on the first server 1702A to reduce the heat output associated with the output of the workload and the amount of required cooling by the cooling system 1703A. Additionally or alternatively, the cooling planner circuitry 1910 can cap the power output of the first server 1702A via a power control unit, redeploy the workload to another server (e.g., one or more of the second server 1702B, the third server 1702C, the fourth server 1702D, etc.), reduce the frequency of the processing cores of the first server 1702A. In other examples, the cooling planner circuitry 1910 can create a temporally segmented cooling plan to reduce the heat output of the first server 1702A that includes any other suitable workload modifications.

At block 2126, the cooling planner circuitry 1910 determines if the available power exceeds the cooling prediction exceeds during the selected segment. For example, the cooling planner circuitry 1910 can determine, based on the output of the power comparator circuitry 1908 during the execution of block 2116, determine if there is an expected cooling excess (e.g., the predicted available power for cooling exceeds the predicted required cooling power during the segment, etc.) or an expected cooling deficiency (e.g., the predicted required cooling power exceeds the predicted available power, etc.). If the cooling planner circuitry 1910 determines the available power exceeds the cooling prediction during the selected segment, the operations 2100 advance to block 2128. If the cooling planner circuitry 1910 determines the available power does not exceed the cooling prediction during the selected segment, the operations 2100 advance to block 2132.

At block 2128, the cooling planner circuitry 1910 determines if the temperature of the server 1702A is to be decreased. For example, the cooling planner circuitry 1910 can determine to reduce the temperature of the server 1702A if the server 1702A is currently operating at a temperature above the target operating temperature of the server 1702A. In some examples, the cooling planner circuitry 1910 can determine to reduce the operating temperature if another temporally segmented cooling plan (e.g., a previous segment, an upcoming segment, etc.) includes a plan to increase the operating temperature of the first server 1702A (e.g., due to a cooling deficiency, etc.). Additionally or alternatively, the cooling planner circuitry 1910 can plan to reduce the operating temperature of the server 1702A for any other reason. If the cooling planner circuitry 1910 determines the temperature of the server 1702A is to be decreased, the operations 2100 advances to block 2130. If the cooling planner circuitry 1910 determines the temperature of the server 1702A is not to be decreased, the operations 2100 advance to block 2132.

At block 2130, the cooling planner circuitry 1910 creates a plan portion to decrease the system temperature of the first server 1702A during the selected segment. For example, the cooling planner circuitry 1910 can create a temporally segmented cooling plan for the cooling system 1703A to dissipate more heat from the server 1702A than the heat generated via the execution of the workload by the server 1702A, which reduces the temperature of the server 1702A. In some examples, the cooling planner circuitry 1910 creates a temporally segmented cooling plan (e.g., an operation plan portion, etc.) corresponding to the selected segment that indicates the first server 1702A is to operate normally and the cooling system 1703A is to use all available power to cool the first server 1702A. In some examples, the cooling planner circuitry 1910 can predict a temperature decrease of the first server 1702A based on the excess power used by the first cooling system 1703A (e.g., the cooling system 1703A dissipates 400 W of heat from the first server 1702A more than produced by the first server 1702A, causing the first server 1702A to decrease in temperature by 10 degrees, etc.).

At block 2132, the cooling planner circuitry 1910 creates a plan portion to operate normally during the selected segment. For example, the cooling planner circuitry 1910 can create a temporally segmented cooling plan (e.g., the first temporally segmented cooling plan 1730A of FIG. 17B, etc.) for the cooling system 1703A to dissipate a substantially equal amount of heat as the heat generated by the server 1702A by the execution of the workload by the server 1702A, which maintains the current temperature of the server 1702A, etc.). In other examples, the cooling planner circuitry 1910 can create a plan portion to operate normally in any other suitable manner.

At block 2134, the segmenter circuitry 1906 determines if another segment is to be selected. For example, the segmenter circuitry 1906 can determine if another segment is to be selected if there are segments that have yet to be analyzed. Additionally or alternatively, the segmenter circuitry 1906 can determine if another segment is to be selected based on user input. In some examples, the segmenter circuitry 1906 can determine to select another segment to iterate through the temporally segmented cooling plans (e.g., use temporally later cooling plans to change earlier cooling plans, etc.). If the segmenter circuitry 1906 determines another segment is to be selected, the operations 2100 return to block 2114. If the segmenter circuitry 1906 determines another segment is not to be selected, the operations 2100 advance to block 2136.

At block 2136, the cooling planner circuitry 1910 creates a cooling plan based on the plan portions. For example, the cooling planner circuitry 1910 can create a cooling plan (e.g., the overall cooling plan 1729 of FIG. 17B, etc.) by combining each of the temporally segmented cooling plans generated during the execution of blocks 2114-2134. At block 2138, the system interface circuitry 1912 implements the cooling plan. For example, the system interface circuitry 1912 cause the first server 1702A and/or the first cooling system 1703A to operate according to the cool plan portions (e.g., during the time corresponding to a first segment the system interface circuitry 1912 causes the first server 1702A and/or the first cooling system 1703A to operate according to the first temporally segmented cooling plan 1730A, during the time corresponding to a second segment the system interface circuitry 1912 causes the first server 1702A and/or the first cooling system 1703A to operate according to the second temporally segmented cooling plan 1730B, during the time corresponding to a third segment the system interface circuitry 1912 causes the first server 1702A and/or the first cooling system 1703A to operate according to the third temporally segmented cooling plan 1730C, during the time corresponding to a fourth segment the system interface circuitry 1912 causes the first server 1702A and/or the first cooling system 1703A to operate according to the fourth temporally segmented cooling plan 1730D, etc.). In some examples, the system interface circuitry 1912 can control the operation of the cooling system 1703A via a controllable feature of the cooling system 1703A (e.g., pump speed, a valve, etc.). In some examples, the system interface circuitry 1912 can control the operation of the first server 1702A via a controllable feature of the first server 1702A. After implementing the cooling plan, the operations 2100 end.

FIG. 22 is a block diagram of an example programmable circuitry platform 2200 structured to execute and/or instantiate the example machine readable instructions and/or the example operations to implement the circuitry of the example system 1700 of FIG. 17A. The programmable circuitry platform 2200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The programmable circuitry platform 2200 of the illustrated example includes programmable circuitry 2212. The programmable circuitry 2212 of the illustrated example is hardware. For example, the programmable circuitry 2212 can be implemented by one or more integrated circuits, logic circuits, FPGAs, microprocessors, CPUs, GPUs, DSPs, and/or microcontrollers from any desired family or manufacturer. The programmable circuitry 2212 may be implemented by one or more semiconductor based (e.g., silicon based) devices. In this example, the programmable circuitry 2212 includes the interface circuitry 1802, the recorder circuitry 1804, the labeler circuitry 1806, the model trainer circuitry 1808, the model tester circuitry 1810, and the model deployer circuitry 1812.

The programmable circuitry 2212 of the illustrated example includes a local memory 2213 (e.g., a cache, registers, etc.). The programmable circuitry 2212 of the illustrated example is in communication with a main memory 2214, 2216, which includes a volatile memory 2214 and a non-volatile memory 2216 by a bus 2218. The volatile memory 2214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2216 may be implemented by flash memory and/or any other desired type of memory device. Access to the main memory 2214, 2216 of the illustrated example is controlled by a memory controller 2217. In some examples, the memory controller 2217 may be implemented by one or more integrated circuits, logic circuits, microcontrollers from any desired family or manufacturer, or any other type of circuitry to manage the flow of data going to and from the main memory 2214, 2216.

The programmable circuitry platform 2200 of the illustrated example also includes interface circuitry 2220. The interface circuitry 2220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2222 are connected to the interface circuitry 2220. The input device(s) 2222 permit(s) a user (e.g., a human user, a machine user, etc.) to enter data and/or commands into the programmable circuitry 2212. The input device(s) 2222 can be implemented by, for example, an audio sensor, a microphone, a camera (still or video), a keyboard, a button, a mouse, a touchscreen, a trackpad, a trackball, an isopoint device, and/or a voice recognition system.

One or more output devices 2224 are also connected to the interface circuitry 2220 of the illustrated example. The output device(s) 2224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2220 of the illustrated example, thus, typically includes a graphics driver card, a graphics driver chip, and/or graphics processor circuitry such as a GPU.

The interface circuitry 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2226. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 2200 of the illustrated example also includes one or more mass storage devices 2228 to store firmware, software, and/or data. Examples of such mass storage discs or devices 2328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Machine readable instructions 2232 may be stored in the mass storage device 2228, in the volatile memory 2214, in the non-volatile memory 2216, and/or on at least one non-transitory computer readable storage medium such as a CD or DVD which may be removable.

Figure 23:
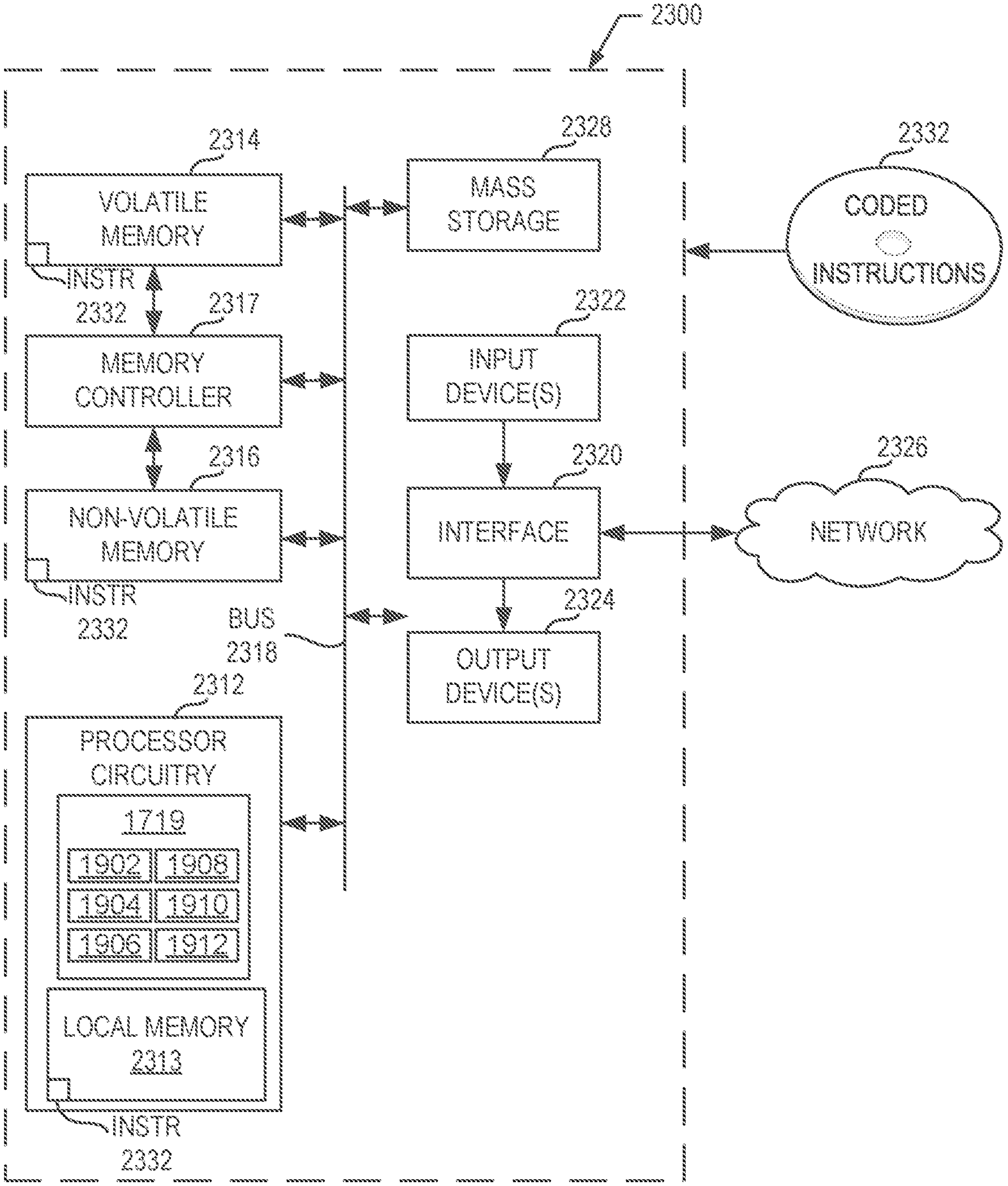
FIG. 23 is a block diagram of an example processing platform including processor circuitry structured to execute, instantiate, and/or perform example machine readable instructions and/or perform example operations to implement the circuitry of the example cooling planning circuitry of FIGS. 17B and/or 19.

FIG. 23 is a block diagram of an example programmable circuitry platform 2300 structured to execute and/or instantiate the example machine readable instructions and/or the example operations to implement the circuitry of the example cooling planning circuitry 1719 of FIG. 17A. The programmable circuitry platform 2300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing and/or electronic device.

The programmable circuitry platform 2300 of the illustrated example includes programmable circuitry 2312. The programmable circuitry 2312 of the illustrated example is hardware. For example, the programmable circuitry 2312 can be implemented by one or more integrated circuits, logic circuits, FPGAs, microprocessors, CPUs, GPUs, DSPs, and/or microcontrollers from any desired family or manufacturer. The programmable circuitry 2312 may be implemented by one or more semiconductor based (e.g., silicon based) devices. In this example, the programmable circuitry 2312 includes the interface circuitry 1902, the model querying circuitry 1904, the power comparator circuitry 1908, the segmenter circuitry 1906, the cooling planner circuitry 1910, and the system interface circuitry 1912.

The programmable circuitry 2312 of the illustrated example includes a local memory 2313 (e.g., a cache, registers, etc.). The programmable circuitry 2312 of the illustrated example is in communication with a main memory 2314, 2316, which includes a volatile memory 2314 and a non-volatile memory 2316 by a bus 2318. The volatile memory 2314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2316 may be implemented by flash memory and/or any other desired type of memory device. Access to the main memory 2314, 2316 of the illustrated example is controlled by a memory controller 2317. In some examples, the memory controller 2317 may be implemented by one or more integrated circuits, logic circuits, microcontrollers from any desired family or manufacturer, or any other type of circuitry to manage the flow of data going to and from the main memory 2314, 2316.

The programmable circuitry platform 2300 of the illustrated example also includes interface circuitry 2320. The interface circuitry 2320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2322 are connected to the interface circuitry 2320. The input device(s) 2322 permit(s) a user (e.g., a human user, a machine user, etc.) to enter data and/or commands into the programmable circuitry 2312. The input device(s) 2322 can be implemented by, for example, an audio sensor, a microphone, a camera (still or video), a keyboard, a button, a mouse, a touchscreen, a trackpad, a trackball, an isopoint device, and/or a voice recognition system.

One or more output devices 2324 are also connected to the interface circuitry 2320 of the illustrated example. The output device(s) 2324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2320 of the illustrated example, thus, typically includes a graphics driver card, a graphics driver chip, and/or graphics processor circuitry such as a GPU.

The interface circuitry 2320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2326. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 2300 of the illustrated example also includes one or more mass storage devices 2328 to store firmware, software and/or data. examples of such mass storage discs or devices 2328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Machine readable instructions 2332 may be stored in the mass storage device 2328, in the volatile memory 2314, in the non-volatile memory 2316, and/or on a at least one non-transitory computer readable storage medium such as a CD or DVD, which may be removable.

Figure 24:
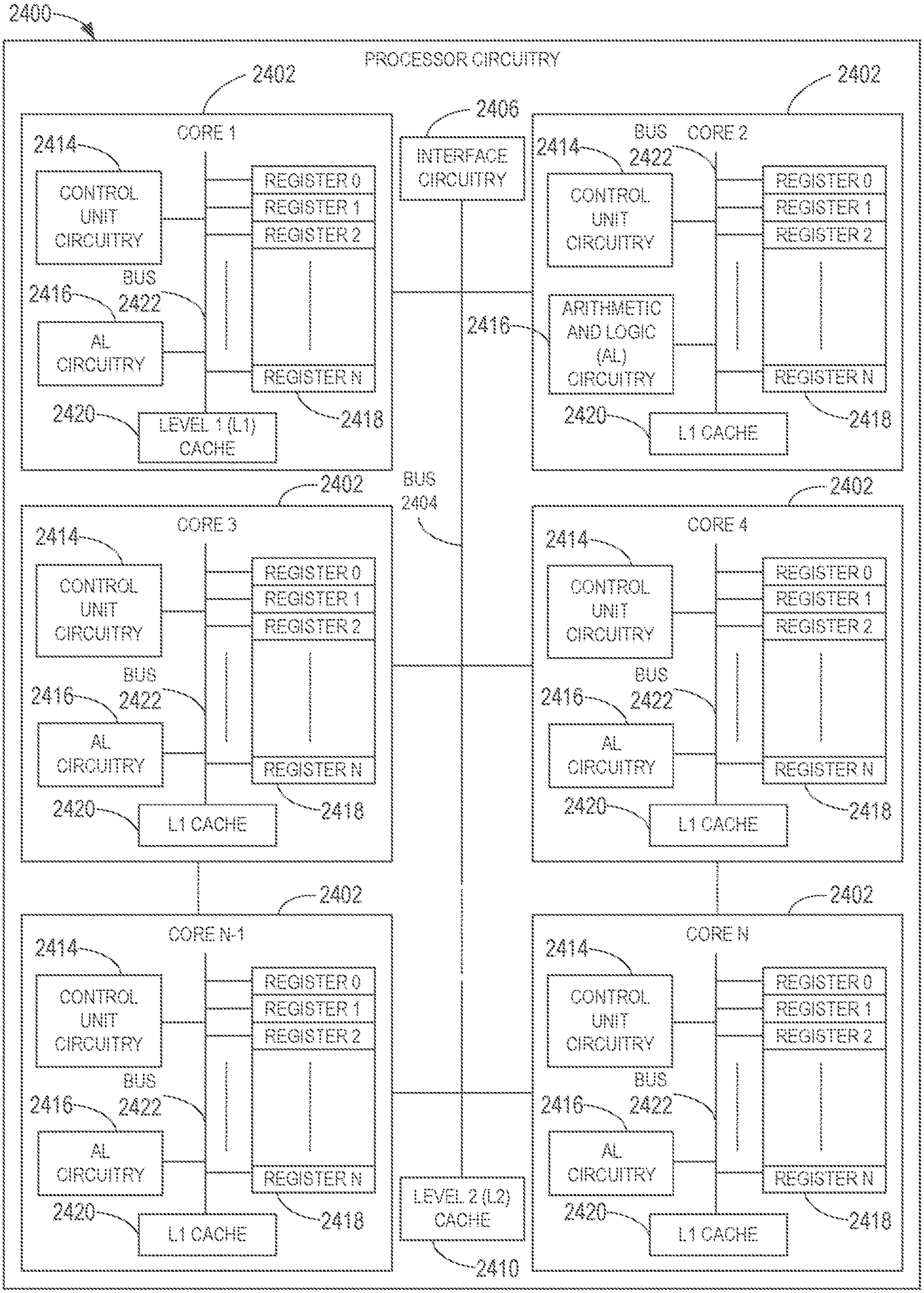
FIG. 24 is a block diagram of an example implementation of the processor circuitry of FIG. 22 and/or the programmable circuitry of FIG. 23.

FIG. 24 is a block diagram of an example implementation of the programmable circuitry 2212 of FIG. 22 and/or the programmable circuitry 2312 of FIG. 23. In this example, the programmable circuitry 2212 of FIG. 22 and/or the programmable circuitry 2312 of FIG. 23 is/are implemented by a microprocessor 2400. For example, the microprocessor 2400 may be a general purpose microprocessor (e.g., general purpose microprocessor circuitry). The microprocessor 2400 executes some or all of the machine-readable instructions to effectively instantiate the circuitry of FIGS. 17A and/or 17B as logic circuits to perform operations corresponding to those machine readable instructions. In some such examples, the circuitry of FIGS. 17A and/or 17B is instantiated by the hardware circuits of the microprocessor 2400 in combination with the machine-readable instructions. For example, the microprocessor 2400 may be implemented by multi-core hardware circuitry such as a CPU, a DSP, a GPU, an XPU, etc. Although it may include any number of example cores 2402 (e.g., 1 core), the microprocessor 2400 of this example is a multi-core semiconductor device including N cores. The cores 2402 of the microprocessor 2400 may operate independently or may cooperate to execute machine readable instructions. For example, machine code corresponding to a firmware program, an embedded software program, or a software program may be executed by one of the cores 2402 or may be executed by multiple ones of the cores 2402 at the same or different times. In some examples, the machine code corresponding to the firmware program, the embedded software program, or the software program is split into threads and executed in parallel by two or more of the cores 2402. The software program may correspond to a portion or all of the machine readable instructions and/or operations.

The cores 2402 may communicate by a first example bus 2404. In some examples, the first bus 2404 may be implemented by a communication bus to effectuate communication associated with one(s) of the cores 2402. For example, the first bus 2404 may be implemented by at least one of an Inter-Integrated Circuit (I2C) bus, a Serial Peripheral Interface (SPI) bus, a PCI bus, or a PCIe bus. Additionally or alternatively, the first bus 2404 may be implemented by any other type of computing or electrical bus. The cores 2402 may obtain data, instructions, and/or signals from one or more external devices by example interface circuitry 2406. The cores 2402 may output data, instructions, and/or signals to the one or more external devices by the interface circuitry 2406. Although the cores 2402 of this example include example local memory 2420 (e.g., Level 1 (L1) cache that may be split into an L1 data cache and an L1 instruction cache), the microprocessor 2400 also includes example shared memory 2410 that may be shared by the cores (e.g., Level 2 (L2 cache)) for high-speed access to data and/or instructions. Data and/or instructions may be transferred (e.g., shared) by writing to and/or reading from the shared memory 2410. The local memory 2420 of each of the cores 2402 and the shared memory 2410 may be part of a hierarchy of storage devices including multiple levels of cache memory and the main memory (e.g., the main memory 2214, 2216 of FIG. 22, the main memory 2314, 2316 of FIG. 23, etc.). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2402 may be referred to as a CPU, DSP, GPU, etc., or any other type of hardware circuitry. Each core 2402 includes control unit circuitry 2414, arithmetic and logic (AL) circuitry (sometimes referred to as an ALU) 2416, a plurality of registers 2418, the local memory 2420, and a second example bus 2422. Other structures may be present. For example, each core 2402 may include vector unit circuitry, single instruction multiple data (SIMD) unit circuitry, load/store unit (LSU) circuitry, branch/jump unit circuitry, floating-point unit (FPU) circuitry, etc. The control unit circuitry 2414 includes semiconductor-based circuits structured to control (e.g., coordinate) data movement within the corresponding core 2402. The AL circuitry 2416 includes semiconductor-based circuits structured to perform one or more mathematic and/or logic operations on the data within the corresponding core 2402. The AL circuitry 2416 of some examples performs integer based operations. In other examples, the AL circuitry 2416 also performs floating point operations. In yet other examples, the AL circuitry 2416 may include first AL circuitry that performs integer based operations and second AL circuitry that performs floating point operations. In some examples, the AL circuitry 2416 may be referred to as an Arithmetic Logic Unit (ALU). The registers 2418 are semiconductor-based structures to store data and/or instructions such as results of one or more of the operations performed by the AL circuitry 2416 of the corresponding core 2402. For example, the registers 2418 may include vector register(s), SIMD register(s), general purpose register(s), flag register(s), segment register(s), machine specific register(s), instruction pointer register(s), control register(s), debug register(s), memory management register(s), machine check register(s), etc. The registers 2418 may be arranged in a bank as shown in FIG. 24. Alternatively, the registers 2418 may be organized in any other arrangement, format, or structure including distributed throughout the core 2402 to shorten access time. The second bus 2422 may be implemented by at least one of an I2C bus, a SPI bus, a PCI bus, or a PCIe bus.

Each core 2402 and/or, more generally, the microprocessor 2400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2400 is a semiconductor device fabricated to include many transistors interconnected to implement the structures described above in one or more integrated circuits (ICs) contained in one or more packages.

The microprocessor 2400 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general purpose processor. Examples of accelerators include ASICs and FPGAs such as those discussed herein. A GPU, DSP, or other programmable device can also be an accelerator. Accelerators may be on-board the microprocessor 2400, in the same chip package as the microprocessor 2400 and/or in one or more separate packages from the microprocessor 2400.

Figure 25:
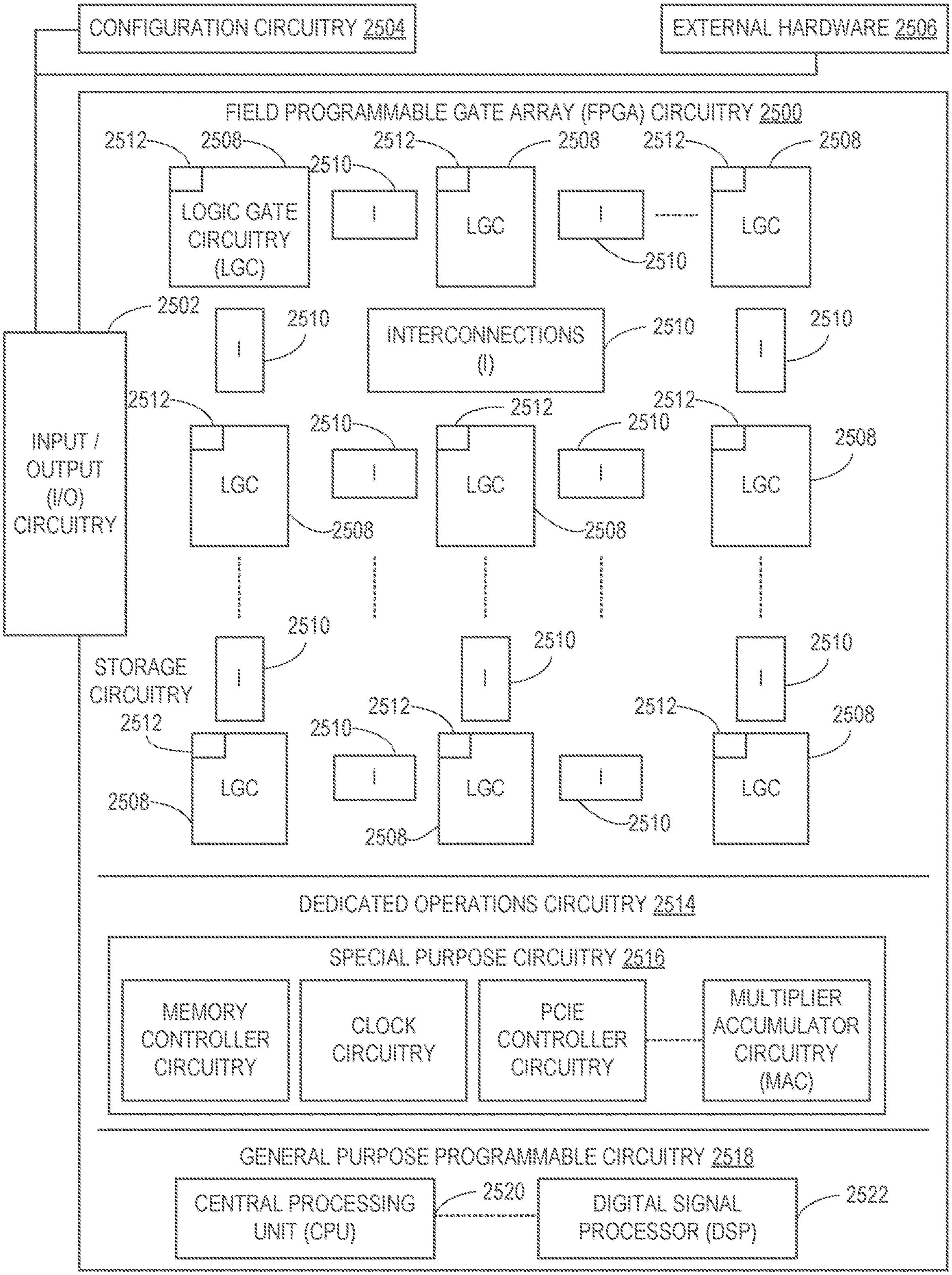
FIG. 25 is a block diagram of another example implementation of the processor circuitry of FIG. 22 and/or the programmable circuitry of FIG. 23.

FIG. 25 is a block diagram of another example implementation of the programmable circuitry 2212 of FIG. 22 and/or the programmable circuitry 2312 of FIG. 23. In this example, the programmable circuitry 2212 and/or the programmable circuitry 2312 is/are implemented by FPGA circuitry 2500. For example, the FPGA circuitry 2500 may be implemented by an FPGA. The FPGA circuitry 2500 can be used, for example, to perform operations that could otherwise be performed by the example microprocessor 2400 of FIG. 24 executing corresponding machine readable instructions. However, once configured, the FPGA circuitry 2500 instantiates the operations and/or functions corresponding to the machine readable instructions in hardware and, thus, can often execute the operations/functions faster than they could be performed by a general purpose microprocessor executing the corresponding software.

More specifically, in contrast to the microprocessor 2400 of FIG. 24 described above (which is a general purpose device that may be programmed to execute some or all of the machine readable instructions represented by the flowcharts of FIGS. 20 and 21 but whose interconnections and logic circuitry are fixed once fabricated), the FPGA circuitry 2500 of the example of FIG. 25 includes interconnections and logic circuitry that may be configured, structured, programmed, and/or interconnected in different ways after fabrication to instantiate, for example, some or all of the operations/functions corresponding to the machine readable instructions by the flowchart(s) of FIGS. 20 and 21. In particular, the FPGA circuitry 2500 may be thought of as an array of logic gates, interconnections, and switches. The switches can be programmed to change how the logic gates are interconnected by the interconnections, effectively forming one or more dedicated logic circuits (unless and until the FPGA circuitry 2500 is reprogrammed). The configured logic circuits enable the logic gates to cooperate in different ways to perform different operations on data received by input circuitry. Those operations may correspond to some or all of the instructions (e.g., software and/or firmware) represented by the flowchart(s) of FIGS. 20 and 21. As such, the FPGA circuitry 2500 may be configured and/or structured to effectively instantiate some or all of the operations/functions corresponding to the machine readable instructions as dedicated logic circuits to perform the operations/functions corresponding to those software instructions in a dedicated manner analogous to an ASIC. Therefore, the FPGA circuitry 2500 may perform the operations/functions corresponding to the some or all of the machine readable instructions faster than the general purpose microprocessor can execute the same.

In the example of FIG. 25, the FPGA circuitry 2500 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 2500 of FIG. 25 may access and/or load the binary file to cause the FPGA circuitry 2500 of FIG. 25 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2500 of FIG. 25 to cause configuration and/or structuring of the FPGA circuitry 2500 of FIG. 25, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 2500 of FIG. 25 may access and/or load the binary file to cause the FPGA circuitry 2500 of FIG. 25 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2500 of FIG. 25 to cause configuration and/or structuring of the FPGA circuitry 2500 of FIG. 25, or portion(s) thereof.

The FPGA circuitry 2500 of FIG. 25, includes example input/output (I/O) circuitry 2502 to obtain and/or output data to/from example configuration circuitry 2504 and/or external hardware 2506. For example, the configuration circuitry 2504 may be implemented by interface circuitry that may obtain a binary file, which may be implemented by a bit stream, data, and/or machine-readable instructions, to configure the FPGA circuitry 2500, or portion(s) thereof. In some such examples, the configuration circuitry 2504 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 2506 may be implemented by external hardware circuitry. For example, the external hardware 2506 may be implemented by the microprocessor 2400 of FIG. 24.

The FPGA circuitry 2500 also includes an array of example logic gate circuitry 2508, a plurality of example configurable interconnections 2510, and example storage circuitry 2512. The logic gate circuitry 2508 and the configurable interconnections 2510 are configurable to instantiate one or more operations/functions that may correspond to at least some of the machine readable instructions of FIGS. 20 and 21 and/or other desired operations. The logic gate circuitry 2508 shown in FIG. 25 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2508 to enable configuration of the electrical structures and/or the logic gates to form circuits to perform desired operations/functions. The logic gate circuitry 2508 may include other electrical structures such as look-up tables (LUTs), registers (e.g., flip-flops or latches), multiplexers, etc.

The configurable interconnections 2510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2508 to program desired logic circuits.

The storage circuitry 2512 of the illustrated example is structured to store result(s) of the one or more of the operations performed by corresponding logic gates. The storage circuitry 2512 may be implemented by registers or the like. In the illustrated example, the storage circuitry 2512 is distributed amongst the logic gate circuitry 2508 to facilitate access and increase execution speed.

The example FPGA circuitry 2500 of FIG. 25 also includes example dedicated operations circuitry 2514. In this example, the dedicated operations circuitry 2514 includes special purpose circuitry 2516 that may be invoked to implement commonly used functions to avoid the need to program those functions in the field. Examples of such special purpose circuitry 2516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2500 may also include example general purpose programmable circuitry 2518 such as an example CPU 2520 and/or an example DSP 2522. Other general purpose programmable circuitry 2518 may additionally or alternatively be present such as a GPU, an XPU, etc., that can be programmed to perform other operations.

Although FIGS. 24 and 25 illustrate two example implementations of the programmable circuitry 2212 of FIG. 22 and/or the programmable circuitry 2312 of FIG. 23, many other approaches are contemplated. For example, FPGA circuitry may include an on-board CPU, such as one or more of the example CPU 2520 of FIG. 24. Therefore, the programmable circuitry 2212 of FIG. 22 and/or the programmable circuitry 2312 of FIG. 23 may additionally be implemented by combining at least the example microprocessor 2400 of FIG. 24 and the example FPGA circuitry 2500 of FIG. 25. In some such hybrid examples, one or more cores 2402 of FIG. 24 may execute a first portion of the machine readable instructions represented by the flowchart(s) of FIGS. 20 and/or 21 to perform first operation(s)/function(s), the FPGA circuitry 2500 of FIG. 25 may be configured and/or structured to perform second operation(s)/function(s) corresponding to a second portion of the machine readable instructions represented by the flowcharts of FIGS. 20 and/or 21, and/or an ASIC may be configured and/or structured to perform third operation(s)/function(s) corresponding to a third portion of the machine readable instructions represented by the flowcharts of FIGS. 20 and/or 21.

It should be understood that some or all of the circuitry of FIGS. 18 and/or 19 may, thus, be instantiated at the same or different times. For example, same and/or different portion(s) of the microprocessor 2400 of FIG. 24 may be programmed to execute portion(s) of machine-readable instructions at the same and/or different times. In some examples, same and/or different portion(s) of the FPGA circuitry 2500 of FIG. 25 may be configured and/or structured to perform operations/functions corresponding to portion(s) of machine-readable instructions at the same and/or different times.

In some examples, some or all of the circuitry of FIGS. 18 and/or 19 may be instantiated, for example, in one or more threads executing concurrently and/or in series. For example, the microprocessor 2400 of FIG. 24 may execute machine readable instructions in one or more threads executing concurrently and/or in series. In some examples, the FPGA circuitry 2500 of FIG. 25 may be configured and/or structured to carry out operations/functions concurrently and/or in series. Moreover, in some examples, some or all of the circuitry of FIGS. 18 and/or 19 may be implemented within one or more virtual machines and/or containers executing on the microprocessor 2400 of FIG. 24.

In some examples, the programmable circuitry 2212 of FIG. 22 and/or the programmable circuitry 2312 of FIG. 23 may be in one or more packages. For example, the microprocessor 2400 of FIG. 24 and/or the FPGA circuitry 2500 of FIG. 25 may be in one or more packages. In some examples, an XPU may be implemented by the programmable circuitry 2212 of FIG. 22, which may be in one or more packages. For example, the XPU may include a CPU (e.g., the microprocessor 2400 of FIG. 24, the CPU 2520 of FIG. 25, etc.) in one package, a DSP (e.g., the DSP 2522 of FIG. 25) in another package, a GPU in yet another package, and an FPGA (e.g., the FPGA circuitry 2500 of FIG. 25) in still yet another package.

Example methods, apparatus, systems, and articles of manufacture for managing the cooling systems of distributed compute systems are disclosed herein. Further examples and combinations thereof include the following:

Example 1 includes an apparatus comprising memory, machine readable instructions, and programmable circuitry to at least one of instantiate or execute the machine readable instructions to input operational data into a machine-learning model, the operational data including first information relating to a workload of a server and second information relating to an ambient condition of the server, compare a predicted cooling power requirement for a time period with a predicted cooling power availability for the time period, the predicted cooling power requirement based on an output of the machine-learning model, and generate a cooling plan based on the comparison, the cooling plan to define operation of at least one of the server or a cooling system used to cool the server during the time period.

Example 2 includes the apparatus of example 1, wherein the cooling plan defines temporally segmented cooling plans for different time segments of the time period, the operation of at least one of the server or the cooling system to change between different ones of the time segments.

Example 3 includes the apparatus of example 2, wherein a number of the temporally segmented cooling plans is greater than two.

Example 4 includes the apparatus of example 1, wherein the operation of the server is to be at least one of throttled or deployed to another server when the predicted cooling power requirement exceeds the predicted available cooling power availability.

Example 5 includes the apparatus of example 1, wherein the operation of the cooling system is to reduce a temperature of the server when the predicted cooling power requirement is less than the predicted available cooling power availability.

Example 6 includes the apparatus of example 1, wherein the operation of the server is to increase a temperature of the server when the predicted cooling power requirement exceeds the predicted available cooling power availability.

Example 7 includes the apparatus of example 1, wherein the first information includes at least one of an instruction set associated with the workload or a power requirement of an input/output device of the server, the input/output device to be used during the execution of the workload.

Example 8 includes the apparatus of example 1, wherein the second information includes sensor data related to a current ambient condition of the server, historic records of past ambient conditions of the server, and forecasts of future ambient conditions on the server.

Example 9 includes a non-transitory machine readable storage medium comprising instructions to cause programmable circuitry to at least input operational data into a machine-learning model, the operational data including first information relating to a workload of a server and second information relating to an ambient condition of the server, compare a predicted cooling power requirement for a time period with a predicted cooling power availability for the time period, the predicted cooling power requirement based on an output of the machine-learning model, and generate a cooling plan based on the comparison, the cooling plan to define operation of at least one of the server or a cooling system used to cool the server during the time period.

Example 10 includes the non-transitory machine readable medium of example 9, wherein the cooling plan defines temporally segmented cooling plans for different time segments of the time period, the operation of at least one of the server or the cooling system to change between different ones of the time segments.

Example 11 includes the non-transitory machine readable medium of example 10, wherein a number of the temporally segmented cooling plans is greater than two.

Example 12 includes the non-transitory machine readable medium of example 9, wherein the operation of the server is to be at least one of throttled or deployed to another server when the predicted cooling power requirement exceeds the predicted available cooling power availability.

Example 13 includes the non-transitory machine readable medium of example 9, wherein the operation of the cooling system is to reduce a temperature of the server when the predicted cooling power requirement is less than the predicted available cooling power availability.

Example 14 includes the non-transitory machine readable medium of example 9, wherein the operation of the server is to increase a temperature of the server when the predicted cooling power requirement exceeds the predicted available cooling power availability.

Example 15 includes the non-transitory machine readable medium of example 9, wherein the first information includes at least one of an instruction set associated with the workload or a power requirement of an input/output device of the server, the input/output device to be used during the execution of the workload.

Example 16 includes the non-transitory machine readable medium of example 9, wherein the second information includes sensor data related to a current ambient condition of the server, historic records of past ambient conditions of the server, and forecasts of future ambient conditions on the server.

Example 17 includes a method comprising inputting operational data into a machine-learning model, the operational data including first information relating to a workload of a compute device and second information relating to an ambient condition of the compute device, comparing a predicted cooling power requirement for a time period with a predicted cooling power availability for the time period, the predicted cooling power requirement based on an output of the machine-learning model, and generating a cooling plan based on the comparison, the cooling plan to define operation of at least one of the compute device or a cooling system used to cool the compute device during the time period.

Example 18 includes the method of example 17, wherein the cooling plan defines temporally segmented cooling plans for different time segments of the time period, the operation of at least one of the compute device or the cooling system to change between different ones of the time segments.

Example 19 includes the method of example 18, wherein a number of the temporally segmented cooling plans is greater than two.

Example 20 includes the method of example 17, wherein the operation of the compute device is to be at least one of throttled or deployed to another compute device when the predicted cooling power requirement exceeds the predicted available cooling power availability.

Example 21 includes the method of example 17, wherein the operation of the cooling system is to reduce a temperature of the compute device when the predicted cooling power requirement is less than the predicted available cooling power availability.

Example 22 includes the method of example 17, wherein the operation of the compute device is to increase a temperature of the compute device when the predicted cooling power requirement exceeds the predicted available cooling power availability.

Example 23 includes the method of example 17, wherein the first information includes at least one of an instruction set associated with the workload or a power requirement of an input/output device of the compute device, the input/output device to be used during the execution of the workload.

Example 24 includes the method of example 17, wherein the second information includes sensor data related to a current ambient condition of the compute device, historic records of past ambient conditions of the compute device, and forecasts of future ambient conditions on the compute device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

memory;

machine readable instructions; and at least one programmable circuit to at least one of instantiate or execute the machine readable instructions to:

input operational data into a machine-learning model, the operational data including first information relating to a workload of a server and second information relating to an ambient condition of the server;

compare a predicted cooling power requirement for a time period with a predicted cooling power availability for the time period, the predicted cooling power requirement based on an output of the machine-learning model; and generate a cooling plan based on the comparison, the cooling plan to define operation of at least one of the server or a cooling system used to cool the server during the time period.

2. The apparatus of claim 1, wherein the cooling plan defines temporally segmented cooling plans for different time segments of the time period, the operation of at least one of the server or the cooling system to change between different ones of the time segments.

3. The apparatus of claim 2, wherein a number of the temporally segmented cooling plans is greater than two.

4. The apparatus of claim 1, wherein the operation of the server is to be at least one of throttled or deployed to another server when the predicted cooling power requirement exceeds the predicted cooling power availability.

5. The apparatus of claim 1, wherein the operation of the cooling system is to reduce a temperature of the server when the predicted cooling power requirement is less than the predicted cooling power availability.

6. The apparatus of claim 1, wherein the operation of the server is to increase a temperature of the server when the predicted cooling power requirement exceeds the predicted cooling power availability.

7. The apparatus of claim 1, wherein the second information includes:

sensor data related to a current ambient condition of the server;

historic records of past ambient conditions of the server; and forecasts of future ambient conditions of the server.

8. A non-transitory machine readable storage medium comprising instructions to cause at least one programmable circuit to at least:

input operational data into a machine-learning model, the operational data including first information relating to a workload of a server and second information relating to an ambient condition of the server;

compare a predicted cooling power requirement for a time period with a predicted cooling power availability for the time period, the predicted cooling power requirement based on an output of the machine-learning model; and generate a cooling plan based on the comparison, the cooling plan to define operation of at least one of the server or a cooling system used to cool the server during the time period.

9. The non-transitory machine readable medium of claim 8, wherein the cooling plan defines temporally segmented cooling plans for different time segments of the time period, the operation of at least one of the server or the cooling system to change between different ones of the time segments.

10. The non-transitory machine readable medium of claim 9, wherein a number of the temporally segmented cooling plans is greater than two.

11. The non-transitory machine readable medium of claim 8, wherein the operation of the server is to be at least one of throttled or deployed to another server when the predicted cooling power requirement exceeds the predicted cooling power availability.

12. The non-transitory machine readable medium of claim 8, wherein the operation of the cooling system is to reduce a temperature of the server when the predicted cooling power requirement is less than the predicted cooling power availability.

13. The non-transitory machine readable medium of claim 8, wherein the operation of the server is to increase a temperature of the server when the predicted cooling power requirement exceeds the predicted cooling power availability.

14. The non-transitory machine readable medium of claim 8, wherein the first information includes at least one of an instruction set associated with the workload or a power requirement of an input/output device of the server, the input/output device to be used during execution of the workload.

15. A method comprising:

inputting operational data into a machine-learning model, the operational data including first information relating to a workload of a compute device and second information relating to an ambient condition of the compute device;

comparing, by executing instructions with at least one programmable circuit, a predicted cooling power requirement for a time period with a predicted cooling power availability for the time period, the predicted cooling power requirement based on an output of the machine-learning model; and generating, by executing instructions with one or more of the at least one programmable circuit, a cooling plan based on the comparison, the cooling plan to define operation of at least one of the compute device or a cooling system used to cool the compute device during the time period.

16. The method of claim 15, wherein the cooling plan defines temporally segmented cooling plans for different time segments of the time period, the operation of at least one of the compute device or the cooling system to change between different ones of the time segments.

17. The method of claim 15, wherein the operation of the cooling system is to reduce a temperature of the compute device when the predicted cooling power requirement is less than the predicted cooling power availability.

18. The method of claim 15, wherein the operation of the compute device is to increase a temperature of the compute device when the predicted cooling power requirement exceeds the predicted cooling power availability.

19. The method of claim 15, wherein the first information includes at least one of an instruction set associated with the workload or a power requirement of an input/output device of the compute device, the input/output device to be used during execution of the workload.

20. The method of claim 15, wherein the second information includes:

sensor data related to a current ambient condition of the compute device;

historic records of past ambient conditions of the compute device; and forecasts of future ambient conditions of the compute device.

* * * * *